US005978244A

United States Patent [19]

Hughey

[11] Patent Number: 5,978,244

[45] Date of Patent: Nov. 2, 1999

[54] PROGRAMMABLE LOGIC CONTROL SYSTEM FOR A HVDC POWER SUPPLY

[75] Inventor: Daniel C. Hughey, Indianapolis, Ind.

[73] Assignee: Illinois Tool Works, Inc., Glenview, Ill.

[21] Appl. No.: 08/953,858

[22] Filed: Oct. 16, 1997

[51] Int. Cl.[6] .................... H02M 7/538

[52] U.S. Cl. .................... 363/97; 363/26

[58] Field of Search .................... 363/17, 24, 25, 363/26, 61, 95, 97, 98

[56] References Cited

U.S. PATENT DOCUMENTS

| | | |
|---|---|---|
| 2,767,359 | 10/1956 | Larsen et al. . |
| 3,273,015 | 9/1966 | Fischer . |
| 3,627,661 | 12/1971 | Gordon et al. . |
| 3,641,971 | 2/1972 | Walberg . |
| 3,731,145 | 5/1973 | Senay . |
| 3,764,883 | 10/1973 | Staad et al. . |
| 3,795,839 | 3/1974 | Walberg . |
| 3,809,955 | 5/1974 | Parson . |
| 3,851,618 | 12/1974 | Bentley . |
| 3,872,370 | 3/1975 | Regnault . |
| 3,875,892 | 4/1975 | Gregg et al. . |
| 3,893,006 | 7/1975 | Algeri et al. . |
| 3,894,272 | 7/1975 | Bentley . |
| 3,895,262 | 7/1975 | Ribnitz . |
| 3,970,920 | 7/1976 | Braun . |
| 4,000,443 | 12/1976 | Lever . |
| 4,038,593 | 7/1977 | Quinn . |
| 4,073,002 | 2/1978 | Sickles et al. . |
| 4,075,677 | 2/1978 | Bentley . |
| 4,182,490 | 1/1980 | Kennon . |
| 4,187,527 | 2/1980 | Bentley . |
| 4,196,465 | 4/1980 | Buschor . |
| 4,266,262 | 5/1981 | Haase, Jr. . |
| 4,287,552 | 9/1981 | Wagner et al. . |
| 4,323,947 | 4/1982 | Huber . |
| 4,324,812 | 4/1982 | Bentley . |
| 4,343,828 | 8/1982 | Smead et al. . |
| 4,353,970 | 10/1982 | Dryczynski et al. . |
| 4,377,838 | 3/1983 | Levey et al. . |
| 4,385,340 | 5/1983 | Kuroshima . |

(List continued on next page.)

FOREIGN PATENT DOCUMENTS

| | | |
|---|---|---|
| 24 36 142 | 2/1975 | Germany . |
| 32 15 644 A1 | 10/1983 | Germany . |
| 2 077 006 | 12/1981 | United Kingdom . |

OTHER PUBLICATIONS

Rans–Pak 1000™ Power Supply brochure, May, 1990, 2 pages.
Rans–Pak 1000™ Power Supply service manual, May 1991, 25 pages.
Rans–Pak 100™ Power Supply brochure, May, 1988, 1 page.
Rans–Pak 300™ Power Supply brochure, Sep., 1990, 2 pages.
Ransburg GEMA Series 400 Power Supply Panel Service Manual, Apr., 1990, 59 pages.

*Primary Examiner*—Jeffrey Sterrett
*Attorney, Agent, or Firm*—Barnes & Thornburg

[57] ABSTRACT

A high magnitude potential supply comprises a first circuit for generating a first signal related to a desired output high magnitude potential across a pair of output terminals of the supply, a second circuit for generating a second signal related to an output current from the high magnitude potential supply, and a third circuit for supplying an operating potential to the high magnitude potential supply so that it can produce the high magnitude operating potential. The third circuit has a control terminal. A fourth circuit is coupled to the first and second circuits and to the control terminal. The fourth circuit receives the first and second signals from the first and second circuits and controls the operating potential supplied to the high magnitude potential supply by the third circuit. A fifth circuit is provided for disabling the supply of operating potential to the high magnitude potential supply in certain conditions so that no high magnitude operating potential can be supplied by it. The fifth circuit is also coupled to the control terminal.

21 Claims, 20 Drawing Sheets

U.S. PATENT DOCUMENTS 4,402,030 8/1983 Moser et al. .
4,409,635 10/1983 Kraus .
4,472,781 9/1984 Miller .
4,481,557 11/1984 Woodruff .
4,485,427 11/1984 Woodruff et al. .
4,508,276 4/1985 Malcolm .
4,538,231 8/1985 Abe et al. .
4,587,605 5/1986 Kouyama et al. .
4,630,220 12/1986 Peckinpaugh .
4,651,264 3/1987 Shiao-Chung Hu .
4,672,500 6/1987 Roger et al. .
4,674,003 6/1987 Zylka .
4,698,517 10/1987 Tohya et al. .
4,710,849 12/1987 Norris .
4,737,887 4/1988 Thome .
4,745,520 5/1988 Hughey .
4,764,393 8/1988 Henger et al. .
4,797,833 1/1989 El-Amawy et al. .
4,809,127 2/1989 Steinman et al. .
4,825,028 4/1989 Smith ........................................ 363/98
4,841,425 6/1989 Maeba et al. .
4,890,190 12/1989 Hemming .
4,891,743 1/1990 May et al. .
4,912,588 3/1990 Thome et al. .
4,916,571 4/1990 Staheli .
4,920,246 4/1990 Aoki .......................................... 363/98
5,012,058 4/1991 Smith ........................................ 363/17
5,019,996 5/1991 Lee .
5,056,720 10/1991 Crum et al. .
5,063,350 11/1991 Hemming et al. .
5,067,434 11/1991 Thur et al. .
5,080,289 1/1992 Lunzer .
5,093,625 3/1992 Lunzer .
5,107,438 4/1992 Sato .
5,121,884 6/1992 Noakes .
5,124,905 6/1992 Kniepkamp .
5,138,513 8/1992 Weinstein .
5,159,544 10/1992 Hughey et al. .
5,267,138 11/1993 Shore ........................................ 363/95
5,340,289 8/1994 Konieczynski et al. .
5,351,903 10/1994 Mazakas et al. .
5,433,387 7/1995 Howe et al. .
5,457,621 10/1995 Munday et al. .......................... 363/97
5,566,042 10/1996 Perkins et al. .
5,666,279 9/1997 Takehara et al. ......................... 363/95
5,745,358 4/1998 Faulk ........................................ 363/97
5,818,709 10/1998 Takehara .................................. 363/95

PROGRAMMABLE LOGIC CONTROL SYSTEM FOR A HVDC POWER SUPPLY

BACKGROUND OF THE INVENTION

This invention relates to controllers for high magnitude potential sources used in, for example, electrostatically aided coating material atomization and dispensing devices. Many such systems are known. There are, for example, the systems illustrated and described in U.S. Pat. Nos. 3,851,618; 3,875,892; 3,894,272; 4,075,677; 4,187,527; 4,324,812; 4,481,557; 4,485,427; 4,745,520; and, 5,159,544, to identify but a few.

DISCLOSURE OF THE INVENTION

According to the invention, a high magnitude potential supply comprises a first circuit for generating a first signal related to a desired output high magnitude potential across a pair of output terminals of the supply, a second circuit for generating a second signal related to an output current from the high magnitude potential supply, and a third circuit for supplying an operating potential to the high magnitude potential supply so that it can produce the high magnitude operating potential. The third circuit has a control terminal. A fourth circuit is coupled to the first and second circuits and to the control terminal. The fourth circuit receives the first and second signals from the first and second circuits and controls the operating potential supplied to the high magnitude potential supply by the third circuit. A fifth circuit is provided to selectively disable the supply of operating potential to the high magnitude potential supply so that no high magnitude operating potential can be supplied by it. The fifth circuit is also coupled to the control terminal.

Illustratively, the first and second circuits comprise a programmable logic controller (PLC), and a high speed bus for coupling the PLC to the fourth circuit.

Additionally illustratively, the first and second circuits respectively comprise first and second potentiometers for selecting a desired output high magnitude potential and output current, respectively, and conductors for coupling the first and second potentiometers to the fourth circuit.

Further illustratively, first and second switches selectively couple one of the PLC and the first potentiometer, and one of the PLC and the second potentiometer, respectively, to the fourth circuit.

Additionally illustratively according to the invention, the third circuit comprises a high magnitude potential transformer having a primary winding and a secondary winding. The primary winding has a center tap and two end terminals. Third and fourth switches are coupled to respective ones of the end terminals. A source of oppositely phased first and second switching signals controls the third and fourth switches, respectively.

Illustratively, the fourth circuit comprises a switching regulator having an input terminal forming a summing junction for the first signal and the second signal and a output terminal coupled to the center tap. The fifth circuit includes a microprocessor (μP) and a fifth switch coupled to the μP to receive a third switching signal from the μP. The fifth switch is coupled to the summing junction to couple the third switching signal to the switching regulator to disable the supply of operating potential to the center tap.

Illustratively, the fifth switch is coupled to the summing junction through a filter which smooths the switching signals generated by the fifth switch in response to the μP's control.

Further illustratively, the apparatus comprises a sixth circuit cooperating with the μP to determine if operating potential is being supplied to the high magnitude potential supply, and a seventh circuit cooperating with the μP to determine if the high magnitude potential supply is indicating that it is generating high magnitude potential. The μP indicates a fault if the operating potential is not being supplied to the high magnitude potential supply and the high magnitude potential supply is indicating that it is generating high magnitude potential. Illustratively, the μP also indicates a fault if the operating potential is being supplied to the high magnitude potential supply and the high magnitude potential supply is indicating that it is not generating high magnitude potential.

BRIEF DESCRIPTION OF THE DRAWINGS

The invention may best be understood by referring to the following detailed description and accompanying drawings which illustrate the invention. In the drawings.

DETAILED DESCRIPTION OF AN ILLUSTRATIVE EMBODIMENT

In the detailed descriptions that follow, several integrated circuits and other components are identified, with particular circuit types and sources. In many cases, terminal names and pin numbers for these specifically identified circuit types and sources are noted. This should not be interpreted to mean that the identified circuits are the only circuits available from the same, or any other, sources that will perform the described functions. Other circuits are typically available from the same, and other, sources which will perform the described functions. The terminal names and pin numbers of such other circuits may or may not be the same as those indicated for the specific circuits identified in this application.

Figure 1:
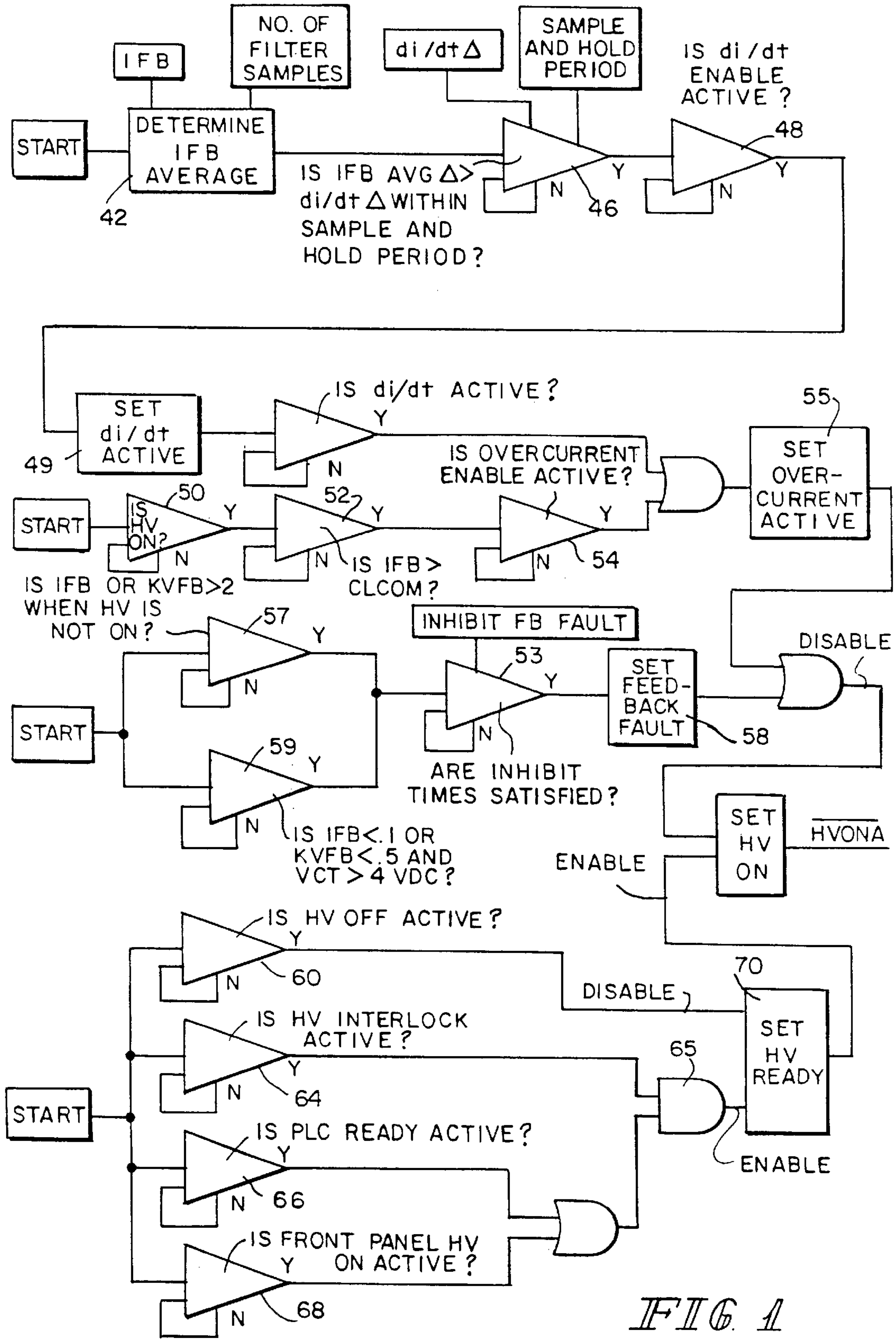
FIGS. 1–2 illustrate flow diagrams useful in understanding the invention; and, FIGS. 3–5, 6*a–i*, 7*a–f* and 8 illustrate, in block and schematic form, circuits useful in understanding the invention.
Figure 3:
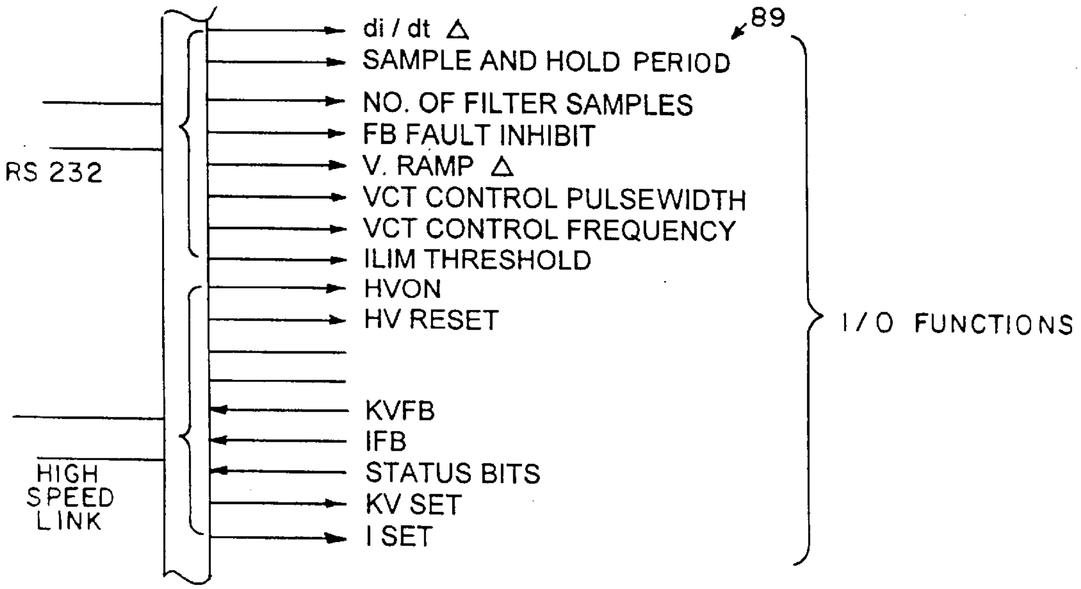

Flow diagrams of the routines which are executed by the μP 40 are illustrated in FIGS. 1–4. Referring particularly to FIG. 1, high voltage power supply ground return current feedback, IFB, and a number of filter samples are provided to a function 42 which calculates a current feedback average, IFB AVeraGe from these variables. A di/dt Δ setting is provided to the μP 40 from a display/set functions routine 44. di/dt Δ and the length of a sample and hold period are provided to a decision block 46 which determines whether the change in IFB average, IFB AVG Δ, over the sample and hold period is greater than di/dt Δ. This decision block 46 continues to be interrogated until IFB AVGΔ is greater than di/dt Δ over the sample and hold period. Once this result is achieved, the routine next determines 48 if di/dt enable is active. This decision block 48 continues to be interrogated until di/dt enable is detected active. Once this decision 48 is achieved, di/dt is set active at 49.

Another routine includes a decision block 50, "is High Voltage on?" This decision block 50 continues to be interrogated until HV is detected on. Once HV on is detected, a decision block 52 is reached, "is IFB greater than Current Limit COMmand?" Decision block 52 continues to be interrogated until IFB greater than CLCOM is detected. A decision block 54 is then reached, "is overcurrent enable active?" Decision block 54 continues to be interrogated until overcurrent enable is detected active. Once either di/dt or overcurrent enable is achieved, overcurrent is set active at 55.

Another decision that will disable HV On will now be explained. There are certain occurrences in the feedback paths for output high voltage and ground return current to the high voltage supply that the system interprets as feedback faults. If any of these faults occurs, the system is disabled by the μP 40. In the illustrated system, if IFB is greater than 2 μA or KiloVoltFeedBack is greater than 2 KV, 57, after a preselected INHIBIT time interval 53 after initialization of the system, the μP 40 interprets 58 this occurrence as a feedback fault and disables the system. This corresponds to the situation of an output with no input. Similarly, if IFB is less than 0.1 μA or KVFB is less than 0.5 KV and the Voltage at the Center Tap of the high magnitude potential supply input transformer is greater than 4 volts DC, 59, after the passage of the INHIBIT interval, the μP interprets 58 this occurrence as a feedback fault and disables the system. This corresponds to the situation of an input with no output.

Assuming that HV On is not disabled by either of these routines, the μP 40 determines 60 if HV Off is active. This decision block 60 continues to be interrogated until HV Off is detected active. Once HV Off is detected active, Set HV On is disabled at 62. If HV On is not disabled along one of these paths, the μP 40 next determines 64 if the system's Interlock is active. This decision block 64 continues to be interrogated until the interlock is detected active. The interlock active decision 64 gates 65 either the "Is Programmable Logic Controller Ready Active?" decision 66 or the "Is Front Panel HV On Active?" decision 68. Gating of either of these decisions 66, 68 by "Is Interlock Active?" 64 results 70 in the Setting of HV Ready. This results 72 in the Setting of HV On unless Set HV On has been disabled by Set Overcurrent Active 55 or Set FeedBack Fault 58.

Figure 2:
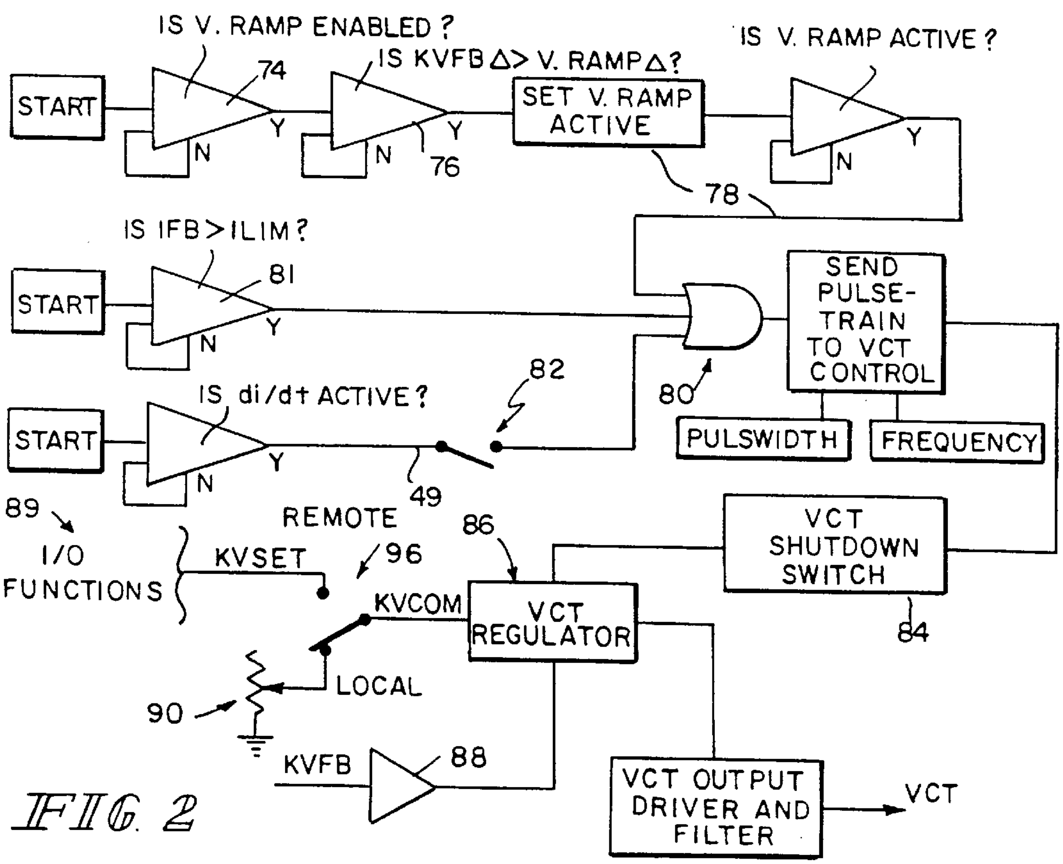
Figure 4:
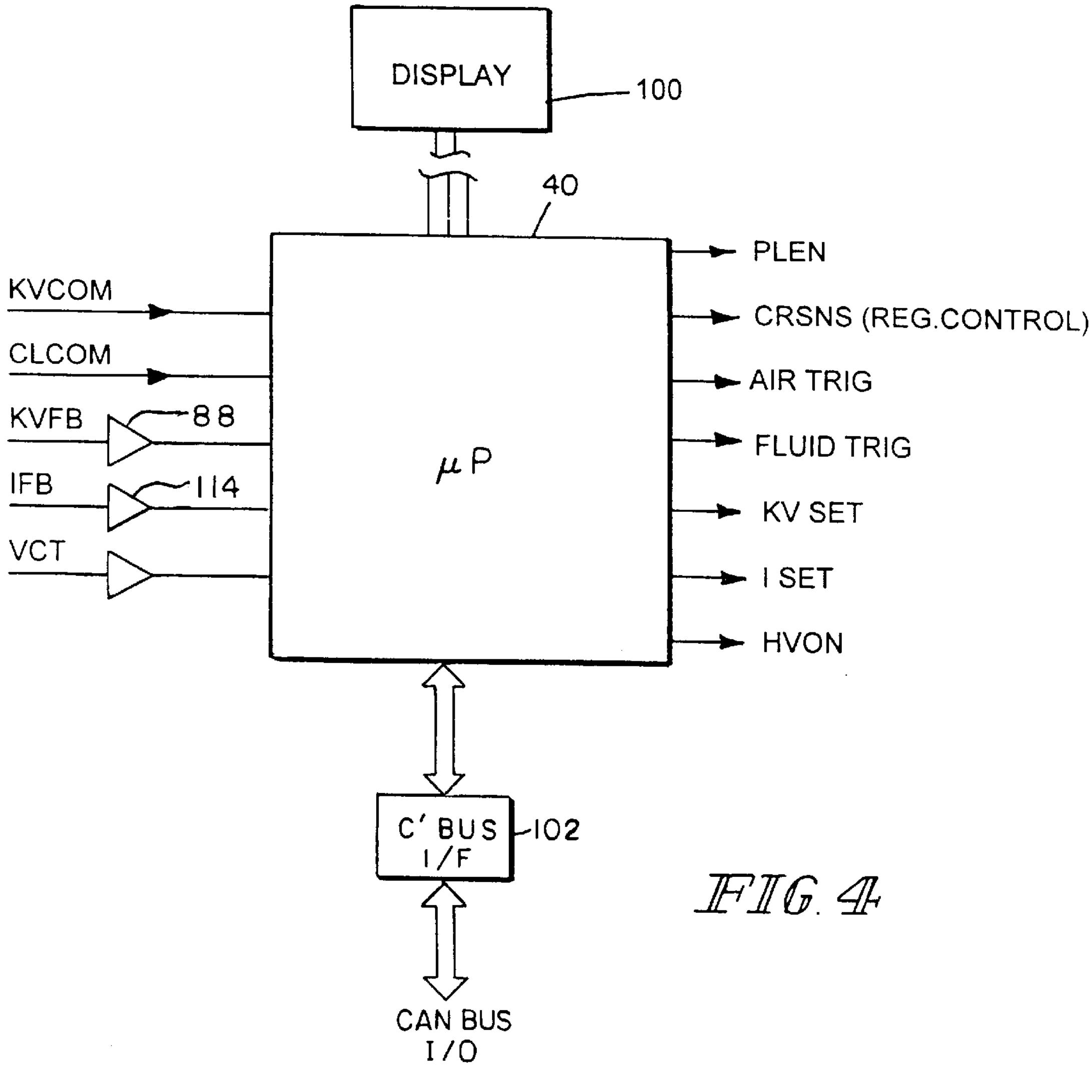

Turning now to the regulation of the Voltage at the Center Tap, and with reference to FIG. 2, the μP 40 first determines 74 if the function Voltage Ramp is enabled. This decision block 74 continues to be interrogated until V.Ramp is enabled. Once V.Ramp is enabled, the μP 40 next determines 76 if KVFB Δ is greater than V.Ramp Δ. This decision block 76 continues to be interrogated until KVFB Δ is greater than V.Ramp Δ. Once this decision is detected, V.Ramp is set active at 78. This is one way that pulses can be furnished to the V Center Tap controller 80.

Pulses will also be sent to VCT controller 80 if the feedback current IFB is greater than the feedback current limit, I LIMit. This decision block is illustrated at 81. A third way in which pulses will be sent to the VCT controller 80 is if di/dt is active. This decision is illustrated at 49. This state is detected as described above in connection with the discussion of FIG. 1. In the illustrated embodiment, this method may or may not be employed at the option 82 of the operator.

Pulses having pulsewidths and frequencies determined in a manner which will be described are supplied to the VCT shutdown switch 84. The output from the VCT shutdown switch 84 is an input to the VCT regulator IC 86. Other inputs to the VCT regulator IC 86 include the KVFB signal buffered by the KVFB buffer 88, and a commanded KV setting. Commanded KV COM may come from either of two sources, a KV adjust potentiometer 90 on the front panel of the apparatus or from a PLC 91 as one of the I/O functions 89. See also FIG. 3. To select KV adjust from among the I/O functions, the operator needs to select the remote position of a local/remote switch 96 on the front panel.

Turning now to the block diagrams of the two printed circuit boards that comprise the system, the μP board, FIG.

4, includes the μP 40 itself, a display 100 and a high speed network I/O 102, such as a standard Control Area Network BUS (CANBUS) I/O. μP 40 illustratively is a type 80C196KB-12 μP. The μP 40 A/D converts several inputs, including: the commanded KV setting, KVCOM, from the front panel; the commanded high magnitude potential supply output current limit, Current Limit COMmand, from the front panel; the KV FeedBack signal from the output of the high magnitude potential supply; the ground return current feedback, IFB, at the high magnitude potential supply's ground connection; and, the magnitude of the center tap voltage, VCT, to the primary winding of the high magnitude potential supply's high voltage transformer. The μP 40 generates from these inputs and others outputs including: a Phase Lock ENable signal to enable the high magnitude potential supply's phase locked loop oscillator 112; a Corona SSeNSe signal to the VCT regulator 86; an Air Trigger control to trigger the flow of, for example, atomizing or shaping air to a pneumatically assisted atomizer 113 (FIG. 8), such as an automatic gun-type atomizer, or a rotary atomizer such as a bell- or disk-type atomizer; a Fluid Trigger control to trigger the flow of, for example, coating material or solvent during a coating operation or color change, respectively; KV Set, which will be either KVCOM in the local control mode or the output high magnitude voltage setting commanded by PLC 91 in the remote control mode;

I Set which will be either CLCOM in the local control mode or the current setting commanded by PLC 91 in the remote control mode, and, the HV On signal which switches on the high magnitude potential supply 106 to the atomizing device 113.

Figure 5:
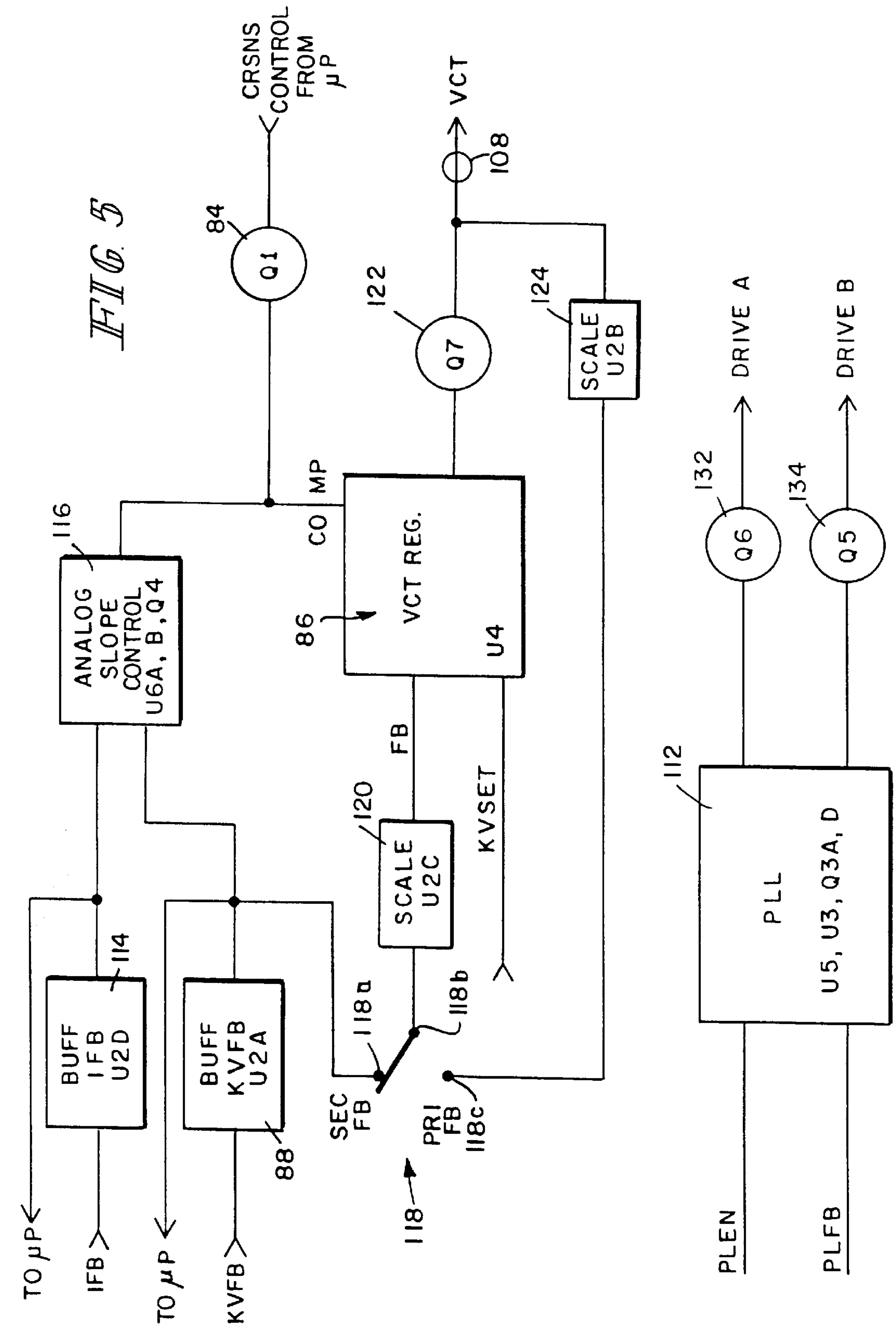
Figure 8:
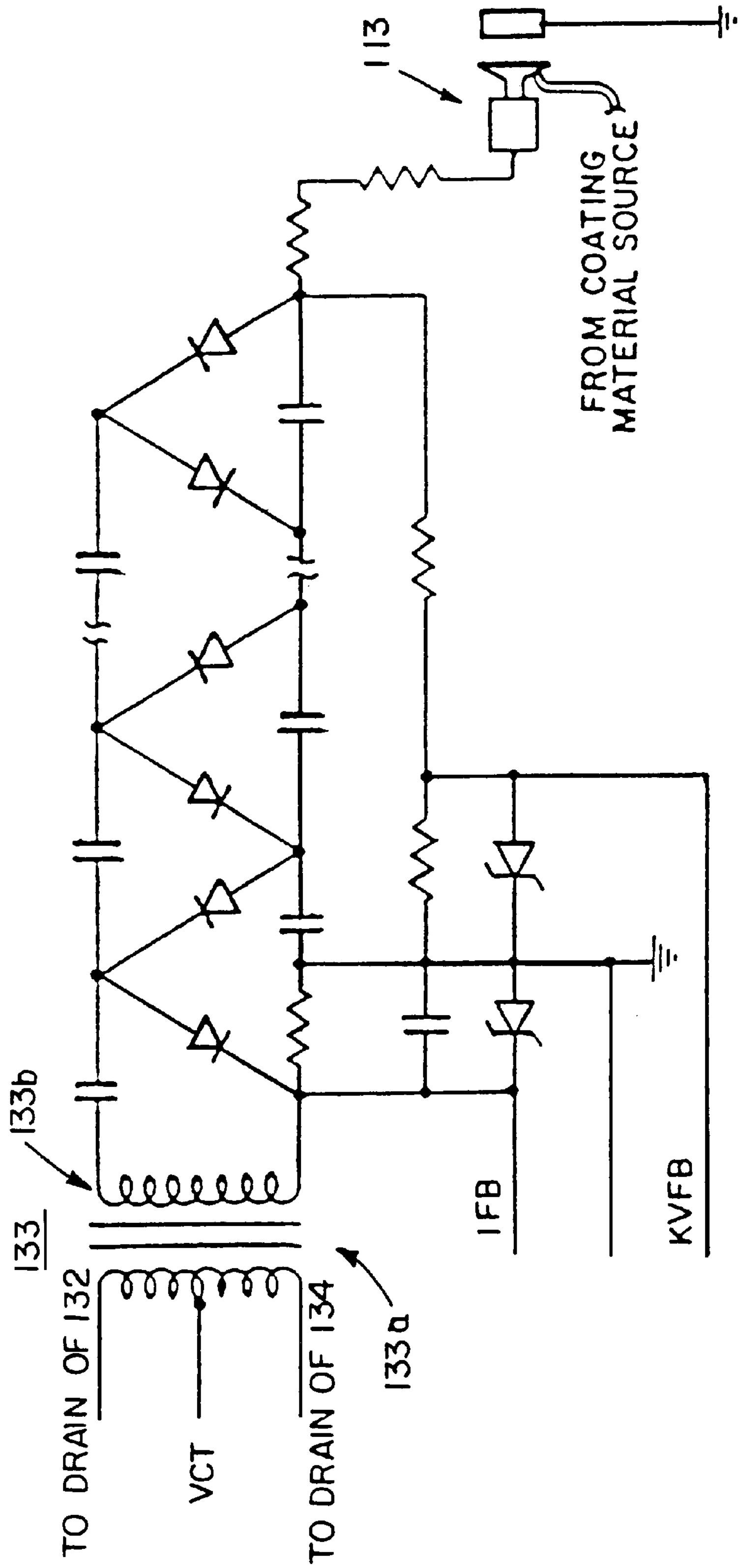

The output printed circuit board, FIG. 5, includes: a buffer amplifier 114 which receives the IFB signal and outputs the buffered IFB signal to the μP 40 and to an analog slope control circuit 116; and, buffer amplifier 88 which receives the KVFB signal and outputs the buffered KVFB signal to the μP 40, to the analog slope control circuit 116, and to one throw 118*a* of a single pole, double throw primary/secondary feedback select switch 118. The pole 118*b* of the switch 118 is coupled through a scaling amplifier 120 to the FeedBack terminal of the VCT regulator 86. The output board also includes a KV Set input to the VCT regulator 86. The output terminal of the VCT regulator 86 is coupled through a buffer 122 to the center tap 108 of the primary winding of the high magnitude potential transformer. This terminal is also coupled through a scaling amplifier 124 to the remaining throw 118*c* of feedback select switch 118. Thus, the operator has the ability to select 118*b* the source of the voltage feedback signal to the voltage feedback input terminal of the VCT regulator 86 the operator can select either the VCT input voltage, appropriately scaled by amplifier 124 appearing at terminal 118*c*, or the high magnitude potential supply's output voltage, KVFB appearing at terminal 118*a*. The output printed circuit board also includes the VCT shutdown switch 84 which disables the VCT regulator 86 by switching the COMPensating input terminal of the VCT regulator 86 in response to the Corona SSeNSe A signal from the μP 40. The output board also includes the phase locked loop high magnitude potential supply oscillator 112, with its Phase Lock ENable and Phase Lock FeedBack inputs and its amplified 132, 134 outputs A and B to the two ends of the high magnitude potential supply's input transformer 133 primary winding 133*a* (FIG. 8).

Figure 6A:
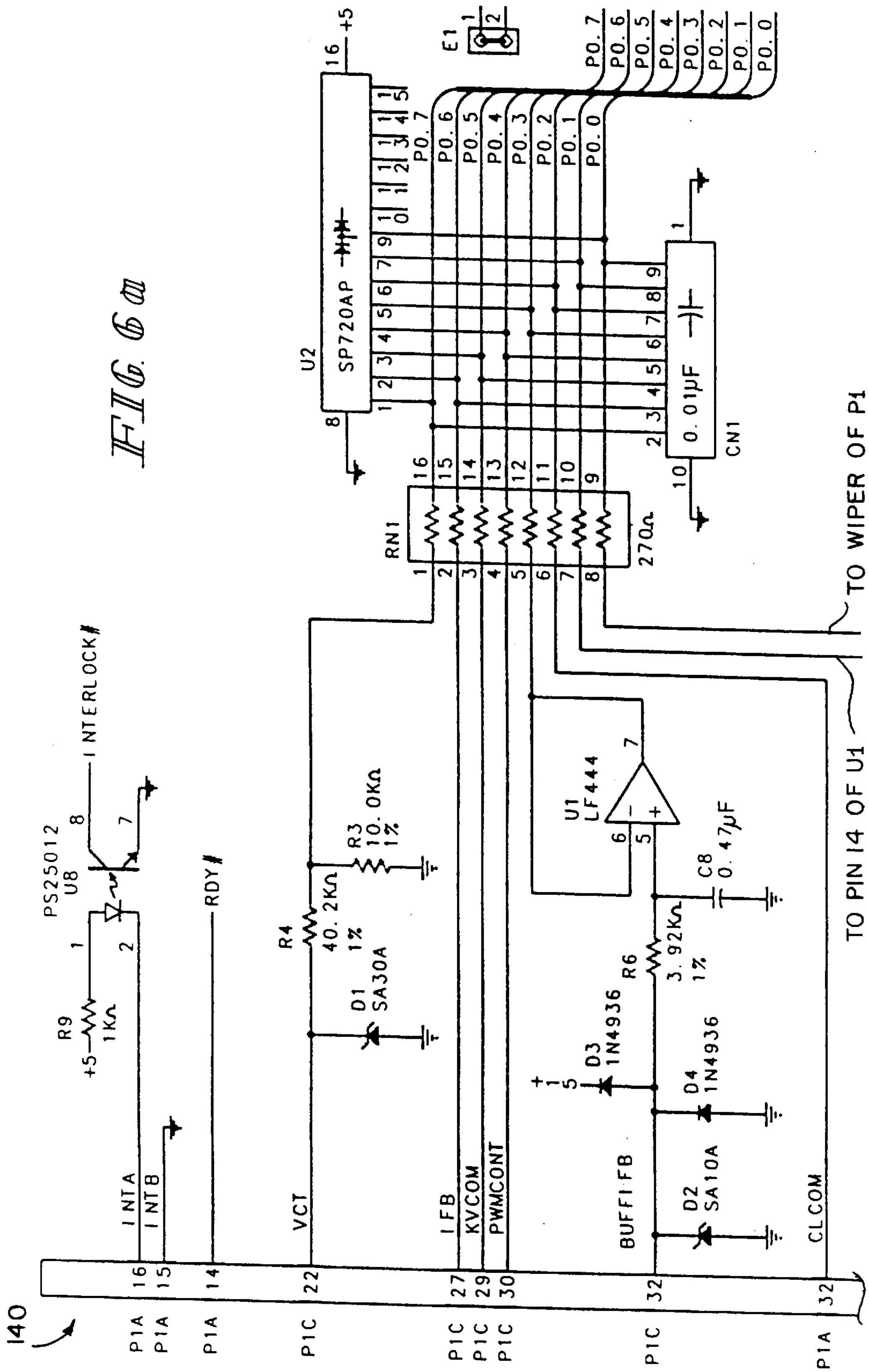
Figure 6B:
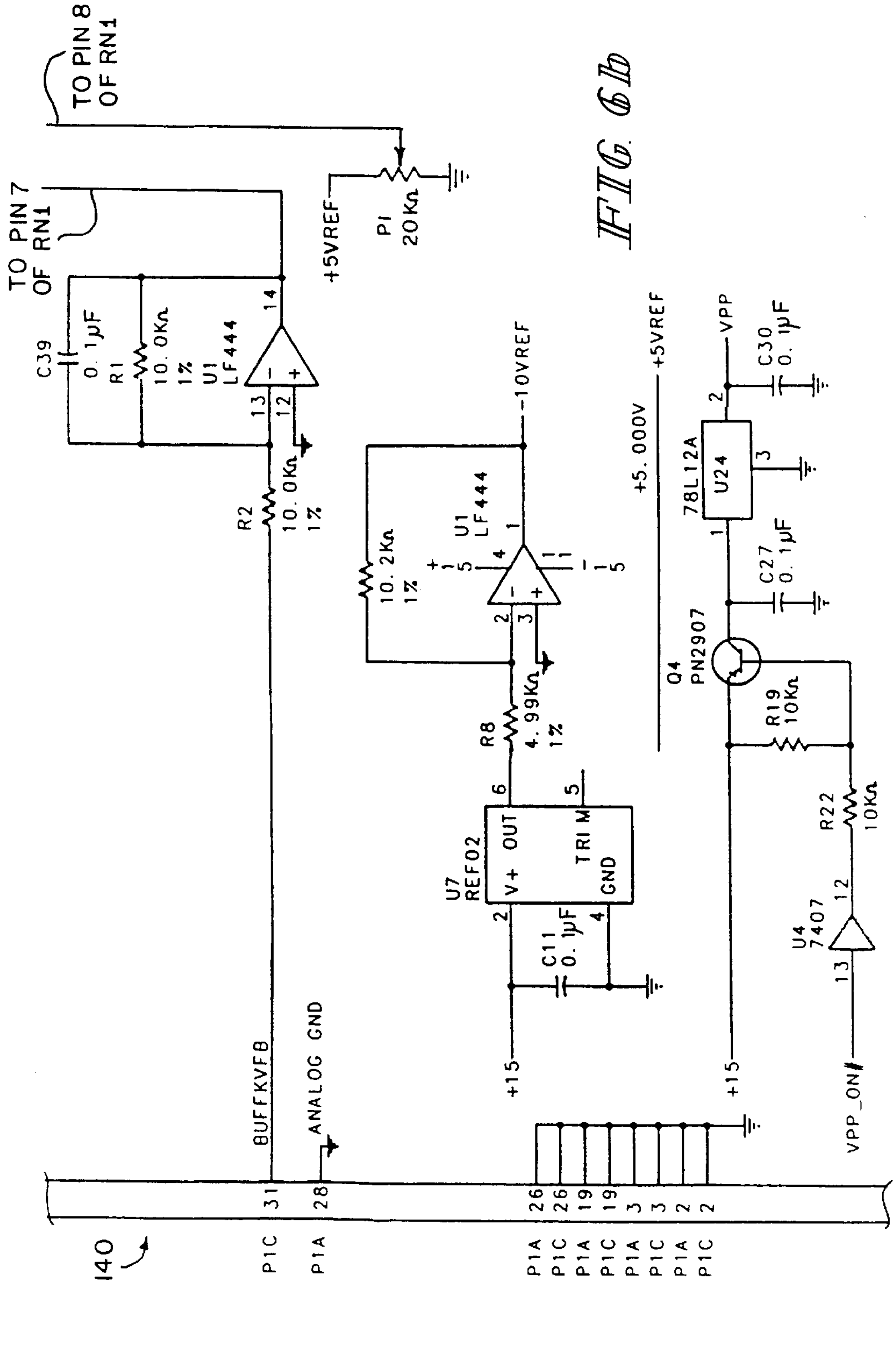
Figure 6C:
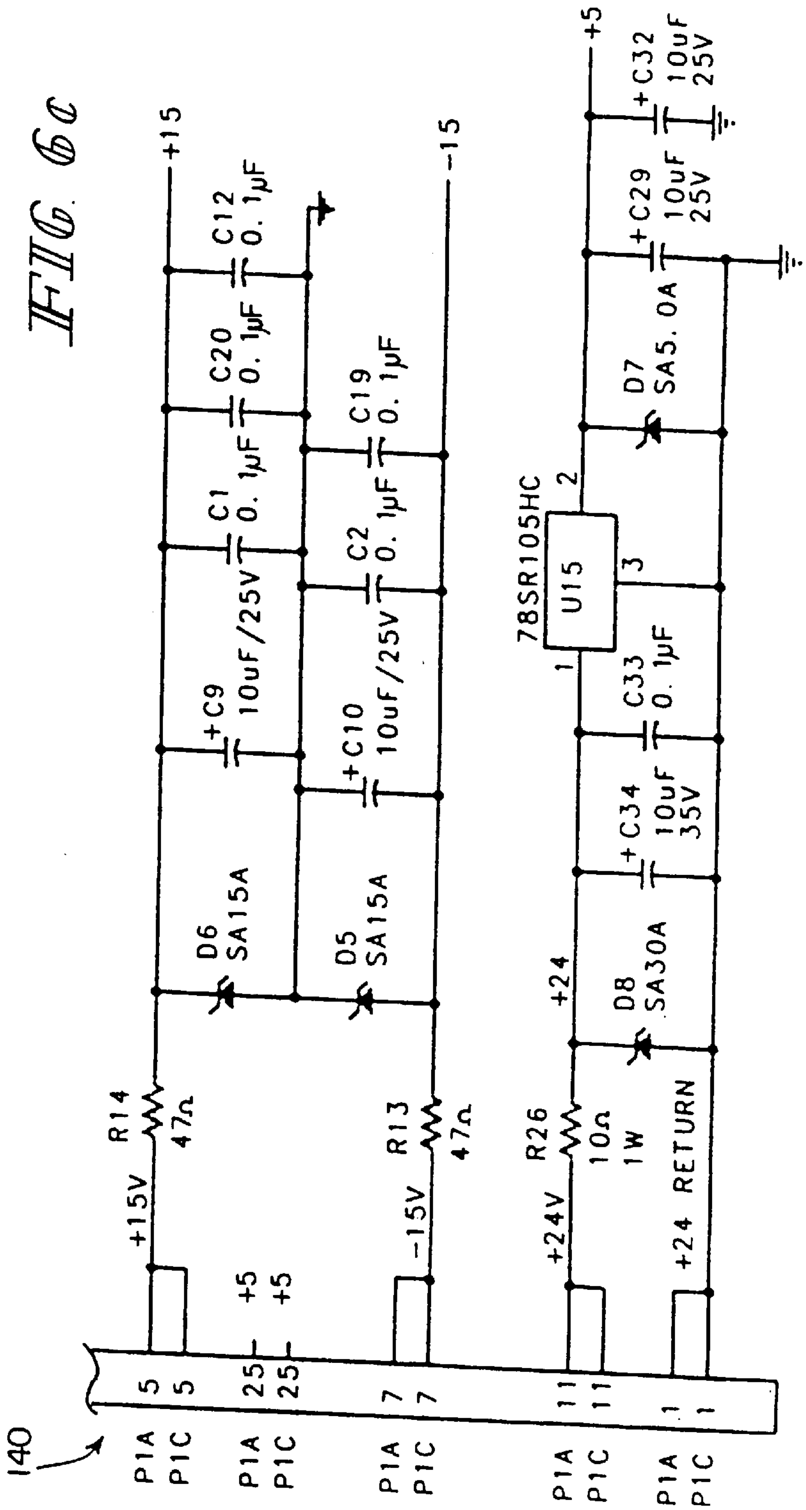
Figure 6D:
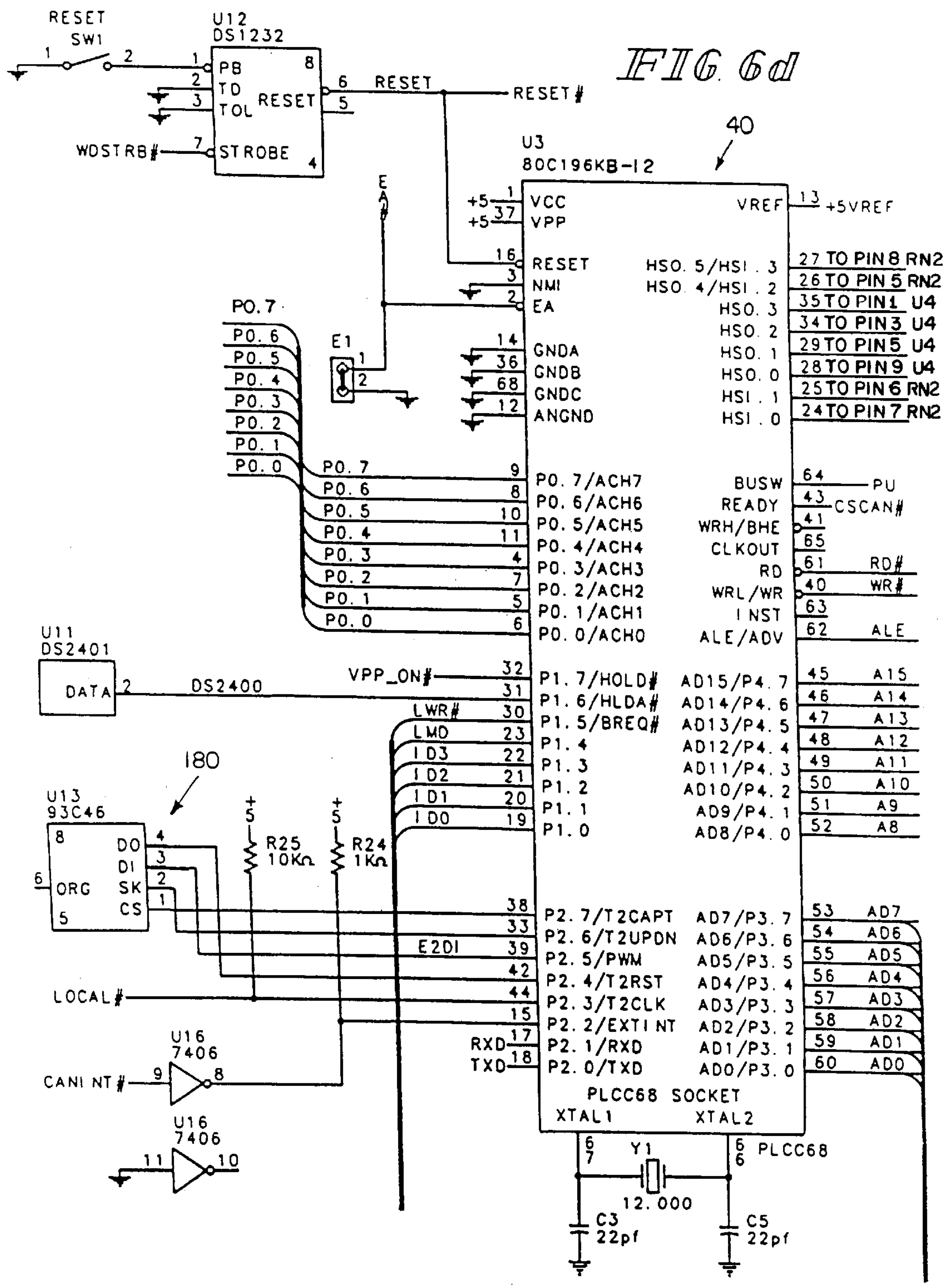
Figure 6E:
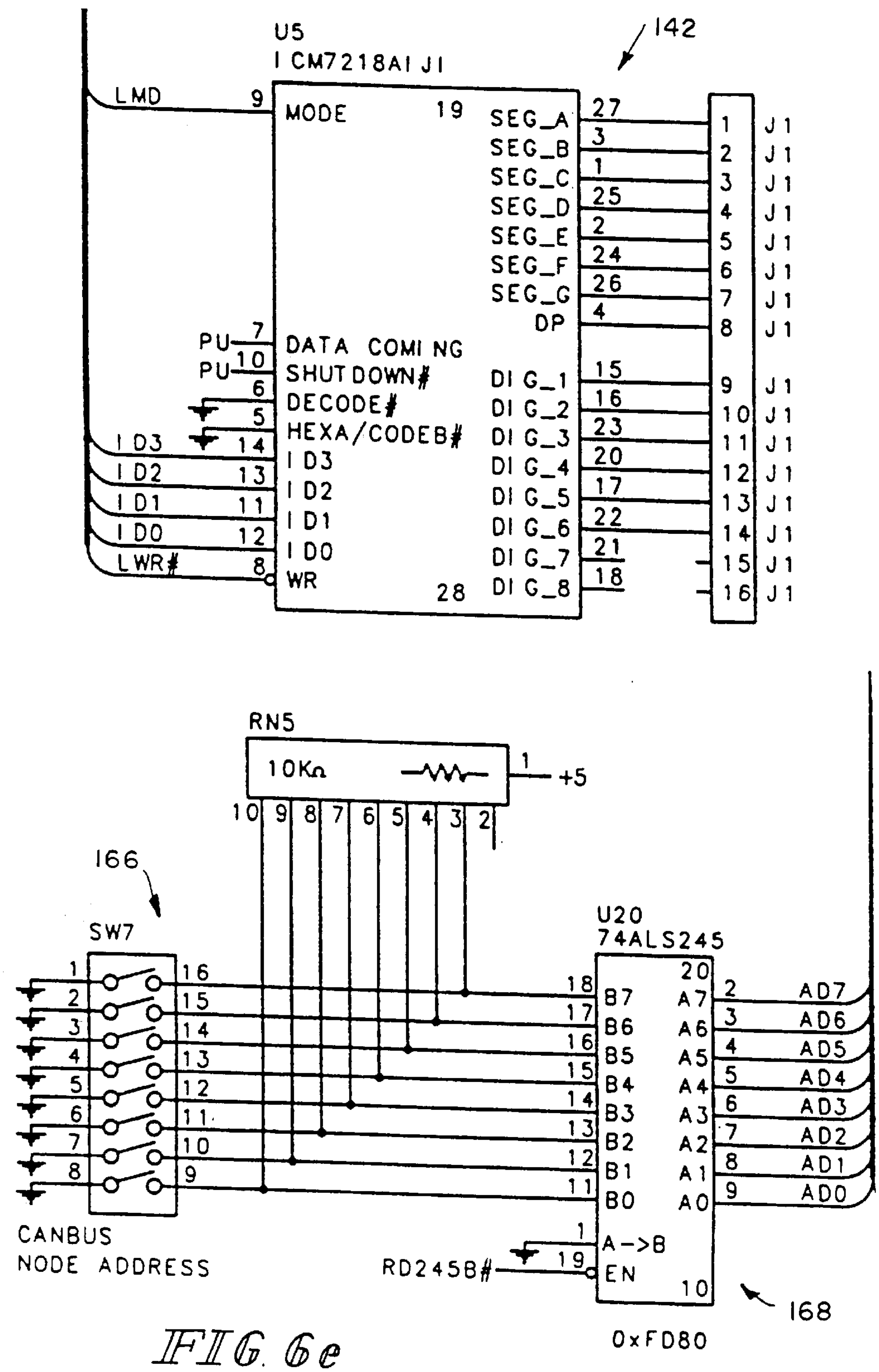

Turning now to FIGS. 6*a–i*, the partly block and partly schematic diagrams of the process board of the illustrated system, signals and operating potentials are coupled to and from the system's internal bus 140, FIGS. *6a–c*. μP 40 includes an A/ID port 0, FIG. 6*d*, which receives from bus 140 the VCT, IFB, KVCOM, PulseWidth Modulation CONTrol, BUFFered IFB, CLCOM, and BUFFered KVFB signals from the bus 140. These signals are applied through input circuitry including 270 Ω—0.01 μRC circuits and back-to-back diode protection circuits to the P0.7–P0.1 terminals, respectively, of port 0. Display 100 is driven by a display driver 142, FIG. 6*e*, coupled between port 1 of μP 40 and display 100. Specifically, the P1.0–P1.5 terminals of μP 40 are coupled to the 1D0–1 D3, MODE, and Write terminals, respectively, of display driver 142. Display driver 142 illustratively is a type I CM7218A1 J1 display driver.

Figure 6F:
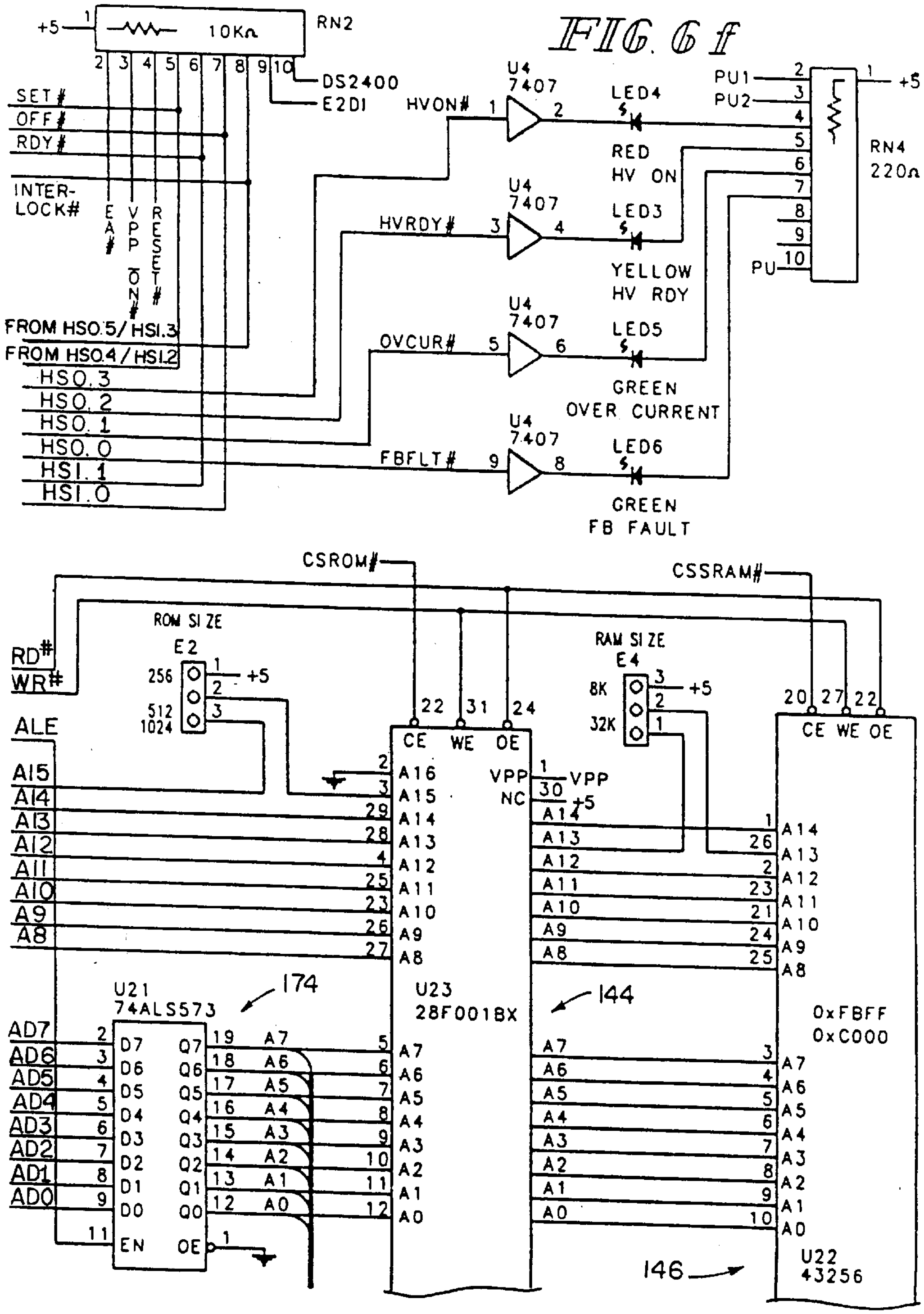
Figure 6G:
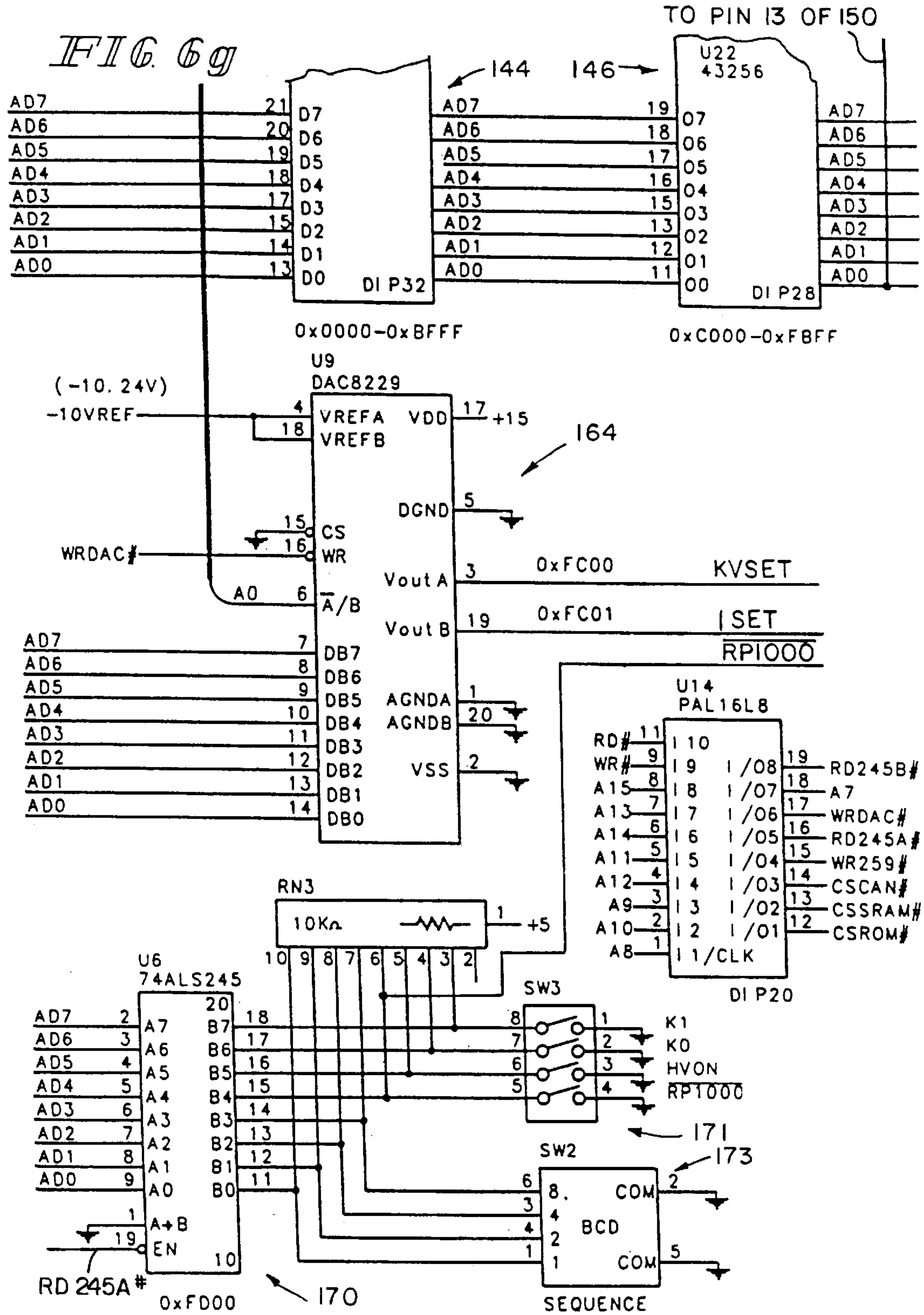
Figure 6H:
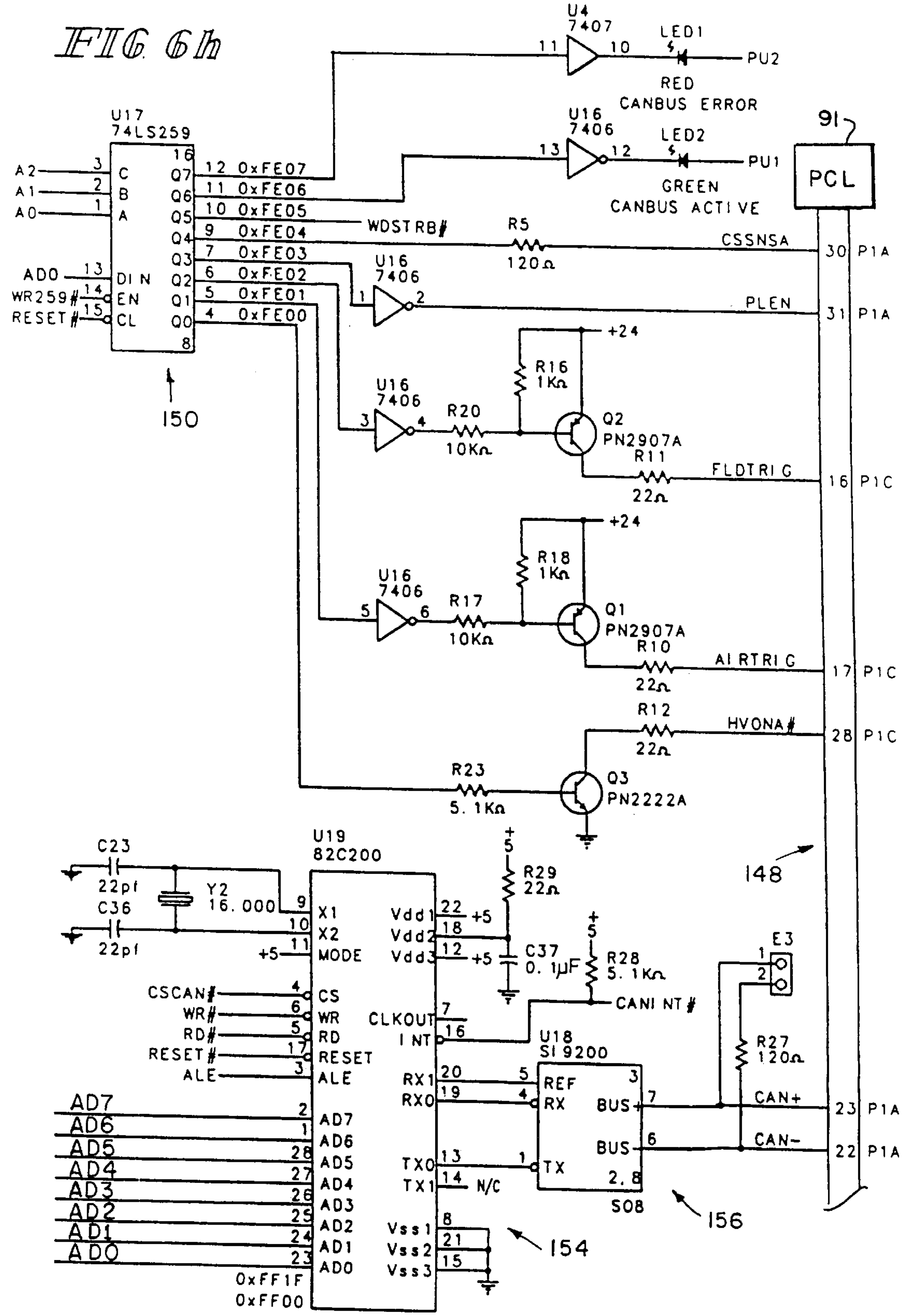
Figure 6I:
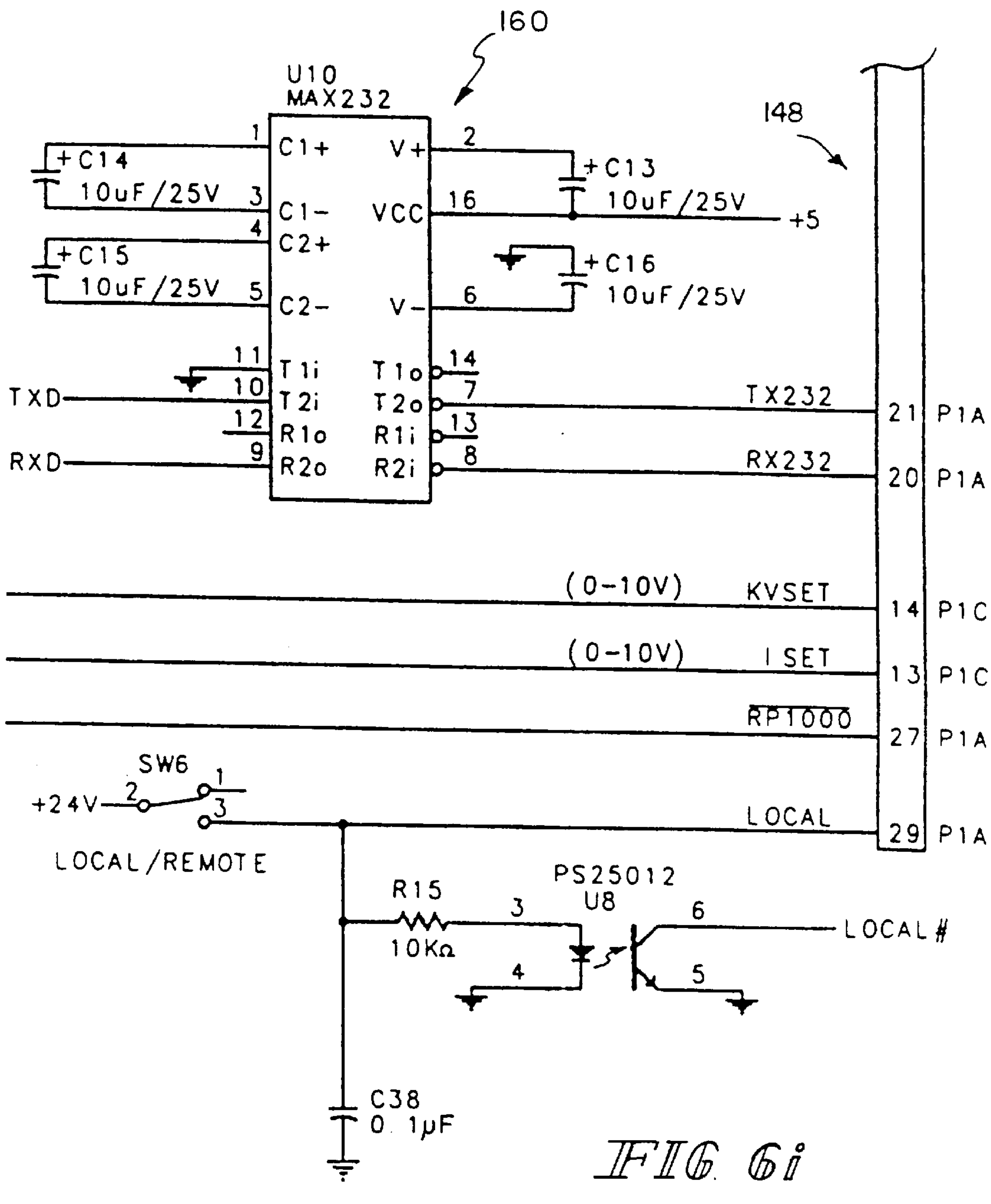

The program executed by μP 40 is stored in an EPROM 144, FIGS. 6*f–g*. A static RAM 146 provides storage for the calculations made by μP 40, as well as for data passed back and forth to and from a bus 148. EPROM 144 illustratively is a type 28F001BX EPROM. SRAM 146 illustratively is a type 43256 SRAM. The CANBUS I/O 102 includes a three-to-eight demultiplexer 150, FIG. 6*h*, whose outputs Q4–Q0 drive, among other things, the Corona SSeNSe A, Phase Lock ENable, FLuiD TRIGger, AIR TRIGger, and HVON A# lines, respectively, of the bus 148. Demultiplexer 150 illustratively is a type 74LS259 demultiplexer. The CANBUS I/O 102 also includes a serial-to-parallel/parallel-to-serial converter 154 and bus driver 156. The CAN+ and CAN− terminals of bus 148 are coupled to the BUS+ and BUS− terminals, respectively, of bus driver 156. The RX1 and RX0 terminals, respectively, of the S-P/P-S converter 154 are coupled to the REFerence and RX terminals, respectively, of the bus driver 156. The TX0 terminal of S-P/P-S converter 154 is coupled to the TX terminal of bus driver 156. S-P/P-S converter 154 illustratively is a type 82C200 S-P/P-S converter. The I/O functions include provisions for an RS232 interface. Consequently, the I/O also includes an RS232-toTTL/TTL-to-RS232 interface 160, FIG. 6*i*. The TXD and RXD lines, terminals P2.0 and P2.1, respectively, of μP 40 are coupled to the T2*i* and R2*o* terminals, respectively, of interface 160. The T2*o* and R2*i* terminals of interface 160 are coupled to the TX232 and RX232 lines, respectively, of the bus 148. Interface 160 illustratively is a type MAX232 interface.

Analog signals to the output board, FIGS. 7*a–f*, are generated by a D/A converter 164, FIG. 6*g*, whose input port DB0–DB7 is coupled to the P3.0–P3.7 terminals, respectively, of μP 40 via the system AD0–AD7 lines, respectively. The Vout A and Vout B terminals of D/A converter 164 form the KVSET and I SET lines, respectively, of the bus 148. D/A converter 164 illustratively is a type DAC8229 D/A converter. The node address of μP 40 on the CANBUS is established by an octal switch 166 and 10 KΩ pull-down resistors coupled via an octal latch 168 to the system AD0–AD7 lines. Octal latch 168 illustratively is a type 74ALS245 octal latch. The system is designed to control a number of different types of power supplies, some using high-Q high magnitude power supply input transformers 133 as taught in U.S. Pat. No. 5,159,544, and some using relatively lower-Q high magnitude power supply input transformers 133. The system needs to be able to identify the type of power supply it is controlling. A line, notRP1000 identifies the power supply being controlled by the illustrated system as one having a high-Q input transformer 133 or not. This line of the bus 148 instructs one bit of input to μP 40 via one switch of a quad switch 171. Another switch of quad switch 171 is the system's manual HV On switch. Another quad switch 173 controls the system's initialization sequence. These switches are coupled via an octal latch 170 to the system AD0–AD7 lines. Latch 170 illustratively is a type 74ALS245 octal latch. The AD0–AD7 lines are also coupled to the D0–D7 terminals, respectively, of EPROM 144, the O0–O7 terminals, respectively, of SRAM 146, and the AD0–AD7 terminals, respectively, of P-S/S-P converter 154.

The AD0–AD7 lines are also coupled to the D0–D7 lines, respectively, of a buffer/latch 174, FIG. 6*f*. The output terminals Q0–Q7 of buffer/latch 174 are coupled to the system A0–A7 lines, respectively. Buffer/latch 174 illustratively is a type 74ALS573 buffer/latch. The system A0–A7 lines are coupled to the A0–A7 terminals of EPROM 144, respectively, and to the A0–A7 terminals of SRAM 146, respectively. The P4.0–P4.7 terminals of μP 40 are coupled via the system A8–A15 lines, respectively, to the A8–A15 terminals, respectively, of EPROM 144, and the A8–A14 lines are also coupled to the A8–A14 terminals of SRAM 146, respectively. High Voltage On, High Voltage ReaDY, OverCURrent and FeedBack FauLT status is indicated to the operator by, among other things, LEDs coupled through appropriate amplifiers to respective ones of the HS0.3, HS0.2, HS0.1, HS0.0 terminals of μP 40. An EEPROM 180, FIG. 6*d*, containing initializing parameters for the μP 40 has its DO, DI, SK and CS terminals, respectively, coupled to the μP 40's P2.4–P2.7 terminals. EEPROM 180 illustratively is a type 93C46 EEPROM. CANBUS ACTIVE and CANBUS ERROR status is indicated by, among other things, LEDs coupled through appropriate amplifiers, FIG. 6*h*, to the Q6 and Q7 terminals, respectively, of demultiplexer 150.

Figure 7A:
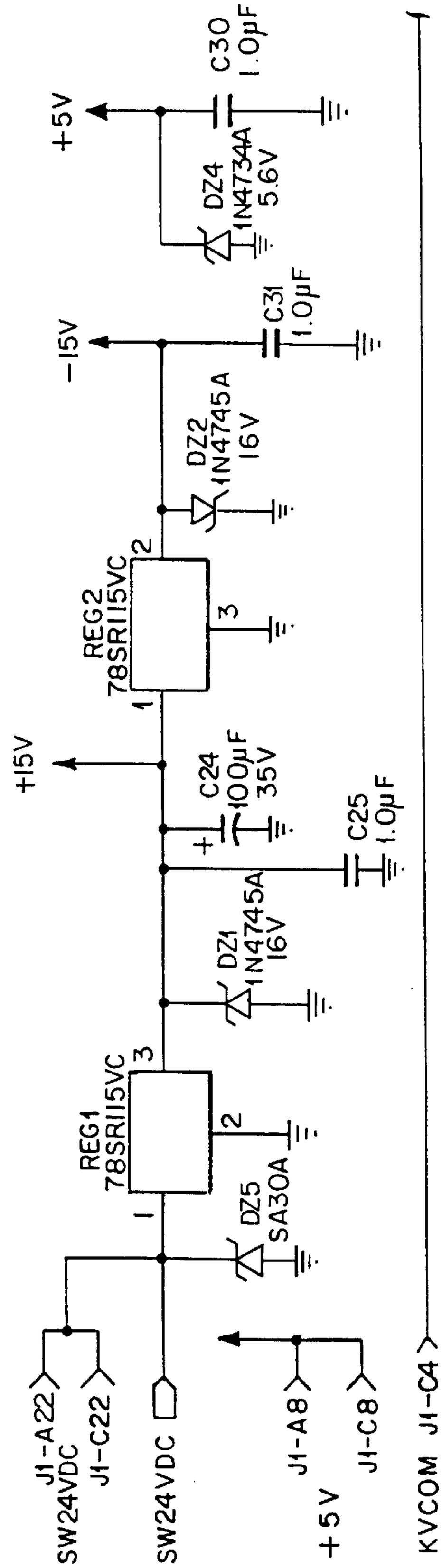
Figure 7B:
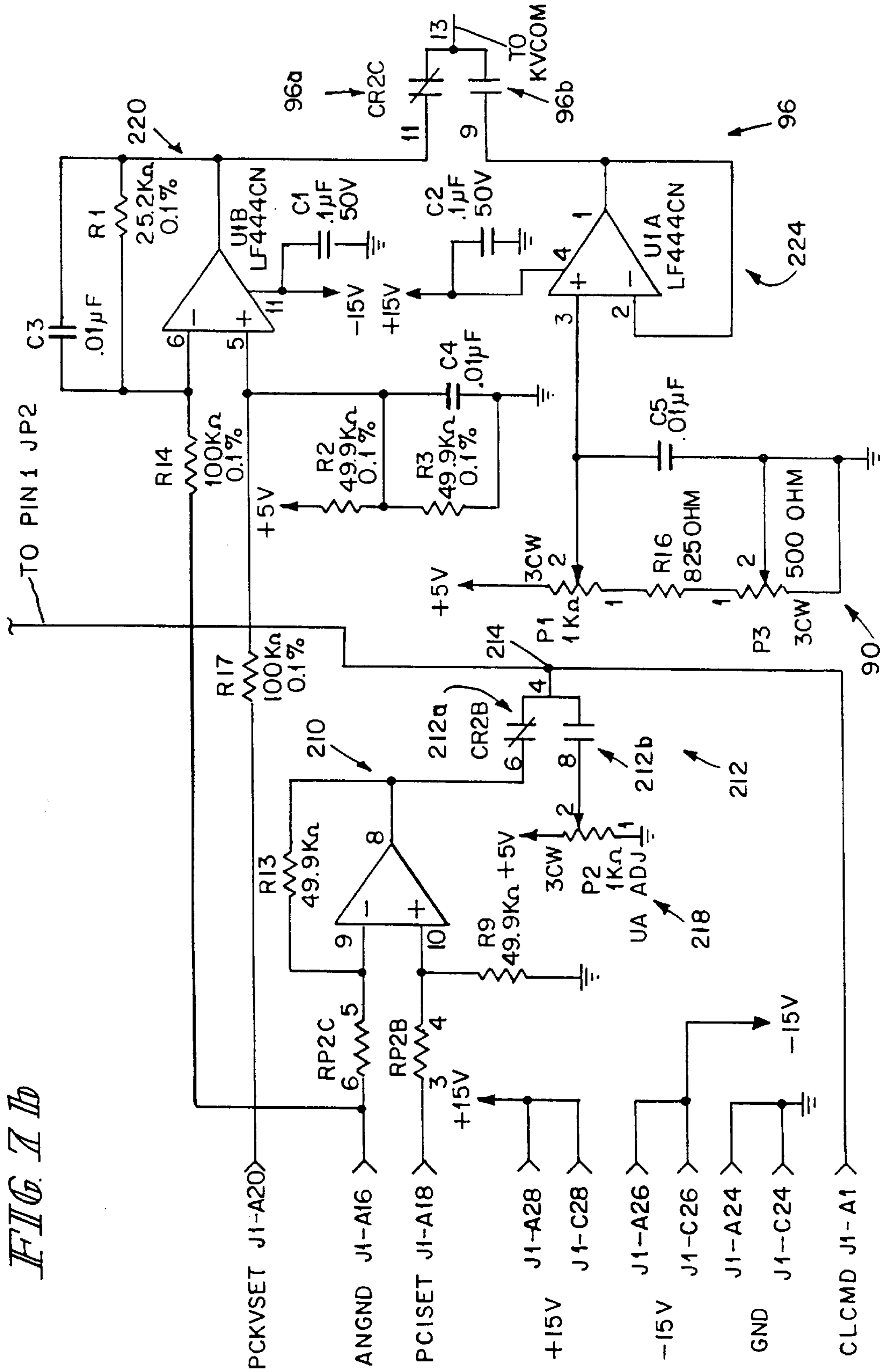
Figure 7C:
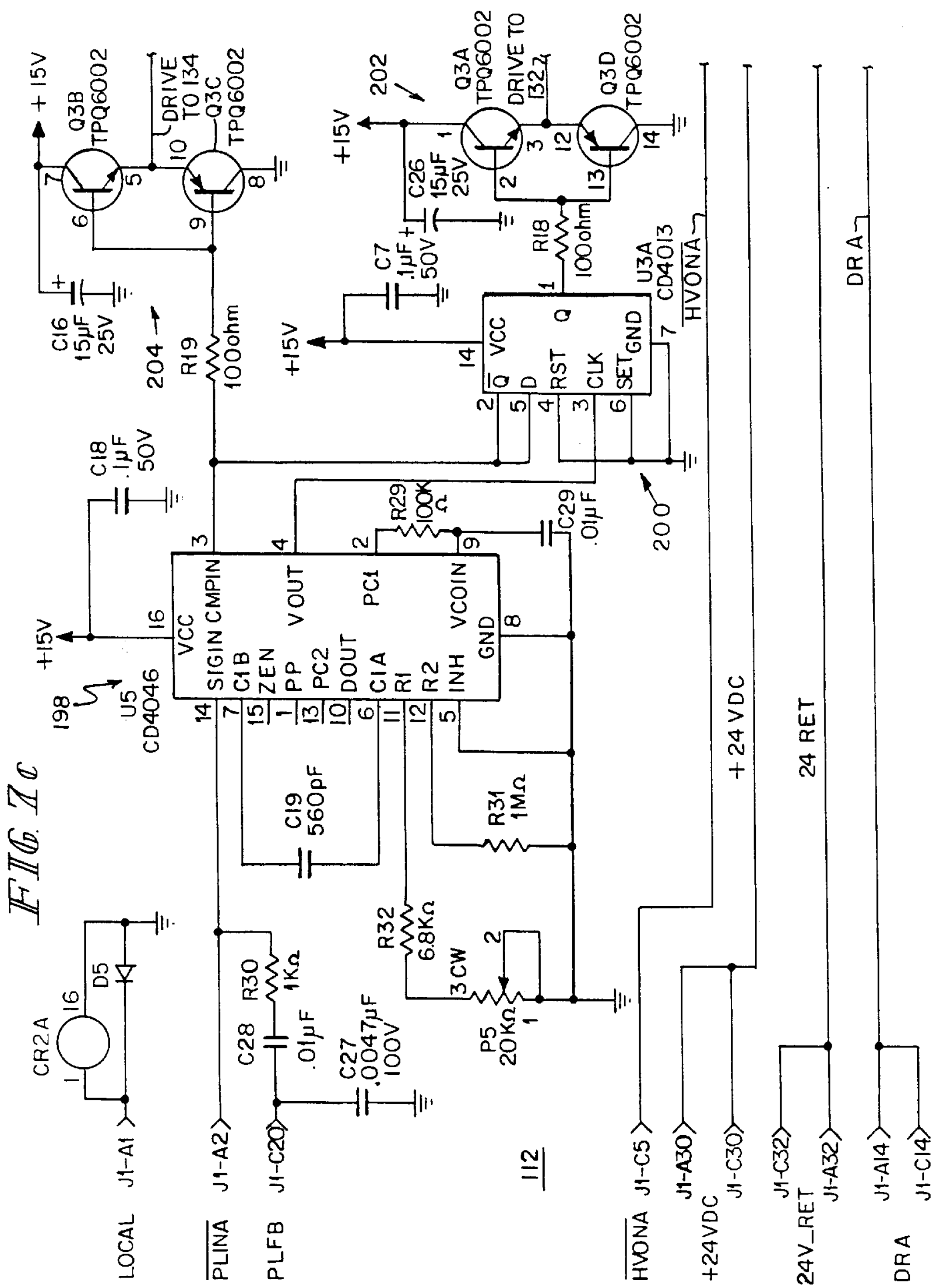
Figure 7D:
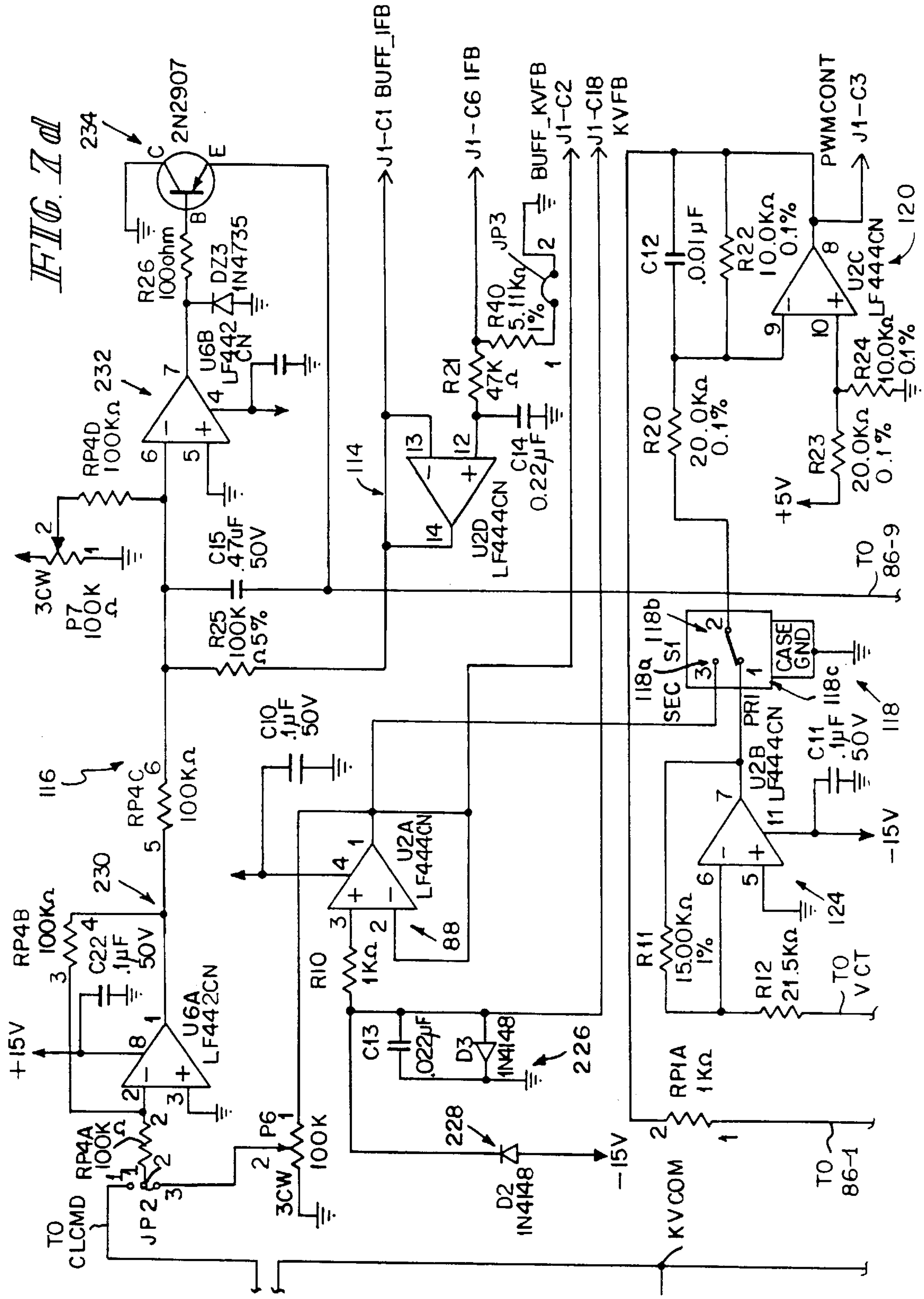
Figure 7E:
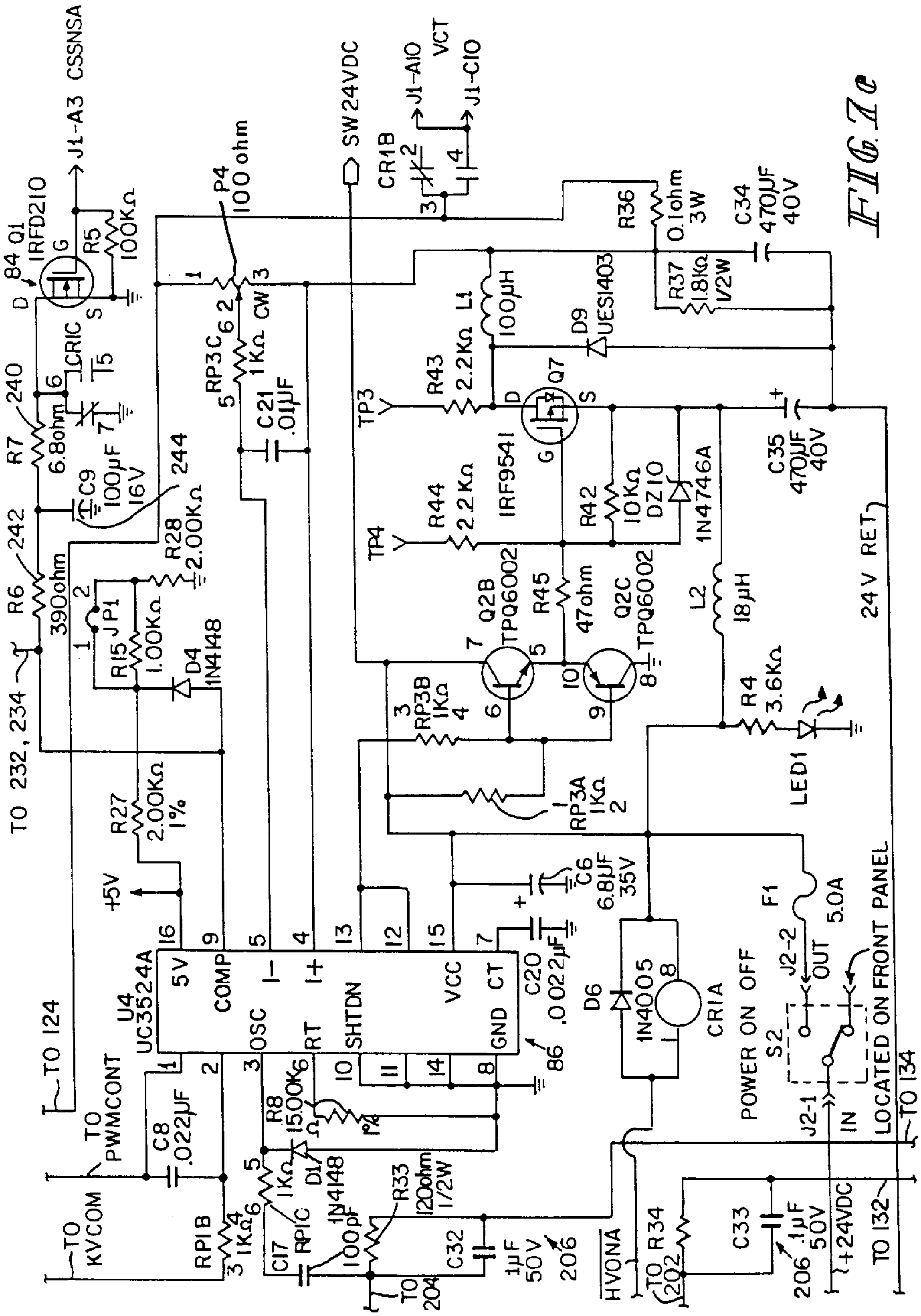
Figure 7F:
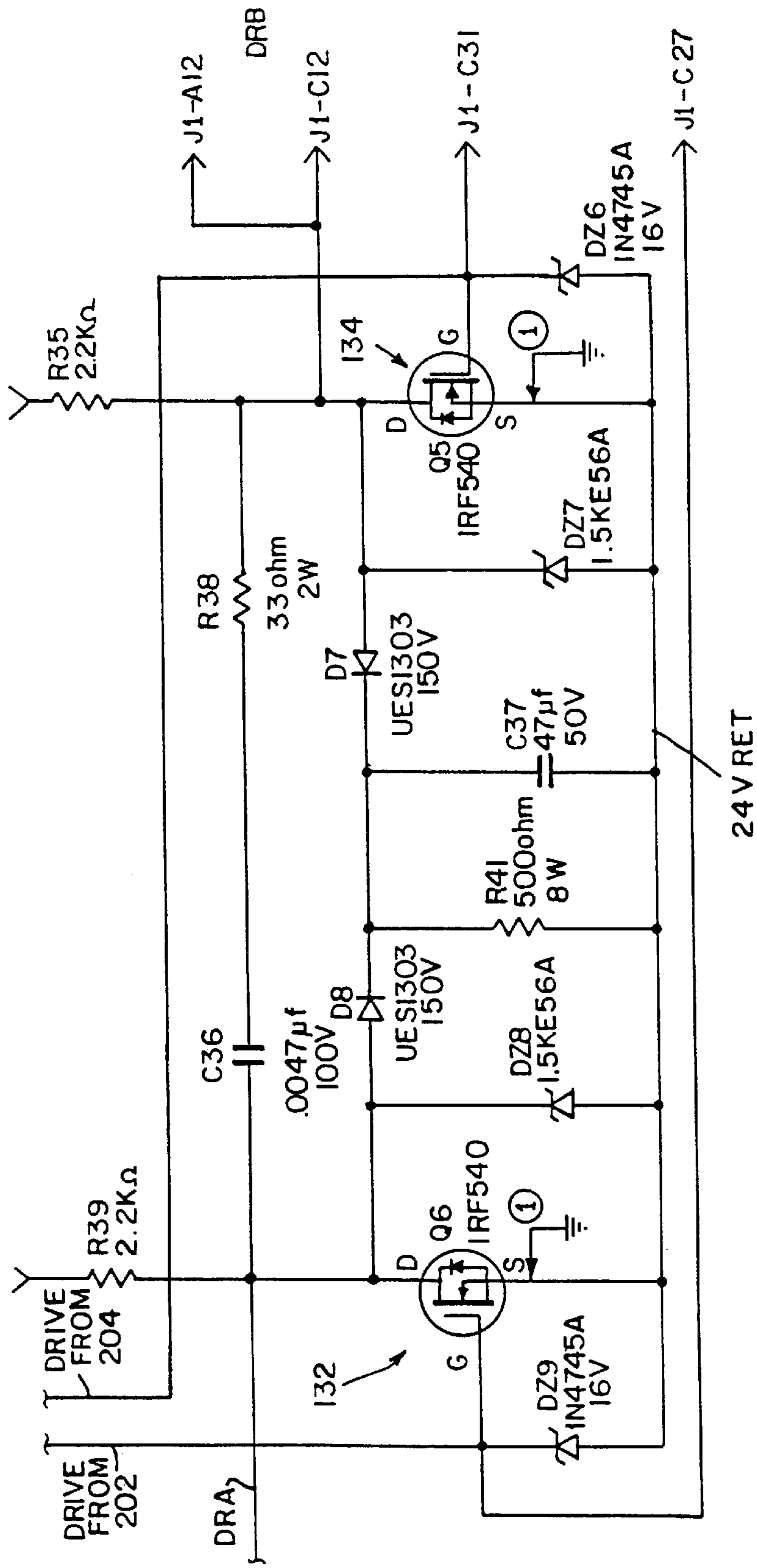

Referring now to FIGS. 7*a–f*, the output board includes a phase locked loop IC 198, FIG. 7*c*,and the A and B drive transistors 132, 134, FIG. 7*f*. The SIG IN input to the PLL IC 198 is the PhaseLock FeedBack signal shaped by an RC circuit including a 0.0047 μF capacitor to ground and the series combination of a 0.1 μF capacitor and a 1 KΩ resistor. The SIG IN input terminal of PLL IC 198 is also coupled to the not Phase Lock IN A signal line. PLL IC 198 illustratively is a type CD4046 PLL IC. Transistors 132, 134 illustratively are type IFR540 FETs. The drive signal for transistor 132 is output from the VOUT terminal of the PLL IC 198 to the ClocK input terminal of a D flip-flop 200. The oppositely phased Q and notQ outputs of DFF 200 are coupled to two push-pull configured predriver transistor pairs 202, 204, respectively, the outputs of which are coupled through respective wave-shaping parallel RC circuits 206 to the gates of the respective A and B drive transistors 132, 134. The drains of the respective A and B drive transistors 132, 134 are coupled to the opposite ends, the Drive A and Drive B terminals, respectively, of the primary winding 133*a* of the input transformer 133 of the high magnitude potential supply, FIG. 8. The sources of transistors 132, 134 are coupled to the system's +24 VDC ground RETurn. D FF 200 illustratively is a type CD4013 D FF. Transistor pairs 202, 204 illustratively are type TPQ6002 transistor pairs. The remainder of the PLL circuit is generally as described in U.S. Pat. No. 5,159,544.

Turning to FIG. 7*b*, the PC I SET signal, the current setting coming over to the system from the PLC 91, is coupled through a 100 KΩ input resistor to the non-inverting (+) input terminal of a difference amplifier 210. The + input terminal of amplifier 210 is coupled through a 49.9 KΩ resistor to ground. The Analog GrouND line of the system bus is coupled through a 100 KΩ input resistor to the inverting (−) input terminal of amplifier 210. The − input terminal of amplifier 210 is through a 49.9 KΩ feedback resistor to its output terminal. The output terminal of amplifier 210 is coupled through a normally closed pair 212_a_ of relay 212 contacts to a terminal 214. The normally open pair 212_b_ of contacts of relay 212 is coupled across terminal 214 and the wiper of a 1 KΩ potentiometer 218. This arrangement permits the operator to select either PLC 91 control of the current setting of the system or front panel control of the current setting via potentiometer 218.

A similar configuration including an amplifier 220 permits the system operator to select either PLC 91 control of the desired output high potential magnitude of the high magnitude potential supply. The PC KV SET signal line is coupled through a 100 KΩ input resistor to the + input terminal of amplifier 220. Series 49.9 KΩ resistors between +5 VDC supply and ground bias the – input terminal of amplifier at +2.5 VDC. Analog GrouND is coupled through a 100 KΩ resistor to the – input terminal of amplifier 220. An RC parallel feedback circuit including a 25.5 KΩ resistor and a 0.01 μF capacitor is coupled across the – input terminal and the output terminal of amplifier 220. The output terminal of amplifier 220 is coupled through the normally closed terminals 96_a_ of a relay 96 to the KV COMmanded line of the system bus. This signal is alternately selectable at the operator's option with a DC voltage established on the + input terminal of a buffer amplifier 224. This DC voltage is established on the wiper of a 1 KΩ potentiometer 90. Potentiometer 90 is in series with an 825 Ω resistor and a 500 Ω potentiometer between +5 VDC and ground. The wiper of the 500 Ω potentiometer is also coupled to ground so that the 825 Ω resistor and the setting of the 500 Ω potentiometer establish the minimum output high magnitude potential settable by the operator at the system front panel. The output of amplifier 220 is selectively coupled across the normally open terminals 96_b_ of relay 96 to the KV COM line. Amplifiers 210, 220 and 224 illustratively are ¾ of a type LF444CN quad amplifier.

Referring now to FIG. 7_d_, the IFB signal from the system bus is coupled to the + input terminal of amplifier 114 via a 47 KΩ input resistor. A 0.22 μF capacitor is coupled between the + input terminal of amplifier 114 and ground. The output terminal of amplifier 114 is coupled to its – input terminal in buffer configuration, and forms the BUFFered IFB terminal which is coupled to the μP 40. The KVFB signal from the system bus is coupled to the + input terminal of amplifier 88 via a 1 KΩ input resistor. The + input terminal of amplifier 88 is clamped between +0.6 VDC and –15.6 VDC by diodes 226, 228 on its + input terminal. The output terminal of amplifier 88 is coupled to its –input terminal in buffer configuration, and forms the BUFFered KVFB terminal which is coupled to the μP 40. BUFFKVFB is also coupled to terminal 118_a_ of PRImary/SECondary FeedBack switch 118. Terminal 118_b_ of switch 118 is coupled to the –input terminal of scaling amplifier 120 via a 20 KΩ series resistor. The + input terminal of amplifier is biased at +5/3 VDC by a series 20 KΩ–10 KΩ voltage divider. The output terminal of amplifier 120, which forms the PulseWidth Modulator CONTrol line of the system bus, is coupled through a 1 KΩ series resistor to the control input terminal, pin 1, of a switching regulator IC VCT regulator 86. VCT appears across the I+ output terminal, pin 4, of IC 86 and ground. VCT is fed back through series 0.1 Ω, 5 W and 21.5 KΩ resistors to the – input terminal of scaling amplifier 124. The output terminal of amplifier 124 is coupled to its – input terminal through a 15 KΩ feedback resistor, and to terminal 118_c_ of switch 118. Amplifiers 88, 114, 120 and 124 illustratively are a type LF444CN quad amplifier. VCT regulator IC 86 illustratively is a type UC3524A switching regulator.

The analog slope control circuit 116 includes a difference amplifier 230, a difference amplifier 232 and a transistor 234. The – input terminal of amplifier 230 receives the BUFFKVFB signal via the wiper of a 100 KΩ potentiometer and a series 100 KΩ resistor from the output terminal of amplifier 88. A 100 KΩ feedback resistor is coupled between the output terminal and the – input terminal of amplifier 230. The output terminal of amplifier 230 is coupled through a 100 KΩ resistor to the – input terminal of amplifier 232. BUFFIFB is also coupled to the – input terminal of amplifier 232 through a 100 KΩ resistor. The – input terminal of amplifier 232 is biased negative via a 100 KΩ resistor to the wiper of a 100 KΩ potentiometer in series between –15 VDC and ground. The output terminal of amplifier 232 is coupled through a 100 Ω resistor to the base of transistor 234. The collector of transistor 234 is coupled to ground and its emitter is coupled to the COMPensate terminal of IC 86. Amplifiers 230, 232 illustratively are a type LF442CN dual amplifier. Transistor 234 illustratively is a type 2N2907 bipolar transistor.

Referring again to FIG. 7_e_, the system bus Corona SSeNSe A terminal is coupled to the gate of the VCT shutdown switch 84, and to ground through a 100 KΩ resistor. The drain of switch 84 is coupled through series 6.8 Ω and 390 Ω resistors 240, 242, respectively, to the COMP terminal of IC 86. A 100 μF smoothing capacitor 244 is coupled between the junction of these resistors and ground. The pulsewidth modulated output Corona SSeNSe A signal from μP 40 to the gate of switch 84 results in a DC voltage across capacitor 244. This voltage is summed at the COMP terminal of IC 86 with the output signal from the analog slope control circuit 116. This signal can be provided to the COMP terminal of IC 86 in other ways. For example, μP 40 has a D/A output port. The output signal on the μP 40's D/A output port provides an even smoother signal than the Corona SSeNSe A output signal filtered by the filter 240, 242, 244 to the COMP terminal of IC 86. Using the pulsewidth modulated Corona SSeNSe A output signal from μP 40, filtered by filter 240, 242, 244, or the D/A port of the μP 40, permits added flexibility in applications in which more than one dispensing device 113 is coupled to system. For example, in a single applicator 113 situation, a delay of, for example, one-half second before the achievement of full high magnitude potential can be tolerated by the system. Where multiple applicators 113 are coupled to a common high magnitude potential supply, however, attempting to raise the high magnitude potential to its full commanded value too rapidly can result in charging current greater than the static overload current I SET. μP 40 gives the operator the flexibility to ramp the high magnitude potential up to full commanded value KV SET more slowly in these situations, resulting in fewer "nuisance" overcurrent conditions. Additionally, the slower ramping up to full commanded high voltage eases the stress on the high voltage cables which customarily couple the high magnitude supply to the coating dispensing devices 113. The OSCillator terminal of IC 86 is coupled through a series 1 KΩ resistor and 100 pF capacitor to the common emitters of transistor pair 204. Switch 84 illustratively is a type IRFD210 FET. IC 86 and its associated components function generally as described in U.S. Pat. No. 4,745,520.

A source code listing of the program executed by μP 40 is attached hereto as Exhibit A.

```
 Volume in drive D has no label
 Volume Serial Number is 2146-0EF4
 Directory of D:\TEMP\PROC\3a01

APP      C          35,997  09-24-97   3:49p APP.C
DEBUG    C          41,818  09-17-97   7:31p DEBUG.C
E2PROM   C          18,828  07-17-97   4:50p E2PROM.C
FILTER   C           5,175  05-27-96  10:55a FILTER.C
HW       C          30,236  09-04-97   9:27a HW.C
INIT     C          10,248  07-17-97   4:48p INIT.C
IO       C          22,591  08-19-95  12:23p IO.C
LOG      C           3,669  08-13-95  11:15a LOG.C
MAIN     C          18,020  09-04-97  10:40a MAIN.C
MONITOR  C          15,183  09-24-97   3:06p MONITOR.C
MSGS     C          10,242  09-17-97   7:25p MSGS.C
RTC      C          16,409  09-17-97   6:57p RTC.C
RXBUF    C           8,435  08-13-95  11:31a RXBUF.C
RXTX     C           4,972  08-13-95   4:02p RXTX.C
SIO      C          31,741  09-18-96   3:48p SIO.C
TXBUF    C           8,122  08-30-95   4:57p TXBUF.C
UTIL     C          28,301  08-15-97  10:21a UTIL.C
```

EXHIBIT A

| | |
|---|---|
| Express Mail Label: | EM343389731US |
| Mailed: | October 16, 1997 |
| Applicant: | Daniel C. Hughey |
| Title: | POWER SUPPLY CONTROL SYSTEM |
| Docket: | 3030-29010 |
| Filed: | Herewith |
| Serial No.: | Unknown |

BARNES & THORNBURG
11 South Meridian Street
Indianapolis, Indiana 46204

App.c

```
/*
________________________________________________________________________
|
|
| CANbus MODULAR NODE - Application Specific Module
|
|
|
| File:     app.c
|
|
|
| Procedure defined in this module:
|
|   Decode_command()
|
|   Measure_inputs()
|
|   Update_outputs()
|
|   Update_display()
|
|   Restore_E2_defaults()
|
|
|
|
|
| Revision History:
|
| V2.0 10-09-95  Inverted PLEN bit per DCH.
|
| V2.1 11-14-95  Corrected error in FBFAULT logic,
|
|                Remove HV_OFF_status variable from logic.
|
|                Modified Measure_inputs() to compensate for IR loss
|
|                in cable.  Remove same from Update_display().
|
| V2.2 12-02-95  Added support for pulsing CSSNSA output when IFB
|
|                above threshold.
|
|                Added E2PROM support for CSSNSA variables
|
| V2.2 12-05-95  Added delay on assertion of FBK_FAULT
|
| V2.3 12-11-95  Moved assertion of CSSNSA pulse to rtc() to minimize
|
|                pulse width variations
```

```
|                  Changed CSSNSA logic to use BUFFIFB rather than IFB
| V2.4 01-31-96  Changed DIP switch to be fault disable options
|                  Made FB_FAULT_DELAY a variable
|                  Added RANSPAK 1000 support
| V2.6 09-18-96  Swapped HVON and HVOFF in Decode_command() to match
|                  bit order in PLC
| V2.6 09-18-96  Added HV_RST_status bit (used by msgs.c)
|                  Changed KV_set and I_set values in canbus to 16 bit
|                  Modified fault logic per 7/30/96 memo from DCH.
| V2.7 12-23-96  Added KV_ramp and KV_target to allow KV to ramp up
|                  in Ranspak 1000 mode.
|                  Modified Fbk fault logic per 12/13/96 memo from DCH.
|                  Changed SEQ_table[] per same memo.
| V2.7 01-03-97  IFB_treshold pulseing to ramp KV in RP1000 mode
| V2.8 02-11-97  Removed KV_ramp and KV_target since this ramping
|                  function is now done by CSSNSA pulsing
|                  Changed CLCOM overload multiplier to 1.3 (was 1.2)
|                  Changed K_table from 0,50,75,100 to 0,80,160,200
| V2.9 03-20-97  Major changes to convert ramping from KCOM to
|                  BUFFKVFB.
| V2.91 06-03-97 Changed feedback fault delay to 16 bits. RES
| V2.91 06-06-97 Added FB_fault_mask_timer  RES
| V2.92 06-09-97 Modified current limit test in 1.3x mode to use
|                  command + 15uA when command < 50 uA  RES
| V2.95 07-17-97 Literalized the E2PROM addresses, added restore_E2_
|
```

```
|                   defaults() RES
|
| V2.96 08-15-97  Added support for different E2 IFB thresholds for
|
|                 MicroPak and RansPak 1000 modes
|
|                 Added di/dt detection  RES
|
| V3.00 09-04-97  Added push button control for di/dt settings
|
| V3.00 09-15-97  Changed to mask di/dt in MicroPak mode  RES
|
| V3.01 09-17-97  Moved FB_fault_mask_timer here from rtc(). RES
|
|                 Cleaned up FB fault documentation.  Added flashing
|
|                 LED functions for DI_fault and ramp in process.
|
|                 Changed references from "MicroPak" to "HP404"
|
|
|
|____________________________________________________________________
|
*/

#include "common.h"                    /* common definitions        */
#include "board.h"                     /* hardware specific defines */
#include "crtio.h"                     /* define I/O function       */
#include "e2prom.h"                    /* define E2PROM addresses   */

#define  LED_ON_TIME        30         /* 150 msec ON */
#define  LED_OFF_TIME       60         /* 150 msec OFF */

/*------------- External Function References -------------------------*
/
extern void   Word_to_BCD(u_int input_word,char *ASCII_ptr);
extern u_char Get_node_ID(void);
extern u_char Get_set_switch(void);
extern u_char Get_HVON_switch(void);
extern u_char Get_uPAK_switch(void);
extern u_char Get_HVOFF_switch(void);
extern u_char Get_INT_switch(void);
extern u_char Get_RDY_switch(void);
extern u_char Get_DIP_switch(void);
extern u_char Get_SEQ_switch(void);
extern u_char Get_LOCAL_switch(void);
extern u_char Get_K_switch(void);
extern u_char Get_node_ID(void);
extern u_char Get_BCD_switch(void);
extern void   Set_LEDs(u_char LED, u_char on_flag);
```

App.c

```
extern void   Write_DAC(u_char channel, u_char value);
extern void   Write_LED(u_int kv, u_int i);
extern void   Write_LED_special(u_int value);
extern void   Leading_zero_suppression(u_char digits,char *ASCII_ptr);
extern void   Write_E2(u_char addr, u_int value);
extern u_int  Read_E2(u_char addr);
extern void   Enable_E2_write(void);
extern void   Send_status(void);
extern void   Watchdog(void);
extern void   Delay(u_char msec);

/*------------- External Variable References -------------------------*
/
extern u_char debug_enabled;
extern u_int  AD_buffer[10];
extern u_int  filter_average;
extern u_char number_of_filter_samples;
extern u_char PB_state;
extern u_char DI_entry;

/*------------- Public Variable Definitions --------------------------*
/
u_int  DA_buffer[2];
u_int  AD_buffer[10];

u_int  KV_set;
u_int  I_set;

u_char HV_RST_command;
u_char HV_ON_command;
u_char FLD_TRIG_command;
u_char AIR_TRIG_command;

u_char SEQ_timer;
u_char SEQ_state;
u_char HV_ON_sequencer;
u_char FLD_TRIG_sequencer;
u_char AIR_TRIG_sequencer;

u_char HV_ON_status;
u_char last_HV_ON_status;
u_char HV_RDY_status;
u_char HV_RST_status;
u_char FLD_TRIG_status;
u_char AIR_TRIG_status;
u_char SEQ_status;
u_char LOCAL_status;
u_char PLEN_status;
u_char CSSNSA_status;

u_char FB_fault;
```

```
u_char FB_fault_enabled;
u_int  FB_FAULT_DELAY;
u_int  FB_fault_timer;
u_int  FB_fault_mask_timer;
u_int  FB_FAULT_MASK_COUNT;

u_char DI_fault;
u_char DI_fault_enabled;
u_int  DI_delta;
u_long DI_sum;
u_int  DI_index;
u_int  DI_average;
u_int  last_DI_average;
u_int  number_of_DI_samples;
u_char DI_entry;

u_char OL_fault;
u_char OL_fault_enabled;

u_char HVON_LED_counter;
u_char OVCUR_LED_counter;

u_char CL_multiplier_enabled;

u_int  KV_display;
u_int  I_display;

u_char CSSNSA_pulse_timer;
u_char CSSNSA_rep_timer;
u_int  IFB_threshold;
u_char CSSNSA_pulse_width;
u_char CSSNSA_reset_time;
u_char time_divider;
u_char HV_ramp_in_process;
u_int  HV_ramp_counter;

u_int  VCT;
u_int  IFB;
u_int  KVCOM;
u_int  PWMCOMT;
u_int  BUFFIFB;
u_int  CLCOM;
u_int  BUFFKVFB;
u_int  RAWKVFB;
u_int  last_RAWKVFB;
u_int  RAWKVFB_delta;
u_int  POT;

const u_char K_table[4] = {0,80,160,200};

/* the SEQ_timer counts in increments of 5 msec.  Multiply the followin
```

App.c

```
g
   numbers by 5 to get the actual delay time in milliseconds */
const u_char SEQ_table[10][2] = { 0,  0,
                                  0,  0,
                                 30,  0,
                                 50,  0,
                                  0, 10,
                                 20, 10,
                                 30, 10,
                                 40, 10,
                                 60, 10,
                                 80, 10};

/*------------- Function Prototypes ----------------------------------*
/
void   Init_board(void);

/*
 _____________________________________________________________________
|
|
|  Restore_E2_defaults()
|
|
|
|  Initializes system parameters in E2PROM from defaults in ROM
|
|
|
|  Inputs:
|
|    none
|
|
|
|  Returns:
|
|    none
|
|
|
|  Calls:
|
|    none
|
|
|
|_____________________________________________________________________
|
*/
```

```
void Restore_E2_defaults(void) {

  Enable_E2_write();
  Write_E2(E2_VERSION,          THIS_VERSION);

  Write_E2(E2_IFB_THRESHOLD_MP,          150);    /* "S" command, HP404
*/
  Write_E2(E2_IFB_THRESHOLD_RP,         1000);    /* "S" command, RansPa
k 1K */
  Write_E2(E2_CSSNSA_PULSE_WIDTH,          1);    /* "U" command */
  Write_E2(E2_CSSNSA_RESET_TIME,           6);    /* "P" command */
  Write_E2(E2_RAWKVFB_DELTA,              10);    /* "A" command */
  Write_E2(E2_FB_FAULT_DELAY,            255);    /* "F" command */
  Write_E2(E2_FB_FAULT_MASK_COUNT,       511);    /* "G" command */
  Write_E2(E2_NUMBER_OF_DI_SAMPLES,       40);    /* "N" command */
  Write_E2(E2_NUMBER_OF_FILTER_SAMPLES,    8);    /* "Q" command */
  Write_E2(E2_DI_DELTA,                    2);    /* "L" command */
  Write_E2(E2_DI_DELTA + 1,                4);    /* "L" command */
  Write_E2(E2_DI_DELTA + 2,                8);    /* "L" command */
  Write_E2(E2_DI_DELTA + 3,               10);    /* "L" command */
  Write_E2(E2_DI_DELTA + 4,               15);    /* "L" command */
  Write_E2(E2_DI_DELTA + 5,               20);    /* "L" command */
  Write_E2(E2_DI_DELTA + 6,               30);    /* "L" command */
  Write_E2(E2_DI_DELTA + 7,               50);    /* "L" command */
  Write_E2(E2_DI_DELTA + 8,               80);    /* "L" command */
  Write_E2(E2_DI_DELTA + 9,              100);    /* "L" command */
  Write_E2(E2_DI_ENTRY,                    5);    /* entry number*/
}

/*
 -----------------------------------------------------------------------
|
|
|  Init_app()
|
|
|
|  Initializes the variables used in the application.
|
|
|
|  Inputs:
|
|    none
|
|
|
|  Returns:
|
|    none
```

App.c

```
|
|
|
|  Calls:
|
|    none
|
|
|
|________________________________________________________________
|
*/

void Init_app(void) {

  /* set initial state */
  HV_ON_status          = FALSE;
  last_HV_ON_status     = FALSE;
  HV_RDY_status         = FALSE;
  HV_RST_status         = FALSE;
  FLD_TRIG_status       = FALSE;
  AIR_TRIG_status       = FALSE;
  SEQ_status            = FALSE;
  LOCAL_status          = FALSE;
  PLEN_status           = FALSE;
  CSSNSA_status         = FALSE;

  /* force hardware to match initial state */
  HVONA_OUTPUT          = HV_ON_status;
  AIR_TRIG_OUTPUT       = AIR_TRIG_status;
  FLD_TRIG_OUTPUT       = FLD_TRIG_status;
  PLEN_OUTPUT           = ~PLEN_status;
  CSSNSA_OUTPUT         = CSSNSA_status;

  /* initialize all command to inactive */
  HV_RST_command        = FALSE;
  HV_ON_command         = FALSE;
  FLD_TRIG_command      = FALSE;
  AIR_TRIG_command      = FALSE;
  KV_set         = 0;
  I_set          = 0;

  /* zero DAC's */
  Write_DAC(0,0);
  Write_DAC(1,0);

  /* clear display */
  KV_display = 0;
  I_display  = 0;
  Write_LED(KV_display,I_display);
```

App.c

```
/* clear any faults */
FB_fault            = FALSE;
FB_fault_timer      = 0;
FB_fault_mask_timer = 0;
OL_fault            = FALSE;
DI_fault            = FALSE;

/* turn off front panel LEDs */
Set_LEDs(FBFLT_LED,0);
Set_LEDs(OVCUR_LED,0);
Set_LEDs(HVRDY_LED,0);
Set_LEDs(HVON_LED,0);
HVON_LED_counter    = 0;
OVCUR_LED_counter   = 0;

/* initialize sequencer control bits */
SEQ_state = 0;
SEQ_timer = 0;
HV_ON_sequencer     = FALSE;
FLD_TRIG_sequencer  = FALSE;
AIR_TRIG_sequencer  = FALSE;

/* initialize input variables */
VCT         = 0;
IFB         = 0;
KVCOM       = 0;
PWMCOMT     = 0;
BUFFIFB     = 0;
CLCOM       = 0;
BUFFKVFB    = 0;
POT         = 0;

RAWKVFB     = 0;
last_RAWKVFB = 0;

/* determine if E2PROM is up-to-date */
Watchdog();
IFB_threshold      = Read_E2(E2_VERSION);     /* dummy placeholder */
if (Read_E2(E2_VERSION) != THIS_VERSION) {
  /* write defaults into E2PROM */
  Restore_E2_defaults();
  Watchdog();
  CRT_print_code("\nE2PROM defaults restored\n");
}
else {
  Watchdog();
  CRT_print_code("\nE2PROM is current\n");
}


/* initialize system parameters from E2PROM */
```

```
  if (Get_uPAK_switch()) IFB_threshold = Read_E2(E2_IFB_THRESHOLD_MP);
  else IFB_threshold = Read_E2(E2_IFB_THRESHOLD_RP);
  CSSNSA_pulse_width = Read_E2(E2_CSSNSA_PULSE_WIDTH);
  CSSNSA_reset_time  = Read_E2(E2_CSSNSA_RESET_TIME);
  CSSNSA_pulse_timer = 0;
  CSSNSA_rep_timer   = 0;
  time_divider       = 0;
  HV_ramp_in_process = FALSE;
  HV_ramp_counter    = 0;
  RAWKVFB_delta      = Read_E2(E2_RAWKVFB_DELTA);

  /* initialize fault timers */
  FB_FAULT_DELAY      = Read_E2(E2_FB_FAULT_DELAY);
  FB_FAULT_MASK_COUNT = Read_E2(E2_FB_FAULT_MASK_COUNT);

  /* initialize filter parameters for rtc() */
  number_of_filter_samples = Read_E2(E2_NUMBER_OF_FILTER_SAMPLES);
  number_of_DI_samples     = Read_E2(E2_NUMBER_OF_DI_SAMPLES);
  DI_entry                 = Read_E2(E2_DI_ENTRY);
  DI_delta                 = Read_E2(E2_DI_DELTA + DI_entry);
}

/*
 ______________________________________________________________________
|
|
|  Decode_command()
|
|
|
|  Processes a command received via the CANBUS.
|
|
|
|  Inputs:
|
|    pointer to buffer containing CANBUS data.
|
|
|
|  Returns:
|
|    none
|
|
|
|  Calls:
|
|    none
|
|
```

App.c

```
|
|________________________________________________________________
|
*/

void Decode_command(u_char *data_ptr){

  u_char  i;

  if (debug_enabled) {
    CRT_print_code("\n Output Update: ");
    for (i=0;i<6;i++) {
      CRT_print_HEX_byte(data_ptr[i]);
      CRT_print_code(" ");
    }
    CRT_print_code("\n");
  }

  KV_set = data_ptr[0] + (data_ptr[1] << 8);
  I_set  = data_ptr[2] + (data_ptr[3] << 8);

  HV_ON_command     = (data_ptr[4] & 0x01);
  HV_RST_command    = (data_ptr[4] & 0x02)>>1;
  FLD_TRIG_command  = (data_ptr[4] & 0x04)>>2;
  AIR_TRIG_command  = (data_ptr[4] & 0x08)>>3;


}

/*
 ________________________________________________________________
|
|
|  Measure_inputs()
|
|
|
|  Reads inputs and computes internal variables.
|
|
|
|  Inputs:
|
|    none
|
|
|
|  Returns:
|
|    none
|
```

```
|
|
| Calls:
|
|   none
|
|
|
|_______________________________________________________________________
 |
*/

void Measure_inputs(void){

  u_int  KV_error;

  /* read the A/D channels and process raw data into engineering units
*/

  /* VCT is 0 to 25 volts (externally divided by 5), scaled 0 to 250 */
  VCT = ((AD_buffer[7] * 62) + (AD_buffer[7]/2) + 128)/256;

  if (Get_uPAK_switch()) {
    /* for uPAK IFB is 0 to 5v, scaled 0 to 250uA */
    IFB = ((AD_buffer[6] * 62) + (AD_buffer[6]/2) + 128)/256;

    /* BUFFIFB is 0 to 5v, scaled 0 to 250uA */
    BUFFIFB = ((AD_buffer[3] * 62) + (AD_buffer[3]/2) + 128)/256;

    /* CLCOM is 0 to 5v, scaled 0 to 250uA */
    CLCOM = ((AD_buffer[2] * 62) + (AD_buffer[2]/2) + 128)/256;
  }
  else {
    /* for RANSPAK 1000 IFB is 0 to 5v, scaled 0 to 999uA */
    IFB = ((AD_buffer[6] * 62) + (AD_buffer[6]/2) + 32)/64;

    /* BUFFIFB is 0 to 5v, scaled 0 to 999uA */
    BUFFIFB = ((AD_buffer[3] * 62) + (AD_buffer[3]/2) + 32)/64;

    /* CLCOM is 0 to 5v, scaled 0 to 999uA */
    CLCOM = ((AD_buffer[2] * 62) + (AD_buffer[2]/2) + 32)/64;
  }

  /* KVCOM is 2.5 to 5.0 v is scaled 0 to 100KV */
  if (AD_buffer[5] < 512) KVCOM = 0;
  else KVCOM = (((AD_buffer[5] - 512) * 50) + 128)/256;

  /* PWMCOMT is 0 to 5v, scaled 0 to 100% */
  PWMCOMT = ((AD_buffer[4] * 25) + 128)/256;

  /* BUFFKVFB is 0 to 5v, scaled 0 to 100KV */
```

```
  BUFFKVFB = ((AD_buffer[1] * 25) + 128)/256;
  RAWKVFB = AD_buffer[1];

  /* compensate for IR loss in cable */
  KV_error = (BUFFIFB * K_table[Get_K_switch()])/1000;
  if (BUFFKVFB > KV_error) BUFFKVFB -= KV_error;
  else BUFFKVFB = 0;

  /* POT is 0 to 5v, scaled 0 to 100% */
  POT = ((AD_buffer[0] * 25) + 128)/256;

  if (Get_SEQ_switch() != 0) SEQ_status = TRUE;
  else SEQ_status = FALSE;

  LOCAL_status = Get_LOCAL_switch();

}

/*
|--------------------------------------------------------------------
|
|  Update_outputs()
|
|
|  Takes decoded command info and updates outputs.  Called every
|
|  5 msec from main().
|
|
|  Inputs:
|
|    none
|
|
|  Returns:
|
|    none
|
|
|  Calls:
|
|    none
|
|
|____________________________________________________________________
```

App.c

```
!
*/

void Update_outputs(void){

  u_int   DAC_code;

  /* this routine runs every 5 msec */

  /* sequencer logic */
  if (SEQ_state == 0) {
    /* if AIR trigger is received, start sequence */
    if (AIR_TRIG_command && SEQ_status) {
      SEQ_state = 1;
      SEQ_timer = SEQ_table[Get_SEQ_switch()][0];
      AIR_TRIG_sequencer = TRUE;
    }
  }
  else if (SEQ_state == 1) {
    if (SEQ_timer > 0) SEQ_timer--;
    else {
      /* change state */
      SEQ_state = 2;
      SEQ_timer = SEQ_table[Get_SEQ_switch()][1];
      FLD_TRIG_sequencer = TRUE;
    }
  }
  else if (SEQ_state == 2) {
    if (SEQ_timer > 0) SEQ_timer--;
    else {
      /* change state */
      SEQ_state = 3;
      HV_ON_sequencer = TRUE;
    }
  }
  else if (SEQ_state == 3) {
    /* wait for an AIR_TRIG off command */
    if (AIR_TRIG_command == FALSE) {
      SEQ_state = 4;
      SEQ_timer = SEQ_table[Get_SEQ_switch()][1];
      HV_ON_sequencer = FALSE;
    }
  }
  else if (SEQ_state == 4) {
    if (SEQ_timer > 0) SEQ_timer--;
    else {
      /* change state */
      SEQ_state = 5;
      SEQ_timer = SEQ_table[Get_SEQ_switch()][0];
      FLD_TRIG_sequencer = FALSE;
    }
```

App.c

```
  }
  else if (SEQ_state == 5) {
    if (SEQ_timer > 0) SEQ_timer--;
    else {
      /* change state */
      SEQ_state = 0;
      AIR_TRIG_sequencer = FALSE;
    }
  }
  else SEQ_state == 0;


  /* Update FB fault mask timer */

  /* decrement fault_mask_timer if active - this timer counts down */
  if (FB_fault_mask_timer > 0) FB_fault_mask_timer--;

  if ((HV_ON_status == FALSE) && (last_HV_ON_status == TRUE)) {
    /* HV has just been turned off, initialize mask timer */
    FB_fault_mask_timer = FB_FAULT_MASK_COUNT;
  }


  /* fault enable */

  /* read the DIP switch to see which faults are enabled */
  if (Get_DIP_switch() & 0x01) FB_fault_enabled = TRUE;
  else FB_fault_enabled = FALSE;
  if (Get_DIP_switch() & 0x02) OL_fault_enabled = TRUE;
  else OL_fault_enabled = FALSE;
  if (Get_DIP_switch() & 0x04) DI_fault_enabled = TRUE;
  else DI_fault_enabled = FALSE;
  if (Get_DIP_switch() & 0x08) CL_multiplier_enabled = FALSE;
  else CL_multiplier_enabled = TRUE;


  /* clear faults if HV_RST_command issued  or front panel switch pushe
d */
  if (HV_RST_command ||
      (Get_HVOFF_switch() == TRUE)){
    HV_RST_status = TRUE;
    OL_fault = FALSE;
    DI_fault = FALSE;
    FB_fault = FALSE;
    FB_fault_timer = 0;
  }
  else HV_RST_status = FALSE;

  /* HV_RDY logic */
  if (HV_RDY_status == FALSE) {
     /* determine if it's time to go "Ready", based on any previous fau
```

```
lts */
     if ((OL_fault == FALSE) &&
         (DI_fault == FALSE) &&
         (FB_fault == FALSE) &&
         (HV_RST_command == FALSE) &&
         (Get_INT_switch() == TRUE) &&
         (Get_RDY_switch() == TRUE) &&
         (Get_HVOFF_switch() == FALSE))    HV_RDY_status = TRUE;
  }
  else {
     /* determine if it's time to go "Not Ready" */
     if (OL_fault || DI_fault || FB_fault || HV_RST_command ||
         (Get_INT_switch() == FALSE) ||
         (Get_HVOFF_switch() == TRUE))  HV_RDY_status = FALSE;

  }


  /* HV_ON logic */
  if ((HV_RDY_status == TRUE)  &&
      ((HV_ON_command == TRUE)      ||
       (Get_HVON_switch() == TRUE) ||
       (HV_ON_sequencer == TRUE))) {
    HV_ON_status = TRUE;
  }
  else HV_ON_status = FALSE;



  /* determine if we just went from HV OFF to HV ON */
  if ((last_HV_ON_status == FALSE) && (HV_ON_status == TRUE)) {

    CRT_print_code("\nHV ON");

    /* force a RAMP condition immediately upon power on */
    CRT_print_code("\nRamp start ");
    HV_ramp_in_process = TRUE;
    HV_ramp_counter = 5;        /* minimum ramp time = 250 msec */
  }

  /* check for new overload fault */
  if (CL_multiplier_enabled) {
    if (CLCOM > 50) {
      if ((HV_ON_status) &&
          (BUFFIFB > (CLCOM * 13)/10) &&        /* 1.3 x multiplier */
          (OL_fault_enabled)) {
        OL_fault = TRUE;
        CRT_print_code("\nOL Fault");
      }
    }
    else {  /* CLCOM < 50 uA */
```

App.c

```
      if ((HV_ON_status) &&
          (BUFFIFB > (CLCOM + 15)) &&          /* command + 15 uA */
          (OL_fault_enabled)) {
        OL_fault = TRUE;
        CRT_print_code("\nOL Fault");
      }
    }
  }
  else {  /* CL multiplier not enabled */
    if ((HV_ON_status) &&
        (BUFFIFB > CLCOM) &&
        (OL_fault_enabled)) {
      OL_fault = TRUE;
      CRT_print_code("\nOL Fault");
    }
  }


  /* check for new di/dt fault */
  if ((HV_ON_status) &&
      (DI_fault_enabled)) {

    /* acumulate "N" samples of filtered IFB */
    DI_sum += filter_average;
    DI_index++;

    /* compute the average of the DI samples after desired number are t
aken */
    if (DI_index >= number_of_DI_samples) {
      DI_average = DI_sum / number_of_DI_samples;

      /* using this average look for a violation - but not when ramping
 */
      if ((DI_average > last_DI_average + DI_delta) &&
          (HV_ramp_in_process == FALSE)) {

        /* declare a di/dt fault, declare an overload as well?????  */
        DI_fault = TRUE;
        CRT_print_code("\ndi/dt fault");
      }
      /* reset for next sample interval */
      last_DI_average = DI_average;
      DI_sum = 0;
      DI_index = 0;
    }
  }
  else {
    /* key variables nulled when HV is off */
    DI_sum = 0;
    DI_index = 0;
    last_DI_average = 0;
```

App.c

```
  }

  /* check for a feedback fault */

  /* HP404 and Ranspak 1000 modes are handled differently */
  if (Get_uPAK_switch()) {

    /* HP404 mode */
    if (((VCT < 30) && (BUFFIFB > 20))  ||  /* VCT < 3v & BUFFIFB > 0.4
v */
        ((VCT < 30) && (BUFFKVFB > 20)) ||  /* BUFFKVFB > 2.0v */
        ((BUFFIFB < 5) && (VCT > 80))   ||  /* BUFFIFB < .1v */
        ((BUFFKVFB < 5) && (VCT > 40))) {   /* BUFFKVFB < 0.5 */

      /* a fault condition exists, ignore until mask timer expires */
      if (FB_fault_mask_timer == 0) {

        /* increment the fault timer, which filters out transient fault
s */
        /* saturate at threshold + 2 to avoid re-trips */
        if (FB_fault_timer <  FB_FAULT_DELAY + 2) FB_fault_timer++;

        /* when it crosses the fault threshold, declare a fault */
        /* FB_fault is cleared when HV is turned off */
        if (FB_fault_timer == FB_FAULT_DELAY) {
          if (FB_fault_enabled) {
            FB_fault = TRUE;
            CRT_print_code("\nFB fault");
          }
        }
      }
    }
    else {
      /* no fault detected, decrement fault timer until it expires */
      if (FB_fault_timer > 0) FB_fault_timer--;
    }
  }

  else {
    /* Ranspak 1000 mode */
    /* there is no fault mask or filtering done in this mode. */

    if (((VCT < 30) && (BUFFIFB > 80))  ||  /* VCT < 3v & BUFFIFB > 0.4
v */
        ((VCT < 30) && (BUFFKVFB > 20)) ||  /* BUFFKVFB > 2.0v */
        ((BUFFIFB < 20) && (VCT > 80))  ||  /* BUFFIFB < .1v */
        ((BUFFKVFB < 5) && (VCT > 40))) {   /* BUFFKVFB < 0.5 */

      /* increment the fault timer, which filters out transient faults
*/
      /* saturate at threshold + 2 to avoid re-trips */
```

```
    if (FB_fault_timer <  FB_FAULT_DELAY + 2) FB_fault_timer++;

    /* when it crosses the fault threshold, declare a fault */
    /* FB_fault is cleared elsewhere */
    if (FB_fault_timer == FB_FAULT_DELAY) {
      if (FB_fault_enabled) {
        FB_fault = TRUE;
        CRT_print_code("\nFB fault");
      }
    }
  }
}


/* High voltage slew rate control */
if (HV_ON_status) {

  /* look every 50 msec for a change in RAWKVFB */
  time_divider++;
  if (time_divider >= 10){
    /* 50 msec */
    time_divider = 0;

    if (RAWKVFB > last_RAWKVFB + RAWKVFB_delta) {

      /* filter slope excursions to get a reliable "ramp" indicator *
/

      /* after the first excursion is detected the ramp will be in
         process for at least 500 msec (10 periods of 50 msec each.
         This should prevent a series of mini-ramps during a voltage
         change when Ranspak 1000 pulsing is being applied */

      /* diagnostic when ramp starts */
      if (HV_ramp_in_process == FALSE) CRT_print_code("\nRamp start "
);

      HV_ramp_in_process = TRUE;
      HV_ramp_counter = 5;        /* minimum ramp time = 250 msec */

      /* Ranspak 1000 uses CSSNSA pulse logic to control KV slew rate
 */
      if (Get_uPAK_switch() == 0) {
        CRT_print_code("P");
        CSSNSA_pulse_timer = 1;
        /* let RTC interrupt turn on CSSNSA output
           increment CSSNSA_timer and turn off CSSNSA output */
      }
    }
    else {
      /* no excursion is seen, decrement counter an trun off ramp bit
```

```
*/
       if (HV_ramp_counter > 0) {
         HV_ramp_counter--;
         if (HV_ramp_counter == 0) CRT_print_code(" Ramp stop\n");
       }
       if (HV_ramp_counter == 0) {
         /* declare end of ramp */
         HV_ramp_in_process = FALSE;
       }
     }

     /* save present value for next iteration */
     last_RAWKVFB = RAWKVFB;
   }
 }
 else {
   /* synthesize a last RAWKVFB of zero when HV is off */
   last_RAWKVFB = 0;
   HV_ramp_in_process = FALSE;
   HV_ramp_counter = 0;
 }


 /* update front panel LEDs */
 Set_LEDs(HVRDY_LED, HV_RDY_status);
 Set_LEDs(FBFLT_LED, FB_fault);

 /* Overload LED doubles as a di/dt fault indicator (flashing) */
 if (OL_fault) {
   /* OL fault has precedence over di/dt fault */
   Set_LEDs(OVCUR_LED, 1);
   /* stop flashing */
   OVCUR_LED_counter = 0;
 }
 else {
   /* no OL_fault, flash if di/dt fault */
   if (DI_fault) {
     /* LED flashing state machine */
     if (OVCUR_LED_counter == 0) {
       /* first time fault - start flash sequence */
       Set_LEDs(OVCUR_LED, 1);
       OVCUR_LED_counter = 1;
     }
     else if (OVCUR_LED_counter == LED_ON_TIME) {
       /* turn LED off */
       Set_LEDs(OVCUR_LED, 0);
       OVCUR_LED_counter++;
     }
     else if (OVCUR_LED_counter == LED_OFF_TIME) {
       /* turn LED back on, repeat sequence */
```

App.c

```
      Set_LEDs(OVCUR_LED, 1);
      OVCUR_LED_counter = 1;
    }
    else OVCUR_LED_counter++;
  }
  else {
    /* no fault; make sure LED is off */
    Set_LEDs(OVCUR_LED, 0);
    /* reset flasher state */
    OVCUR_LED_counter = 0;
  }
}

/* HV LED doubles as slope indicator (flashing), slope has precedence
*/
if (HV_ramp_in_process) {
  /* LED flashing state machine */
  if (HVON_LED_counter == 0) {
    /* first time  - start flash sequence */
    Set_LEDs(HVON_LED, 1);
    HVON_LED_counter = 1;
  }
  else if (HVON_LED_counter == LED_ON_TIME) {
    /* turn LED off */
    Set_LEDs(HVON_LED, 0);
    HVON_LED_counter++;
  }
  else if (HVON_LED_counter == LED_OFF_TIME) {
    /* turn LED back on */
    Set_LEDs(HVON_LED, 1);
    HVON_LED_counter = 1;
  }
  else HVON_LED_counter++;
}
else {
  /* no slope; HV_ON_status controls LED */
  Set_LEDs(HVON_LED,  HV_ON_status);
  /* reset flasher state */
  HVON_LED_counter = 0;
}

/* convert KV_set command immediately into DAC codes (10.24V Vref) */
/* 0-100 => 0-10v => 0-250 */
if (KV_set > 100) KV_set = 100;
DAC_code = (KV_set * 5)/2;

/* update the KV D/A */
Write_DAC(0, DAC_code);

/* convert I_set command into DAC codes (10.24V Vref) */
```

```
  if (Get_uPAK_switch()) {
    /* HP404 */
    /* 0-250uA => 0-250 => 0-10v */
    if (I_set > 250) I_set = 250;
    DAC_code = I_set;
  }
  else {
    /* Ranspak 1000 */
    /* 0-999uA => 0-249 => 0-9.99v */
    DAC_code = I_set/4;
  }

  /* update the I D/A */
  Write_DAC(1, DAC_code);

  /* update HVONA output */
  HVONA_OUTPUT = HV_ON_status;

  /* update air trigger */
  AIR_TRIG_status = (AIR_TRIG_command | AIR_TRIG_sequencer);
  AIR_TRIG_OUTPUT = AIR_TRIG_status;

  /* update fluid trigger */
  FLD_TRIG_status = (FLD_TRIG_command | FLD_TRIG_sequencer);
  FLD_TRIG_OUTPUT = FLD_TRIG_status;

  /* update PLEN output */
  if ((VCT > 20) && (HV_ON_status == TRUE)) PLEN_status = TRUE;
  else PLEN_status = FALSE;
  PLEN_OUTPUT = ~PLEN_status;   /* invert output for hardware */


  /* update history */
  last_HV_ON_status = HV_ON_status;
}

/*
 ----------------------------------------------------------------------
|
|
|  Update_display()
|
|
|
|  Updates the display with current information.
|
|
|
|  Inputs:
|
|    none
```

App.c

```
|
|
|
| Returns:
|
|   none
|
|
|
| Calls:
|
|   none
|
|
|
|____________________________________________________________________
|
*/

void Update_display(void){

  if (PB_state == 2) {
    /* display setpoints */
    KV_display = KVCOM;
    I_display  = CLCOM;
    Write_LED(KV_display,I_display);
  }
  else if ((PB_state == 5) || (PB_state == 6)) {
    /* display di/dt */
    Write_LED_special(DI_entry);
  }
  else {
    /* display actual values */
    if (HV_ON_status == FALSE) {
      /* HV is off - set displays to zero */
      KV_display = 0;
      I_display = 0;
    }
    else {
      /* HV is on - display actual values */
      KV_display = BUFFKVFB;
      I_display = BUFFIFB;
    }
    Write_LED(KV_display,I_display);
  }
}
```

Debug.c

```
/*
 ------------------------------------------------------------------------------
|
|
|  CANBUS MODULAR CONTROLLER - Debug Monitor Module
|
|
|
|  Filename: debug.c
|
|
|
|  Created:  05/15/93  RES
|
|
|
|  Procedures defined in this module:
|
|    Debug_monitor()
|
|    Init_debug_monitor()
|
|    Init_sign_on()
|
|    Print_menu()
|
|
|
|  Public variables defined by this module:
|
|    debug_enabled
|
|
|
|  Revision History:
|
|  V2.1 11-14-95  Remove HV_OFF_status variable, changed version no.
|
|  V2.2 12-02-95  Added support for CSSNSA timer values and IBF
|
|                 threshold.  New version # and date added.
|
|  V2.2 12-05-95  Changed CSSNSA pulse width to increments of 1 ms.
|
|  V2.3 12-11-95  Version number change
|
|  V2.4 01-31-96  Changed DIP switch to be fault disable options
|
|                 Version number change
|
|                 Converted control values to u_int to support 0-999
```

```
|                   uA operation of RANSPAK 1000
|
|  V2.6 09-27-96  Changed to display fault enables from variables
|
|                 rather than direct from DIP switch
|
|  V2.7 12-23-96  Updated Vers No. for voltage ramp changes
|
|  V2.7 01-03-97  Updated date for voltage ramp changes
|
|  V2.8 02-11-97  Updated version number and date only.
|
|  V2.9 03-20-97  Added E2PROM update for RAWKVFB_delta.
|
| V2.91 06-03-97  Changed feedback fault delay to 16 bits. RES
|
| V2.91 06-06-97  Add FB_fault_mask_timer  RES
|
| V2.92 06-09-97  Updated version number and date only.
|
| V2.93 06-16-97  Updated version number and date only.
|
| V2.95 07-17-97  Literalized the E2PROM addresses.
|
| V2.96 08-15-97  Added separate IFB THRESHOLDs for MicroPak and
|
|                 RansPak 1000.
|
|                 Redefined HF filter parameters to di/dt parameters
|
| V3.00 09-04-97  Added di/dt step adjustment.
|
|                 Converted a number of commands to BCD entry
|
|                 Scaled parameters for units actually used
|
| V3.00 09-15-97  Changed "l" cmd to update DI_delta upon entry  RES
|
| V3.01 09-17-97  Changed references to "MicroPak" to "HP404"  RES
|
|                 Fixed storage problem with "N" command.
|
|___________________________________________________________________
|
```

```
*/

#include "common.h"                   /* common definitions        */
#include "board.h"                    /* hardware specific defines */
#include "crtio.h"                    /* define I/O function       */
#include "e2prom.h"                   /* define E2PROM addresses   */
#include <io8096.h>                   /* 8096 special function register
s */

#pragma EJECT

/*---------------------- External References ------------------------*/
extern void   CAN_A_abort(void);
extern void   Init_sign_on(void);
extern void   Write_DAC(u_char chan, u_char value);
extern void   Tx_en_buffer(u_char node_index,
                           u_char command,
                           u_char length,
                           u_char *data_ptr);
extern u_char Get_DIP_switch(void);
extern u_char Get_uPAK_switch(void);
extern u_char Get_SEQ_switch(void);
extern void   Init_monitor(void);
extern void   Write_E2(u_char addr, u_int value);
extern u_int  Read_E2(u_char addr);
extern void   Enable_E2_write(void);
extern void   Restore_E2_defaults(void);
extern void   Init_app(void);

/*------------- External Variable Definitions -----------------*/
extern char   KB_buffer[KB_BUFFER_SIZE];
extern u_char KB_in_index;
extern u_char KB_out_index;
extern u_char message_received;
extern u_char node_error_count;
extern u_char node_error_index;
extern u_char node_error_log[8];
extern u_char Rx_buffer[RX_BUFFER_SIZE];
extern u_int  Rx_in_index;
extern u_int  Rx_out_index;
extern u_char Tx_A_buffer[TX_A_BUFFER_SIZE];
extern u_int  Tx_A_in_index;
extern u_int  Tx_A_out_index;
extern u_int  AD_buffer[10];
extern u_int  DA_buffer[2];
extern u_int  KV_set;
extern u_int  I_set;
extern u_char number_of_filter_samples;
extern u_int  number_of_DI_samples;
extern u_int  DI_delta;
extern u_char DI_entry;
```

```
extern u_char HV_RST_command;
extern u_char HV_ON_command;
extern u_char FLD_TRIG_command;
extern u_char AIR_TRIG_command;
extern u_char HV_ON_sequencer;
extern u_char FLD_TRIG_sequencer;
extern u_char AIR_TRIG_sequencer;
extern u_char HV_ON_status;
extern u_char HV_RDY_status;
extern u_char FLD_TRIG_status;
extern u_char AIR_TRIG_status;
extern u_char SEQ_status;
extern u_char LOCAL_status;
extern u_char FB_fault;
extern u_int  FB_FAULT_DELAY;
extern u_char OL_fault;
extern u_int  KV_display;
extern u_int  I_display;
extern u_int  VCT;
extern u_int  IFB;
extern u_int  KVCOM;
extern u_int  PWMCOMT;
extern u_int  BUFFIFB;
extern u_int  CLCOM;
extern u_int  BUFFKVFB;
extern u_int  POT;
extern u_char FB_fault_enabled;
extern u_char DI_fault_enabled;
extern u_char OL_fault_enabled;
extern u_char CL_multiplier_enabled;

extern u_int  IFB_threshold;
extern u_char CSSNSA_pulse_width;
extern u_char CSSNSA_reset_time;
extern u_char CSSNSA_status;
extern u_char CSSNSA_pulse_timer;
extern u_char CSSNSA_rep_timer;
extern u_int  RAWKVFB_delta;
extern u_int  FB_FAULT_MASK_COUNT;

/*--------------- Public Variable Definitions -----------------*/
u_char debug_enabled;
u_char monitor_mode;
u_int  param1;
u_int  param2;
u_int  param1_BCD;
u_int  param2_BCD;
u_int  seg;
u_int  last_param1;
u_int  last_param2;
```

```
u_char param1_entered;
u_char param2_entered;
const  char *sign_on = "\n\nPROCESS PCB Monitor, V3.01 (09-17-97)\n";
u_char *mem_ptr;

/*
 ______________________________________________________________________
|
|
|  Init_sign_on()
|
|
|
|  This procedure prints the sign-on message to the debugger screen
|
|
|
|  Inputs:
|
|    none
|
|
|
|  Returns:
|
|    none
|
|
|
|  Calls:
|
|    CRT_print_code()
|
|______________________________________________________________________
|
*/

void Init_sign_on(void) {

  /* print the sign on message from ROM */
  CRT_print_code(sign_on);
}

/*
 ______________________________________________________________________
|
|
|  Print_menu()
|
|
|
```

Debug.c

```
|  This procedure prints the debugger menu to the screen
|
|
|
|  Inputs:
|
|    none
|
|
|
|  Returns:
|
|    none
|
|
|
|  Calls:
|
|    CRT_print_code()
|
|________________________________________________________________________
|
*/

void Print_menu(void) {

  u_char i;
  const char *menu_text[] = {
        "\nCommands:\n",
        "  Display Memory:       D <start_addr>,<end_addr>\n",
        "  Display Error Log:    E\n",
        "  Display A/D Inputs:   I\n",
        "  Display D/A Outputs:  O <chan>,<value>\n",
        "  Modify Memory:        M <addr>,<value>\n",
        "  Dump CAN Rx Buffer:   R <start_addr><end_addr>\n",
        "  Dump CAN Tx Buffer:   T <channel><start_addr>\n",
        "  Write CANBUS:         W <node>\n",
        "  BUFFIFB threshold:    S <threshold>\n",
        "  CSSNSA pulse width:   U <width>\n",
        "  CSSNSA rep time:      P <rep_time>\n",
        "  KV ramp delta:        A <delta>\n",
        "  di/dt sample count    N <value>\n",
        "  di/dt delta           L <entry>,<value>\n",
        "  # of filter samp.     Q <value>\n",
        "  FB FAULT delay:       F <value>\n",
        "  FB FAULT mask:        G <value>\n",
        "  Restore E2 defaults:  B\n",
        "  Monitor on/off:       X\n",
        "  Enable/Disable Debug: Z\n",
        "  Help (this menu):     H\n"};
```

Debug.c

```
  /* print the menu from ROM */
  for (i=0;i<21;i++) CRT_print_code(menu_text[i]);

  CRT_print_code("  Sequence =");
  CRT_print_HEX_byte(Get_SEQ_switch());

  if (FB_fault_enabled) CRT_print_code("\nFeedback fault enabled");
  if (DI_fault_enabled) CRT_print_code("\ndi/dt fault enabled");
  if (OL_fault_enabled) {
    CRT_print_code("\nOverload fault enabled");
    if (CL_multiplier_enabled) CRT_print_code(" at 1.3x CLCOM");
    else CRT_print_code(" at 1x CLCOM");
  }
  if (Get_uPAK_switch()) CRT_print_code("\nHP404 mode");
  else CRT_print_code("\nRANSPAK 1000 Mode");

}

/*
 ---------------------------------------------------------------------
|
|
|  Init_debug_monitor()
|
|
|
|  This procedure calls Print_menu() to print the menu and initializes
|
|  the memory addressing parameters used by the debugger.  Param1 and
|
|  param2 are the 1st and 2nd parameters entered after the single-
|
|  character debugger commands and are initialized to zero.  The
|
|  debug_enabled flag is set to FALSE to allow unattended operation.
|
|
|
|  Inputs:
|
|    none
|
|
|
|  Returns:
|
|    none
|
|
|
```

```
|  Calls:
|
|    Print_menu()
|
|    CRT_print_code()
|
|_____________________________________________________________________
|
*/

void Init_debug_monitor(void) {

  last_param1    = 0;
  param1         = 0;
  param2         = 0;
  param1_BCD     = 0;
  param2_BCD     = 0;
  debug_enabled  = FALSE;        /* to allow unattended boot */
  mem_ptr        = (char *) 0x0;  /* memory ptr */

  /* print the command prompt */
  CRT_print_code("\nType H for debugger menu.\n");
}

/*
 _____________________________________________________________________
|
|
|  Debug_monitor()
|
|
|
|  This procedure processes a single debugger command and is called
|
|  from main() in response to a carriage return <cr> entered by the
|
|  user.  Debugger commands consist of a single alphabetic character
|
|  followed by none, one, or two numerical paramters.  Parameters are
|
|  entered in HEX with no 0x0 leading identifier required.  Parameters
|
|  must be separated from each other with a space or comma.  No
|
|  separator character is required between the alphabetic command and
|
|  the first parameter, but a comma or space is acceptable.
|
|
|
|  All command characters are taken from the KB_buffer[].  The command
```

is assumed to be in location 0 in the buffer, so no leading spaces are tolerated. The first parameter is built up from the first set of contiguous characters found after the command. Characters are collected until the first non-numeric character is found (assumed to be a delimiter) Only the last four numeric entries are used to form the parameter. Additional characters get shifted out of the ASCII_buffer[]. If a numeric entry is found before the terminating carriage return, then a second parameter is assembled in the same manner as the first. If no parameters are entered, the param1_ entered and param2_entered flags are left set to FALSE. This fact is used by some of the debugger commands to use the last value of a given parameter.

An example of this can be found with the "D" command used to display various areas of memory. When entered with two parameters, it displays the specified region of memory. When entered with one command, it displays 128 bytes starting at the address given in the parameter. If entered with no parameters, it display 128 bytes starting at the last address displayed in the previous "D" command.

Inputs:

none

Returns:

none

Debug.c

```
|
|
|  Calls:
|
|    CRT_print_code()
|
|    CRT_print_HEX_word()
|
|    CRT_print_HEX_byte()
|
|    HEX_to_word()
|
|    CAN_A_abort()
|
|    CAN_B_abort()
|
|    Print_menu()
|
|
|
|________________________________________________________________________
|
*/

void Debug_monitor(void) {

  u_int  i;
  u_int  j;
  u_int  count;
  u_int  in;
  u_int  out;
  u_char command;
  char   ASCII_buffer[6];
  char   data_buffer[8];

  char   *error_text[] = {
        "  Null error code\n",
        "  Queue overflow\n",
        "  Block transfer checksum error\n",
        "  Invalid message type\n",
        "  Unknown RTC code\n",
        "  Transmitter not ready\n",
        "  Transmitter not ready (Ch. A)\n",
        "  Transmitter not ready (Ch. B)\n",
        "  Tx message too long\n",
        "  Tx message too long (Ch. A)\n",
        "  Tx message too long (Ch. B)\n",
        "  Rx buffer full\n",
        "  CANBUS overrun (Ch. A)\n",
        "  CANBUS overrun (Ch. B)\n",
        "  CANBUS error (Ch. A, on bus)\n",
```

```
      "  CANBUS error (Ch. B, on bus)\n",
      "  CANBUS error (Ch. A, off bus)\n",
      "  CANBUS error (Ch. B, off bus)\n",
      "  Tx buffer full (Ch. A)\n",
      "  Tx buffer full (Ch. B)\n",
      "  DP RAM memory test failed (0xff)\n",
      "  DP RAM memory test failed (0x55)\n",
      "  DP RAM memory test failed (0xaa)\n",
      "  DP RAM memory test failed (0x00)\n",
      "  DP RAM memory test failed (walk)\n",
      "  Block transfer overrun\n",
      "  Unexpected block transfer msg\n",
      "  Block transfer send length is zero\n",
      "  Type 2 message from wrong node\n",
      "  Type 3 message from wrong node\n",
      "  Type 4 message from wrong node\n",
      "  Type 5 message from wrong node\n",
      "  Unexpected checksum received\n",
      "  Unexpected type 4 message received\n",
      "  Unexpected type 5 message received\n",
      "  Node not responding to polling\n",
      "  Node not responding to RTC\n",
      "  Too few block xfer packets received\n",
      "  Too many block xfer packets received\n",
      "  Block transfer read length is zero\n",
      "  Type 7 message from wrong node\n",
      "  Unexpected type 7 message received\n"};

 /* this procedure processes a debug command */

 /* fill in cr,lf after user command */
 CRT_print_code("\n");

 param1_entered = FALSE;
 param2_entered = FALSE;
 for (j=0;j<6;j++) ASCII_buffer[j] = 0;

 /* assume the first character entered is the command */
 command = KB_buffer[0];

 /* now skip over any separator characters, until a numerical entry is
found */
 i = 1;
 while ((KB_buffer[i] == ' ')||(KB_buffer[i] == ',')) i++;

 /* if any numbers follow the initial character, get them */
 while((KB_buffer[i] != CRET) &&
       (KB_buffer[i] != ',') &&
       (KB_buffer[i] != ' ')) {
   param1_entered = TRUE;
   ASCII_buffer[0] = ASCII_buffer[1];
```

Debug.c

```
    ASCII_buffer[1] = ASCII_buffer[2];
    ASCII_buffer[2] = ASCII_buffer[3];
    ASCII_buffer[3] = ASCII_buffer[4];
    ASCII_buffer[4] = KB_buffer[i++];
  }
  if (param1_entered) {
    param1 = HEX_to_word(&ASCII_buffer[1]);
    param1_BCD = BCD_to_word(ASCII_buffer);
  }

  /* now skip over any separator characters, until a numerical entry is
found */
  while ((KB_buffer[i] == ' ')||(KB_buffer[i] == ',')) i++;

  if (KB_buffer[i] != CRET) {
    for (j=0;j<6;j++) ASCII_buffer[j] = 0;
    while ((KB_buffer[i] != CRET) &&
           (KB_buffer[i] != ',') &&
           (KB_buffer[i] != ' ')) {
      param2_entered = TRUE;
      ASCII_buffer[0] = ASCII_buffer[1];
      ASCII_buffer[1] = ASCII_buffer[2];
      ASCII_buffer[2] = ASCII_buffer[3];
      ASCII_buffer[3] = ASCII_buffer[4];
      ASCII_buffer[4] = KB_buffer[i++];
    }
    if (param2_entered) {
      param2 = HEX_to_word(&ASCII_buffer[1]);
      param2_BCD = BCD_to_word(ASCII_buffer);
    }
  }

  /*
   ____________________________________________________________________
__|
  |
  |  At this point none, one, or two parameters have been entered.  If
  |
  |  a given parameter has been entered, the param?_entered flag is set
. |
  |
  |
  |____________________________________________________________________
__|
  */

  /* process the debug command */

  /*
   ____________________________________________________________________
```

Debug.c

```
—|
 |
 |  The "R" command dumps the Rx_buffer[] to the screen.  No parameter
s |
 |  are needed.
 |
 |____________________________________________________________________
—|
*/
if (command == 'R') {
  /* dump the Rx_buffer[] */

  /* determine the number of bytes in the data field */
  disable_interrupt();
  in = Rx_in_index;
  out = Rx_out_index;
  enable_interrupt();

  if (in >= out) count = in - out;
  else count = RX_BUFFER_SIZE - (out - in);

  CRT_print_code("Rx_out_index= ");
  CRT_print_HEX_word(out);
  CRT_print_code("  Rx_in_index= ");
  CRT_print_HEX_word(in);
  CRT_print_code("  Number of bytes= ");
  CRT_print_HEX_word(count);
  CRT_print_code("\n");

  if (!param1_entered) {
    param1 = last_param1;
    param2 = param1 + 255;
  }
  if (!param2_entered) param2 = param1 + 255;
  if (param2 > RX_BUFFER_SIZE) {
    param2 = RX_BUFFER_SIZE;
    last_param1 = 0;
  }
  else last_param1 = param2 + 1;

  j = param1 & 0x0f;
  CRT_print_HEX_word(param1);
  CRT_print_code(": ");

  /* pad the line with spaces to align display for modulo 16 */
  for (i=0;i<j;i++) CRT_print_code("   ");

  for (i=param1;i<=param2;i++) {
    if (j++ == 16) {
      /* force a line feed */
```

Debug.c

```
      CRT_print_code("\n");
      CRT_print_HEX_word(i);
      CRT_print_code(": ");
      j = 1;
    }
    CRT_print_HEX_byte(Rx_buffer[i]);
    CRT_print_code(" ");
  }
  CRT_print_code("\n");
}

/*
 ______________________________________________________________________
|
|
| The "T" command dumps one of the transmit buffers, Tx_A_buffer[] o
r |
| Tx_B_buffer[] depending upon the param1 value.  A value of zero
|
| prints out Tx_A_buffer, any other value caused Tx_B_buffer[] to be
|
| displayed.  Interrupts are disabled while the input and output
|
| indexs are read from memory to avoid an incorrect pair of pointers
. |
|
|
|______________________________________________________________________
|
*/
else if (command == 'T') {
  /* dump the Tx_buffer[] */

  /* determine the number of bytes in the data field */
  disable_interrupt();
  in = Tx_A_in_index;
  out = Tx_A_out_index;
  enable_interrupt();
  if (in >= out) count = in - out;
  else count = TX_A_BUFFER_SIZE - (out - in);

  CRT_print_code("Tx_A_out_index= ");
  CRT_print_HEX_word(out);
  CRT_print_code("  Tx_A_in_index= ");
  CRT_print_HEX_word(in);
  CRT_print_code("  Number of bytes= ");
  CRT_print_HEX_word(count);
  CRT_print_code("\n");

  if (!param2_entered) {
```

```
    param2 = last_param2 + 256;
  }
  out = param2 + 256;
  last_param2 = param2;

  /* display the data in the buffer */
  if (param1_entered && (param1 == 0)) {
    j = 16;
    if (out > TX_A_BUFFER_SIZE) out = TX_A_BUFFER_SIZE;
    for (i=param2;i<out;i++) {
      /* print the data field */
      if (j++ >= 16) {
        /* force a line feed */
        CRT_print_code("\n");
        CRT_print_HEX_word(i);
        CRT_print_code(": ");
        j = 1;
      }
      CRT_print_HEX_byte(Tx_A_buffer[i]);
      CRT_print_code(" ");
    }
    CRT_print_code("\n");
  }

}

/*
 ------------------------------------------------------------------
|
|
|  The "E" command dumps the error log corresponding to the node
|
|  index entered as param1.  Values greater than 15 reflect nodes on
|
|  channel B. If no parameter is entered, the controllers error log
|
|  is displayed.
|
|__________________________________________________________________
|
*/
else if (command == 'E') {

  /* print out one node's error log */

  CRT_print_code("Node has ");

  count = node_error_count;
  if (count != 0) {
    CRT_print_BCD_byte(count);
```

Debug.c

```
    CRT_print_code(" error(s):\n");

    /* print out the error code bytes in reverse chronological order
*/

    /* point j to the most recently entered item */
    j = node_error_index - 1;
    if (j > 7) j = 7;
    if (count > 8) count = 8;
    for (i=0;i<count;i++) {
      out = node_error_log[j--];
      /* adjust pointer if less than zero */
      if (j > 7) j = 7;
      CRT_print_HEX_byte(out);
      CRT_print_code(" ");
      CRT_print_code(error_text[out]);
    }
  }
  else {
    /* no errors have been logged */
    CRT_print_code("no errors\n");
  }
}

/*
_______________________________________________________________
__|
  |
  | The "D" command displays areas of dual-port memory in the address
  |
  | range specified by param1 and param2.  If both parameters are
  |
  | entered, the display begins at the address of the first and stops
  |
  | at the second address (which is displayed). When entered with one
  |
  | command, it displays 128 bytes starting at the address given in th
e |
  | parameter.  If entered with no parameters, it display 128 bytes
  |
  | starting at the last address displayed in the previous "D" command
. |
  | No limit checking is done on the address supplied.  Addresses abov
e |
  | 0x3ff will be aliased back to address 0 in the dual port RAM.
  |
  | Addresses entered between 0x1000 and 0x1fff will access the 82C200
  |
  | for channel A (which is mapped to xdata address 0x9000).  Values
  |
```

```
|  between 0x2000 and 0x2fff will access the 82C200 for channel B
|
|  (xdata address 0xa000).  Values between 0x8000 and 0xffff will
|
|  access the 80C32's main SRAM at xdata address 0x0
|
|
|
|_______________________________________________________________
|
*/
else if (command == 'D') {
  /* display memory */
  if (!param1_entered) {
    param1 = last_param1;
    param2 = param1 + 127;
  }
  if (!param2_entered) param2 = param1 + 127;

  j = param1 & 0x0f;
  CRT_print_HEX_word(param1);
  CRT_print_code(": ");

  /* pad the line with spaces to align display for modulo 16 */
  for (i=0;i<j;i++) CRT_print_code("   ");

  for (i=param1;i<=param2;i++) {
    if (j++ == 16) {
      /* force a line feed */
      CRT_print_code("\n");
      CRT_print_HEX_word(i);
      CRT_print_code(": ");
      j = 1;
    }
    CRT_print_HEX_byte(mem_ptr[i] & 0xff);
    CRT_print_code(" ");
  }
  last_param1 = i;
}

/*
 ________________________________________________________________
|
|
|  The "M" command modified a single byte in dual-port memory.  Two
|
|  parameters are required.  The first is interpreted as an address
|
|  and the second is the byte data to be written at that address.  If
|
```

Debug.c

```
|  both paramters are not supplied, no action is taken.  Like the "D"
|
|  command, no range checking is done on the address.  Values above
|
|  0x8000 will effectively modify memory in 80C32 xdata address space
|
|  starting at address 0x0.
|
|
|
|________________________________________________________________
—|
*/
else if (command == 'M') {
  /* modify memory */
  if (param1_entered &  param2_entered) {
    CRT_print_HEX_word(param1);
    CRT_print_code("=");
    CRT_print_HEX_byte(param2);
    mem_ptr[param1] = param2;
  }
  else CRT_print_code("?");
}

/*
  ________________________________________________________________
—
 |
 |
 |  The "W" command writes a canned message to the specified node.
 |
 |
 |
 |________________________________________________________________
—|
*/
else if (command == 'W') {
  /* write CANBUS */
  if (param1_entered) {
    CRT_print_code("CANBUS message sent to node ");
    CRT_print_HEX_word(param1);
    data_buffer[0] = 0x00;
    data_buffer[1] = 0x11;
    data_buffer[2] = 0x22;
    data_buffer[3] = 0x33;
    data_buffer[4] = 0x44;
    data_buffer[5] = 0x55;
    data_buffer[6] = 0x66;
    data_buffer[7] = 0x77;
    Tx_en_buffer(param1, 1, 8, data_buffer);
  }
```

Debug.c

```
  else CRT_print_code("?");
}

/*
 ______________________________________________________________________
_|
 |
 |  The "I" displays the contents of the A/D buffer.
 |
 |
 |
 |_____________________________________________________________________
_|
*/
else if (command == 'I') {

  CRT_print_code("  POT  BUFFKV   CLCOM     IFB PWMCONT   KVCOM BUFFI
FB     VCT\n");
  for (i=0;i<8;i++) {
    CRT_print_BCD_word(AD_buffer[i]);
    CRT_print_code("   ");
  }
}

/*
 ______________________________________________________________________
_|
 |
 |  The "O" command writes a value to a DAC channel.
 |
 |_____________________________________________________________________
_|
*/
else if (command == 'O') {
  /* write DAC */
  if (param1_entered &  param2_entered) {
    CRT_print_code("DAC channel ");
    CRT_print_HEX_word(param1);
    CRT_print_code("=");
    CRT_print_HEX_byte(param2);
    Write_DAC(param1,param2);
  }
  else {
    /* display current value */
    CRT_print_code("KVSET  ISET\n");
    CRT_print_code(" ");
    CRT_print_BCD_byte(DA_buffer[0]);
    CRT_print_code("    ");
    CRT_print_BCD_byte(DA_buffer[1]);
```

Debug.c

```
    }
  }

  /*
   ______________________________________________________________________
__
  |
  |
  |  The "S" command displays/changes the IFB threshold
  |
  |______________________________________________________________________
__|
  */
  else if (command == 'S') {
    if (param1_entered) {
      /* set new threshold */
      IFB_threshold = param1_BCD;
      Enable_E2_write();
      if (Get_uPAK_switch()) Write_E2(E2_IFB_THRESHOLD_MP,IFB_threshold
);
      else Write_E2(E2_IFB_THRESHOLD_RP,IFB_threshold);
    }
    /* display current value */
    if (Get_uPAK_switch()) CRT_print_code("HP404 IFB threshold = ");
    else CRT_print_code("RansPak 1000 IFB threshold = ");
    CRT_print_BCD_word(IFB_threshold);
    CRT_print_code(" uA");
  }

  /*
   ______________________________________________________________________
__
  |
  |
  |  The "U" command displays/changes the CSSNSA pulse width
  |
  |______________________________________________________________________
__|
  */
  else if (command == 'U') {
    if (param1_entered) {
      /* set new pulse width */
      CSSNSA_pulse_width = param1_BCD;
      Enable_E2_write();
      Write_E2(E2_CSSNSA_PULSE_WIDTH,CSSNSA_pulse_width);
      /* reset timer */
      CSSNSA_rep_timer = 0;
      CSSNSA_pulse_timer = 0;
    }
    /* display current value */
    CRT_print_code("CSSNSA pulse width = ");
```

Debug.c

```
  CRT_print_BCD_word(CSSNSA_pulse_width);
  CRT_print_code(" ms");
}

/*
 ____________________________________________________________________
__|
  |
  |  The "P" command displays/changes the CSSNSA rep time (5 msec incr)
  |
  |____________________________________________________________________
__|
*/
else if (command == 'P') {
  if (param1_entered) {
    /* set new rep time */
    CSSNSA_reset_time = param1_BCD/5;
    Enable_E2_write();
    Write_E2(E2_CSSNSA_RESET_TIME,CSSNSA_reset_time);
    /* reset timer */
    CSSNSA_rep_timer = 0;
    CSSNSA_pulse_timer = 0;
  }
  /* display current value */
  CRT_print_code("CSSNSA rep time = ");
  CRT_print_BCD_word(CSSNSA_reset_time * 5);
  CRT_print_code(" ms");
}

/*
 ____________________________________________________________________
__|
  |
  |  The "A" command displays/changes the KVFB ramp delta
  |
  |____________________________________________________________________
__|
*/
else if (command == 'A') {
  if (param1_entered) {
    /* set new delta */
    RAWKVFB_delta = param1_BCD/2;
    Enable_E2_write();
    Write_E2(E2_RAWKVFB_DELTA,RAWKVFB_delta);
  }
  /* display current value */
  CRT_print_code("KVFB ramp delta = ");
  CRT_print_BCD_word(RAWKVFB_delta*2);
  CRT_print_code(" kV/sec");
```

Debug.c

```
}
/*
 ___________________________________________________________
|
|
|  The "F" command displays/changes the FB_FAULT_TIMER
|
|___________________________________________________________
|
*/
else if (command == 'F') {
  if (param1_entered) {
    /* set new FB FAULT DELAY */
    FB_FAULT_DELAY = param1_BCD/5;
    Enable_E2_write();
    Write_E2(E2_FB_FAULT_DELAY,FB_FAULT_DELAY);
  }
  /* display current value */
  CRT_print_code("FB FAULT DELAY = ");
  CRT_print_BCD_word(FB_FAULT_DELAY * 5);
  CRT_print_code(" msec");
}

/*
 ___________________________________________________________
|
|
|  The "G" command displays/changes the FB_FAULT_MASK_COUNT
|
|___________________________________________________________
|
*/
else if (command == 'G') {
  if (param1_entered) {
    /* set new FB FAULT MASK COUNT */
    FB_FAULT_MASK_COUNT = param1_BCD/5;
    Enable_E2_write();
    Write_E2(E2_FB_FAULT_MASK_COUNT,FB_FAULT_MASK_COUNT);
  }
  /* display current value */
  CRT_print_code("FB FAULT MASK COUNT = ");
  CRT_print_BCD_word(FB_FAULT_MASK_COUNT * 5);
  CRT_print_code(" msec");
}

/*
 ___________________________________________________________
```

Debug.c

```
  |
  |
  |  The "N" command displays/changes the number of di/dt filter sample
s |
  |___________________________________________________________________
__|
  */
  else if (command == 'N') {
    if (param1_entered) {
      /* set new value */
      number_of_DI_samples = param1_BCD;
      Enable_E2_write();
      Write_E2(E2_NUMBER_OF_DI_SAMPLES,number_of_DI_samples);
    }
    /* display current value */
    CRT_print_code("number_of_DI_samples = ");
    CRT_print_BCD_word(number_of_DI_samples);
  }

  /*
   ___________________________________________________________________
__
  |
  |
  |  The "Q" command displays/changes the number of A/D filter samples
  |
  |___________________________________________________________________
__|
  */
  else if (command == 'Q') {
    if (param1_entered) {
      /* set new value */
      if (param1 > 8) param1 = 8;
      number_of_filter_samples = param1_BCD;
      Enable_E2_write();
      Write_E2(E2_NUMBER_OF_FILTER_SAMPLES,number_of_filter_samples);
    }
    /* display current value */
    CRT_print_code("number_of_filter_samples = ");
    CRT_print_BCD_word(number_of_filter_samples);
  }

  /*
   ___________________________________________________________________
__
  |
  |
  |  The "L" command displays/changes the di/dt filter delta
  |
  |___________________________________________________________________
__|
```

Debug.c

```
*/
else if (command == 'L') {
  if (param2_entered) {
    /* set new value */
    Enable_E2_write();
    Write_E2(E2_DI_DELTA + param1_BCD,param2_BCD);
    CRT_print_code("di/dt delta entry ");
    CRT_print_BCD_byte(param1_BCD);
    CRT_print_code(" = ");
    CRT_print_BCD_word(param2_BCD);
    /* update active selection, if just loaded */
    if (param1_BCD == DI_entry) DI_delta = param2_BCD;
  }
  else if (param1_entered) {
    /* display existing value */
    CRT_print_code("di/dt delta entry ");
    CRT_print_BCD_byte(param1_BCD);
    CRT_print_code(" = ");
    CRT_print_BCD_word(Read_E2(E2_DI_DELTA + param1_BCD));
  }
  else {
    /* display all current values */
    CRT_print_code("di/dt delta table:\n");
    CRT_print_code("entry    value\n");
    for (i=0;i<10;i++) {
      CRT_print_BCD_byte(i);
      CRT_print_code("      ");
      CRT_print_BCD_word(Read_E2(E2_DI_DELTA + i));
      if (i == DI_entry) CRT_print_code("<-- current setting");
      CRT_print_code("\n");
    }
  }
}

/*
 ____________________________________________________________________
|
|
| The "Z" command toggles the debug enabled flag.  No parameters are
|
| required.
|
|
|
|____________________________________________________________________
|
*/
else if (command == 'Z') {
  /* toggle debug_enabled flag */
  if (debug_enabled) {
```

```
    debug_enabled = FALSE;
    CRT_print_code("Debug display disabled - Type Z to enable.");
  }
  else {
    debug_enabled = TRUE;
    CRT_print_code("Debug display enabled - Type Z to disable.");
  }
}

/*
 ---------------------------------------------------------------------
|
|
|  The "B" command restores the default values (from ROM) in the
|
|  E2PROM.
|
|
|
|---------------------------------------------------------------------
|
*/
else if (command == 'B') {
  Restore_E2_defaults();
  CRT_print_code("\nE2PROM defaults restored\n");

  /* read in values just written */
  Init_app();
}

/*
 ---------------------------------------------------------------------
|
|
|  The "X" command toggles the monitor mode flag.  No parameters are
|
|  required.
|
|
|
|---------------------------------------------------------------------
|
*/
else if (command == 'X') {
  /* toggle monitor_mode flag */
  if (monitor_mode) {
    monitor_mode = FALSE;
    CRT_erase_screen();
  }
```

Debug.c

```
    else {
      monitor_mode = TRUE;
      Init_monitor();
    }
  }

  /*
   ____________________________________________________________________
__|
  |
  |  The "H" (help) command prints the menu.  No parameters are require
d.|
  |
  |
  |____________________________________________________________________
__|
  */
  else if (command == 'H') {
    /* print the menu */
    Init_sign_on();
    Print_menu();
  }

  else CRT_print_code("?");

  /* prepare for next command */
  CRT_print_code("\n");
  message_received = FALSE;

  /* zero out the KB buffer pointers to accept the next command */
  KB_in_index      = 0;
  KB_out_index     = 0;

}
```

E2prom.c

```
/*
 ____________________________________________________________________________
|
|
| CANBUS MODULAR CONTROLLER - E2PROM Driver Module
|
|
| File name: e2prom.c
|
|
| Created:  10/28/95  RES
|
|
| Procedures defined in this module:
|   Read_E2()
|   Write_E2()
|   Enable_E2_write()
|   Disable_E2_write()
|   Pulse_E2_clk()
|   Send_opcode()
|   Send_address()
|   Get_data()
|   Send_data()
|
|
| Public variables defined by this module:
|   port2_image
|
|
| Revision History:
|   10/28/95  Initial version
|
|
|____________________________________________________________________________
```

E2prom.c

```
|
*/

#include "common.h"                   /* common definitions        */
#include "board.h"                    /* hardware specific defines */
#include "crtio.h"                    /* define I/O function       */
#include <io8096.h>                   /* 8096 special function register
s */

#pragma EJECT
/*----------------- External Procedure References --------------------*
/
extern void   Delay(u_char msec);
extern void   Watchdog(void);

/*----------------- External Variable References ---------------------*
/

/*------------- Public Variable Definitions -----------------*/
u_char port2_image;

#pragma EJECT
/*
 ________________________________________________________________________
|
|
|  Pulse_E2_clk()
|
|
|
|  Pulses the E2PROM clock one time.
|
|
|
|  Inputs:
|
|    none
|
|
|
|  Returns:
|
|    none
|
|
|
|  Error flags set by this procedure:
|
|    none
|
|
```

```
|
|_____________________________________________________________
|
*/

void Pulse_E2_clk(void) {

  port2_image |= E2_SK;       /* set SK */
  IO_PORT2 = port2_image;
  IO_PORT2 = port2_image;
  IO_PORT2 = port2_image;
  IO_PORT2 = port2_image;
  IO_PORT2 = port2_image;
  port2_image &= ~E2_SK;      /* clear SK */
  IO_PORT2 = port2_image;
  IO_PORT2 = port2_image;
  IO_PORT2 = port2_image;
  IO_PORT2 = port2_image;
}

/*
 _____________________________________________________________
|
|
|  Send_opcode()
|
|
|
|  Sends the three bit opcode to the E2PROM in preparation for a read
|
|  or write cycle.
|
|
|
|  Inputs:
|
|    u_char   opcode
|
|
|
|  Returns:
|
|    none
|
|
|
|  Error flags set by this procedure:
|
|    none
|
|
```

```
|
|_______________________________________________________________________
|
*/

void Send_opcode(u_char opcode) {

  /* set CS high */
  port2_image |= E2_CS;
  IO_PORT2 = port2_image;
  Pulse_E2_clk();

  /* send start bit */
  port2_image |= E2_DI;
  IO_PORT2 = port2_image;
  Pulse_E2_clk();

  /* send opcode bit */
  if ((opcode & 0x02) > 0) port2_image |= E2_DI;
  else port2_image &= ~E2_DI;
  IO_PORT2 = port2_image;
  Pulse_E2_clk();

  /* send opcode bit */
  if ((opcode & 0x01) > 0) port2_image |= E2_DI;
  else port2_image &= ~E2_DI;
  IO_PORT2 = port2_image;
  Pulse_E2_clk();

}

/*
 _______________________________________________________________________
|
|
|  Send_address()
|
|
|
|  Sends the six bit address to the E2PROM in preparation for a read
|
|  or write cycle.
|
|
|
|  Inputs:
|
|    u_char   addr
|
|
|
```

```
|  Returns:
|
|    none
|
|
|
|  Error flags set by this procedure:
|
|    none
|
|
|
|___________________________________________________________________
|
*/

void Send_address(u_char addr) {

  /* send address bit A5 */
  if ((addr & 0x20) > 0) port2_image |= E2_DI;
  else port2_image &= ~E2_DI;
  IO_PORT2 = port2_image;
  Pulse_E2_clk();

  /* send address bit A4 */
  if ((addr & 0x10) > 0) port2_image |= E2_DI;
  else port2_image &= ~E2_DI;
  IO_PORT2 = port2_image;
  Pulse_E2_clk();

  /* send address bit A3 */
  if ((addr & 0x08) > 0) port2_image |= E2_DI;
  else port2_image &= ~E2_DI;
  IO_PORT2 = port2_image;
  Pulse_E2_clk();

  /* send address bit A2 */
  if ((addr & 0x04) > 0) port2_image |= E2_DI;
  else port2_image &= ~E2_DI;
  IO_PORT2 = port2_image;
  Pulse_E2_clk();

  /* send address bit A1 */
  if ((addr & 0x02) > 0) port2_image |= E2_DI;
  else port2_image &= ~E2_DI;
  IO_PORT2 = port2_image;
  Pulse_E2_clk();

  /* send address bit A0 */
  if ((addr & 0x01) > 0) port2_image |= E2_DI;
  else port2_image &= ~E2_DI;
```

E2prom.c

```
  IO_PORT2 = port2_image;
  Pulse_E2_clk();
}

/*
 _____________________________________________________________________
|
|
|  Get_data()
|
|
|
|  Read the 16 data bits from the E2PROM to complete a read cycle.
|
|
|
|  Inputs:
|
|    none
|
|
|
|  Returns:
|
|    u_int    value
|
|
|
|  Error flags set by this procedure:
|
|    none
|
|
|
|_____________________________________________________________________
|
*/

u_int Get_data(void) {

  u_int  value;
  u_char i;

  value = 0;

  for (i=0;i<16;i++) {
    value <<= 1;
    Pulse_E2_clk();
    if ((IO_PORT2 & E2_DO) != 0) value |= 1;
  }
```

E2prom.c

```
  /* place device in standby */
  Pulse_E2_clk();
  Pulse_E2_clk();
  /* clear CS  */
  port2_image &= ~E2_CS;
  IO_PORT2 = port2_image;
  Pulse_E2_clk();

  return(value);
}

/*
 |-------------------------------------------------------------------
 |
 |
 |  Send_data()
 |
 |
 |
 |  Writes the 16 data bits to the E2PROM to complete a write cycle.
 |
 |
 |
 |  Inputs:
 |
 |    u_int    value
 |
 |
 |
 |  Returns:
 |
 |    none
 |
 |
 |
 |  Error flags set by this procedure:
 |
 |    none
 |
 |
 |
 |___________________________________________________________________
 |
*/

void Send_data(u_int value) {

  u_char i;

  for (i=0;i<16;i++) {
    if ((value & 0x8000) > 0) port2_image |= E2_DI;
```

E2prom.c

```
    else port2_image &= ~E2_DI;
    IO_PORT2 = port2_image;
    value <<= 1;
    Pulse_E2_clk();
  }
  port2_image &= ~E2_DI;   /* DI = 0 */
  IO_PORT2 = port2_image;

  /* turn off CS */
  port2_image &= ~E2_CS;
  IO_PORT2 = port2_image;
  Pulse_E2_clk();

  /* raise CS and wait for DO to go high */
  port2_image |= E2_CS;
  IO_PORT2 = port2_image;
  Pulse_E2_clk();
  Pulse_E2_clk();
  while (IO_PORT2 & E2_DO == 0) {
    Pulse_E2_clk();
  }

  /* turn off CS to put device in standby */
  port2_image &= ~E2_CS;
  IO_PORT2 = port2_image;
  Pulse_E2_clk();
  Pulse_E2_clk();
}

/*
 ____________________________________________________________________________
|
|
|  Read_E2()
|
|
|
|  Reads a word from E2PROM at the specified address.
|
|
|
|  Inputs:
|
|    u_char   address
|
|
|
|  Returns:
|
|    u_int    value
|
```

```
|
|
|  Error flags set by this procedure:
|
|    none
|
|
|
|________________________________________________________________
|
*/

u_int Read_E2(u_char addr) {

  Watchdog();
  Send_opcode(6);
  Watchdog();
  Send_address(addr);
  port2_image &= ~E2_DI;  /* set DI = 0 */
  IO_PORT2 = port2_image;
  return (Get_data());
}

/*
 ________________________________________________________________
|
|
|  Write_E2()
|
|
|
|  Writes a word to  E2PROM at the specified address.
|
|
|
|  Inputs:
|
|    u_char   address
|
|    u_int    value
|
|
|
|  Returns:
|
|    none
|
|
|
|  Error flags set by this procedure:
|
```

```
|    none
|
|
|
|________________________________________________________________
|
*/

void Write_E2(u_char addr, u_int value) {

  Watchdog();
  Send_opcode(5);
  Watchdog();
  Send_address(addr);
  Watchdog();
  Send_data(value);
  Watchdog();
  Delay(10);
}

/*
 ________________________________________________________________
|
|
|  Enable_E2_write()
|
|
|
|  Writes the EWEN command to the E2PROM.
|
|
|
|  Inputs:
|
|    none
|
|
|
|  Returns:
|
|    none
|
|
|
|  Error flags set by this procedure:
|
|    none
|
|
|
|________________________________________________________________
```

E2prom.c

```
|
*/

void Enable_E2_write(void) {

  Send_opcode(4);

  port2_image |= E2_DI;  /* set DI = 1 */
  IO_PORT2 = port2_image;
  Pulse_E2_clk();

  port2_image |= E2_DI;  /* set DI = 1 */
  IO_PORT2 = port2_image;
  Pulse_E2_clk();

  port2_image &= ~E2_DI;  /* set DI = 0 */
  IO_PORT2 = port2_image;
  Pulse_E2_clk();

  port2_image &= ~E2_DI;  /* set DI = 0 */
  IO_PORT2 = port2_image;
  Pulse_E2_clk();

  port2_image &= ~E2_DI;  /* set DI = 0 */
  IO_PORT2 = port2_image;
  Pulse_E2_clk();

  port2_image &= ~E2_DI;  /* set DI = 0 */
  IO_PORT2 = port2_image;
  Pulse_E2_clk();

  port2_image &= ~E2_CS;    /* CS = 0 */
  IO_PORT2 = port2_image;
  Pulse_E2_clk();
  Pulse_E2_clk();
  port2_image |= E2_CS;    /* CS = 1 */
  IO_PORT2 = port2_image;
  Pulse_E2_clk();
  Pulse_E2_clk();

  /* place device in standby */
  port2_image &= ~E2_CS;    /* CS = 0 */
  IO_PORT2 = port2_image;
  Pulse_E2_clk();
  Delay(10);

}

/*
|
```

E2prom.c

```
|
|  Disable_E2_write()
|
|
|
|  Writes the EWDS command to the E2PROM.
|
|
|
|  Inputs:
|
|    none
|
|
|
|  Returns:
|
|    none
|
|
|
|  Error flags set by this procedure:
|
|    none
|
|
|
|________________________________________________________________________
|
*/

void Disable_E2_write(void) {

  Send_opcode(4);

  port2_image &= ~E2_DI;  /* set DI = 0 */
  IO_PORT2 = port2_image;
  Pulse_E2_clk();

  port2_image &= ~E2_DI;  /* set DI = 0 */
  IO_PORT2 = port2_image;
  Pulse_E2_clk();

  port2_image &= ~E2_DI;  /* set DI = 0 */
  IO_PORT2 = port2_image;
  Pulse_E2_clk();

  port2_image &= ~E2_DI;  /* set DI = 0 */
  IO_PORT2 = port2_image;
  Pulse_E2_clk();
```

E2prom.c

```
  port2_image &= ~E2_DI;  /* set DI = 0 */
  IO_PORT2 = port2_image;
  Pulse_E2_clk();

  port2_image &= ~E2_DI;  /* set DI = 0 */
  IO_PORT2 = port2_image;
  Pulse_E2_clk();

  port2_image &= ~E2_CS;    /* CS = 0 */
  IO_PORT2 = port2_image;
  Pulse_E2_clk();
  Pulse_E2_clk();

  port2_image |= E2_CS;    /* CS = 1 */
  IO_PORT2 = port2_image;
  Pulse_E2_clk();
  Pulse_E2_clk();

  /* place device in standby */
  port2_image &= ~E2_CS;    /* CS = 0 */
  IO_PORT2 = port2_image;
  Pulse_E2_clk();
  Delay(10);

}
```

Filter.c

```
/*
 ____________________________________________________________________________
|
|
|  ITW PROCESS PCB - Digital Filter Module
|
|
|
|  Filename: filter.c
|
|
|
|  Created:  05/27/96  RES
|
|
|
|  Procedures defined in this module:
|
|    Filter()
|
|
|
|  Public variables defined by this module:
|
|
|
|  Revision History:
|
|  V2.5 05-27-96  Initial version.
|
|
|
|
|
|
|
|
|
|____________________________________________________________________________
|
*/

#include "common.h"                     /* common definitions        */
#include "board.h"                      /* hardware specific defines */
#include "crtio.h"                      /* define I/O function       */
#include <io80196.h>                    /* 80C196 special function regist
ers */

#pragma EJECT
/*----------------- External Procedure References -------------------*/
```

Filter.c

```
/*----------------- External Variable References ---------------------*
/

/*----------------- Public Variable Definitions ----------------------*
/
u_long mul_result;
u_int  filter_gain;
u_int  filter_A11;
u_int  filter_A21;
u_int  filter_B01;
u_int  filter_B11;
u_int  filter_B21;
u_int  filter_M00;
u_int  filter_M01;
u_int  filter_M11;
u_int  filter_M21;
u_int  filter_M02;

/*
 ____________________________________________________________________
|
|
|  Filter()
|
|
|
|  This procedure computes the next data point of the digital filter.
|
|
|
|  Inputs:
|
|    none
|
|
|
|  Returns:
|
|    none
|
|
|
|  Calls:
|
|    none
|
|____________________________________________________________________
|
*/

void Filter(void) {
```

Filter.c

```
  /* read AD converter */
  filter_M00 += AD_RESULT_LO;

  /* restart HSO, A/D */
  AD_COMMAND = 0;
  HSO_COMMAND = 0x0f;

  /* compute next filter output value */
  mul_result = filter_M00 * filter_gain;
  mul_result >>= 2;
  filter_M01 = mul_result + 2;
  mul_result = filter_M11 * filter_A11;
  mul_result <<= 2;
  filter_M01 = filter_M01 + mul_result + 2;

}

/*
 ________________________________________________________________________
|
|
| Init_filter()
|
|
|
| This procedure initializes the variables used by the digital filter.
|
|
|
| Inputs:
|
|   none
|
|
|
| Returns:
|
|   none
|
|
|
| Calls:
|
|   none
|
|________________________________________________________________________
|
*/
```

Filter.c

```
void Init_filter(void) {

  filter_gain = 0x42b3;
  filter_A11 = 0x9c40;
  filter_A21 = 0xc774;
  filter_B01 = 0x3932;
  filter_B11 = 0x0;
  filter_B21 = 0xc6ce;
  filter_M11 = 0x0;
  filter_M21 = 0x0;

  Filter();
}
```

```
/*
 ____________________________________________________________________________
|
|
|  CANbus MODULAR NODE - Hardware Specific Module
|
|
|
|  File:     hw.c
|
|
|
|  void   Watchdog(void)
|
|  u_char Get_set_switch(void)
|
|  u_char Get_HVON_switch(void)
|
|  u_char Get_HVOFF_switch(void)
|
|  u_char Get_INT_switch(void)
|
|  u_char Get_RDY_switch(void)
|
|  u_char Get_DIP_switch(void)
|
|  u_char Get_LOCAL_switch(void)
|
|  u_char Get_K_switch(void)
|
|  u_char Get_node_ID(void)
|
|  u_char Get_SEQ_number(void)
|
|  void   Set_LEDs(u_char LED, u_char on_flag)
|
|  void   Write_DAC(u_char channel, u_char value)
|
|  void   SYSFAIL_LED(u_char on
|
|  void   CAN_A_LED(u_char on)
|
|  void   Write_LED(u_int kv, u_int i)
|
|  void   Write_LED_special(u_int entry)
|
|  void   Init_board(void)
|
|
|
|  Revision History:
```

Hw.c

```
|
|
|
|___________________________________________________________________
|
*/

#include "common.h"                  /* common definitions       */
#include "board.h"                   /* hardware specific defines */
#include <io80196.h>                 /* 80C196 special function regist
ers */

/*------------- External Function References -------------------------*
/
extern void   Word_to_BCD(u_int input_word,char *ASCII_ptr);
extern void   Leading_zero_suppression(u_char digits,char *ASCII_ptr);

/*------------- External Variable References -------------------------*
/
extern u_int  DA_buffer[2];

/*------------- Public Variable Definitions --------------------------*
/


/*
 ____________________________________________________________________
|
|
|  Watchdog(void)
|
|
|
|  Pulses watchdog timer
|
|
|
|  Inputs:
|
|    none
|
|
|
|  Returns:
|
|    none
|
|
|
|  Calls:
|
```

```
|    none
|
|
|
|_______________________________________________________________________
|
*/

void Watchdog(void) {

  WDSTROBE = 1;  /* watchdog strobe */
  WDSTROBE = 0;
}

/*
 _______________________________________________________________________
|
|
|  Get_LOCAL_switch()
|
|
|
|  Reads the LOCAL mode switch and return 1 if local mode
|
|
|
|  Inputs:
|
|    none
|
|
|
|  Returns:
|
|    u_char  1 = local, 0 = "remote"
|
|
|
|  Calls:
|
|    none
|
|
|
|_______________________________________________________________________
|
*/

u_char Get_LOCAL_switch(void) {

  /* the LOCAL switch is on Port 2 bit 3 */
```

```
  if (~IO_PORT2 & 0x08) return (1);
  else return(0);
}

/*
 ________________________________________________________________________
|
|
|  Get_set_switch()
|
|
|
|  Reads the SET switch and returns 1 bit  to the caller
|
|
|
|  Inputs:
|
|    none
|
|
|
|  Returns:
|
|    u_char  1 = switch pushed, 0 = not pushed
|
|
|
|  Calls:
|
|    none
|
|
|
|________________________________________________________________________
|
*/

u_char Get_set_switch(void) {

  /* the SET switch is on HSI.2 */

  if (HSI_STATUS & 0x20) return (0);
  else return(1);
}

/*
 ________________________________________________________________________
|
|
```

Hw.c

```
|  Get_HVON_switch()
|
|
|
|  Reads the HVON switch (DIP switch position 3) and returns 1 if set.
|
|
|
|  Inputs:
|
|    none
|
|
|
|  Returns:
|
|    u_char  1 = HV on
|
|
|
|  Calls:
|
|    none
|
|
|
|________________________________________________________________________
|
*/

u_char Get_HVON_switch(void) {

  /* the HVON switch is in the DIP switch #3, (bit 5) active low */

  if (SWITCHES & 0x20) return(1);
  else return(0);
}

/*
 ________________________________________________________________________
|
|
|  Get_uPAK_switch()
|
|
|
|  Reads the uPAK switch (DIP switch position 4) and returns 1 if set.
|
|
|
|  Inputs:
```

Hw.c

```
|
|    none
|
|
|
|  Returns:
|
|    u_char  1 = uPAK, 0 = RANSPAK 1000
|
|
|
|  Calls:
|
|    none
|
|
|
|_____________________________________________________________________
|
*/

u_char Get_uPAK_switch(void) {

  /* the uPAK switch is in the DIP switch #4, (bit 4) */

  if (SWITCHES & 0x10) return(1);
  else return(0);
}

/*
 _____________________________________________________________________
|
|
|  Get_HVOFF_switch()
|
|
|
|  Reads the HV on/off switch and returns 1 bit  to the caller
|
|
|
|  Inputs:
|
|    none
|
|
|
|  Returns:
|
|    u_char  1 = HV off pushed
|
```

```
|
|
|  Calls:
|
|    none
|
|
|
|_____________________________________________________________________
|
*/

u_char Get_HVOFF_switch(void) {

  /* the HVOFF switch is on HSI.0 */

  if (HSI_STATUS & 0x02) return (0);
  else return(1);
}

/*
 _____________________________________________________________________
|
|
|  Get_INT_switch()
|
|
|
|  Reads the interlock switch and returns 1 bit  to the caller
|
|
|
|  Inputs:
|
|    none
|
|
|
|  Returns:
|
|    u_char  1 = interlock shorted to ground
|
|
|
|  Calls:
|
|    none
|
|
|
|_____________________________________________________________________
```

Hw.c

```
|
*/

u_char Get_INT_switch(void) {

  /* the interlock is on HSI.3 */

  if (HSI_STATUS & 0x80) return (0);
  else return(1);
}

/*
 ______________________________________________________________________
|
|
|  Get_RDY_switch()
|
|
|
|  Reads the ready switch and returns 1 bit  to the caller
|
|
|
|  Inputs:
|
|    none
|
|
|
|  Returns:
|
|    u_char  1 = RDY switch pushed
|
|
|
|  Calls:
|
|    none
|
|
|
|______________________________________________________________________
|
*/

u_char Get_RDY_switch(void) {

  /* the RDY switch is on HSI.1 */

  if (HSI_STATUS & 0x08) return (0);
  else return(1);
```

```
}
/*
 ___________________________________________________________________
|
|
|  Get_DIP_switch()
|
|
|
|  Reads the DIP switch and returns 4 bits to the caller
|
|
|
|  Inputs:
|
|    none
|
|
|
|  Returns:
|
|    u_char  value
|
|
|
|  Calls:
|
|    none
|
|
|
|___________________________________________________________________
|
*/
u_char Get_DIP_switch(void) {
  return (~NODE_SWITCHES & 0x0f);
}
/*
 ___________________________________________________________________
|
|
|  Get_K_switch()
|
|
|
|  Reads the DIP switch and returns 2 bits to the caller
|
```

```
|
|
|  Inputs:
|
|    none
|
|
|
|  Returns:
|
|    u_char  value
|
|
|
|  Calls:
|
|    none
|
|
|
|________________________________________________________________________
|
*/

u_char Get_K_switch(void) {

  return ((SWITCHES & 0xc0) >> 6);
}

/*
 ________________________________________________________________________
|
|
|  Get_node_ID()
|
|
|
|  Reads the DIP switch and returns 4 bits to the caller
|
|
|
|  Inputs:
|
|    none
|
|
|
|  Returns:
|
|    u_char  value
|
```

```
|
|
|  Calls:
|
|    none
|
|
|
|____________________________________________________________________
|
*/

u_char Get_node_ID(void) {

  return ((NODE_SWITCHES & 0xf0) >> 4);
}

/*
 ____________________________________________________________________
|
|
|  Get_SEQ_switch()
|
|
|
|  Reads the BCD switch and returns 4 bits to the caller
|
|
|
|  Inputs:
|
|    none
|
|
|
|  Returns:
|
|    u_char  value
|
|
|
|  Calls:
|
|    none
|
|
|
|____________________________________________________________________
|
*/
u_char Get_SEQ_switch(void) {
```

Hw.c

```
  return (~SWITCHES & 0x0f);
}

/*
 ------------------------------------------------------------------------
|
|
|  Set_LEDs()
|
|
|
|  Sets the specified LED on or off.
|
|
|
|  Inputs:
|
|    u_char  LED identifier
|
|    u_char  value (1=on, 0=off)
|
|
|
|  Returns:
|
|    none
|
|
|
|  Calls:
|
|    none
|
|
|
|________________________________________________________________________
|
*/
void Set_LEDs(u_char LED, u_char on_flag) {

  u_char hso_chan;

  if      (LED == FBFLT_LED) hso_chan = 0;
  else if (LED == OVCUR_LED) hso_chan = 1;
  else if (LED == HVRDY_LED) hso_chan = 2;
  else if (LED == HVON_LED)  hso_chan = 3;
  else return;

  /* keep SW timer interrupts from breaking up the following sequence *
/
```

```
  disable_interrupt();
  HSO_COMMAND = hso_chan + ((~on_flag & 0x01) << 5);
  HSO_TIME = TIMER1 + 4;
  enable_interrupt();
}

/*
 ______________________________________________________________________
|
|
|  Write_DAC()
|
|
|
|  Loads the specified value into a DAC channel.
|
|
|
|  Inputs:
|
|    u_char  channel (0=KVSET, 1=ISET)
|
|    u_char  value
|
|
|
|  Returns:
|
|    none
|
|
|
|  Calls:
|
|    none
|
|
|
|______________________________________________________________________
|
*/
void Write_DAC(u_char channel, u_char value) {

  if (channel == 0) {
    DAC0 = value;
    DA_buffer[0] = value;
  }
  else {
    DAC1= value;
    DA_buffer[1] = value;
  }
```

Hw.c

```
}
/*
 ------------------------------------------------------------------------
|
|
|  SYSFAIL_LED(state)
|
|
|
|  Turns RED LED on or off
|
|
|
|  Inputs:
|
|    u_char   0 = off, 1 = on
|
|
|
|  Returns:
|
|    none
|
|
|
|  Calls:
|
|    none
|
|
|
|------------------------------------------------------------------------
|
*/
void SYSFAIL_LED(u_char on) {
  RED_LED = ~on;
}
void CAN_A_LED(u_char on) {
  GREEN_LED = on;
}
/*
 ------------------------------------------------------------------------
|
```

Hw.c

```
|
|  Write_LED()
|
|
|
|  Writes a string of characters to the LED display.
|
|
|
|  Inputs:
|
|    u_int   kv
|
|    u_int   i
|
|
|
|  Returns:
|
|    none
|
|
|
|  Calls:
|
|    none
|
|
|
|___________________________________________________________________
|
*/

void Write_LED(u_int kv, u_int i) {

  u_char LED_data[8];
  u_char temp_buffer[8];

  /* fill up buffer with input data */

  Word_to_BCD(kv,temp_buffer);
  Leading_zero_suppression(5,temp_buffer);
  if (temp_buffer[2] == ' ') LED_data[2] = 0x0f;
  else LED_data[2] = temp_buffer[2] & 0x0f;
  if (temp_buffer[3] == ' ') LED_data[1] = 0x0f;
  else LED_data[1] = temp_buffer[3] & 0x0f;
  LED_data[0] = temp_buffer[4] & 0x0f;

  Word_to_BCD(i,temp_buffer);
  Leading_zero_suppression(5,temp_buffer);
  if (temp_buffer[2] == ' ') LED_data[5] = 0x0f;
```

Hw.c

```
    else LED_data[5] = temp_buffer[2] & 0x0f;
    if (temp_buffer[3] == ' ') LED_data[4] = 0x0f;
    else LED_data[4] = temp_buffer[3] & 0x0f;
    LED_data[3] = temp_buffer[4] & 0x0f;

    /* write MODE bit */
    IO_PORT1 = 0xf0;
    IO_PORT1 = 0xd0;
    IO_PORT1 = 0xf0;

    /* write character 0 */
    IO_PORT1 = 0xe0 | LED_data[0];
    IO_PORT1 = 0xc0 | LED_data[0];
    IO_PORT1 = 0xe0 | LED_data[0];

    /* write character 1 */
    IO_PORT1 = 0xe0 | LED_data[1];
    IO_PORT1 = 0xc0 | LED_data[1];
    IO_PORT1 = 0xe0 | LED_data[1];

    /* write character 2 */
    IO_PORT1 = 0xe0 | LED_data[2];
    IO_PORT1 = 0xc0 | LED_data[2];
    IO_PORT1 = 0xe0 | LED_data[2];

    /* write character 3 */
    IO_PORT1 = 0xe0 | LED_data[3];
    IO_PORT1 = 0xc0 | LED_data[3];
    IO_PORT1 = 0xe0 | LED_data[3];

    /* write character 4 */
    IO_PORT1 = 0xe0 | LED_data[4];
    IO_PORT1 = 0xc0 | LED_data[4];
    IO_PORT1 = 0xe0 | LED_data[4];

    /* write character 5 */
    IO_PORT1 = 0xe0 | LED_data[5];
    IO_PORT1 = 0xc0 | LED_data[5];
    IO_PORT1 = 0xe0 | LED_data[5];

    /* write character 6 */
    IO_PORT1 = 0xe0;
    IO_PORT1 = 0xc0;
    IO_PORT1 = 0xe0;

    /* write character 7 */
    IO_PORT1 = 0xe0;
    IO_PORT1 = 0xc0;
    IO_PORT1 = 0xe0;

}
```

```
/*
 ________________________________________________________________________
|
|
|  Write_LED_special()
|
|
|
|  Writes a string of characters to the LED display.
|
|
|
|  Inputs:
|
|    u_int   value
|
|
|
|  Returns:
|
|    none
|
|
|
|  Calls:
|
|    none
|
|
|
|________________________________________________________________________
|
*/

void Write_LED_special(u_int value) {

  u_char LED_data[8];
  u_char temp_buffer[8];

  /* fill up buffer with input data */

  LED_data[2] = 0x05;     /* S */
  LED_data[1] = 0x0d;     /* L */
  LED_data[0] = 0x0e;     /* P */

  Word_to_BCD(value,temp_buffer);
  Leading_zero_suppression(5,temp_buffer);
  if (temp_buffer[2] == ' ') LED_data[5] = 0x0f;
  else LED_data[5] = temp_buffer[2] & 0x0f;
  if (temp_buffer[3] == ' ') LED_data[4] = 0x0f;
```

```
    else LED_data[4] = temp_buffer[3] & 0x0f;
    LED_data[3] = temp_buffer[4] & 0x0f;

    /* write MODE bit */
    IO_PORT1 = 0xf0;
    IO_PORT1 = 0xd0;
    IO_PORT1 = 0xf0;

    /* write character 0 */
    IO_PORT1 = 0xe0 | LED_data[0];
    IO_PORT1 = 0xc0 | LED_data[0];
    IO_PORT1 = 0xe0 | LED_data[0];

    /* write character 1 */
    IO_PORT1 = 0xe0 | LED_data[1];
    IO_PORT1 = 0xc0 | LED_data[1];
    IO_PORT1 = 0xe0 | LED_data[1];

    /* write character 2 */
    IO_PORT1 = 0xe0 | LED_data[2];
    IO_PORT1 = 0xc0 | LED_data[2];
    IO_PORT1 = 0xe0 | LED_data[2];

    /* write character 3 */
    IO_PORT1 = 0xe0 | LED_data[3];
    IO_PORT1 = 0xc0 | LED_data[3];
    IO_PORT1 = 0xe0 | LED_data[3];

    /* write character 4 */
    IO_PORT1 = 0xe0 | LED_data[4];
    IO_PORT1 = 0xc0 | LED_data[4];
    IO_PORT1 = 0xe0 | LED_data[4];

    /* write character 5 */
    IO_PORT1 = 0xe0 | LED_data[5];
    IO_PORT1 = 0xc0 | LED_data[5];
    IO_PORT1 = 0xe0 | LED_data[5];

    /* write character 6 */
    IO_PORT1 = 0xe0;
    IO_PORT1 = 0xc0;
    IO_PORT1 = 0xe0;

    /* write character 7 */
    IO_PORT1 = 0xe0;
    IO_PORT1 = 0xc0;
    IO_PORT1 = 0xe0;

}

/*
```

Hw.c

```
|
|
|  Init_board()
|
|
|
|  Initialize variables for specific boards.
|
|
|
|  Inputs:
|
|    none
|
|
|
|  Returns:
|
|    none
|
|
|
|  Calls:
|
|    none
|
|
|
|
|
*/

void Init_board(void) {

  /* zero DAC's */
  Write_DAC(0,0);
  Write_DAC(1,0);

  /* turn off front panel LEDs */
  Set_LEDs(FBFLT_LED,0);
  Set_LEDs(OVCUR_LED,0);
  Set_LEDs(HVRDY_LED,0);
  Set_LEDs(HVON_LED,0);

  /* zero the seven segment display */
  Write_LED(0,0);

}
```

Init.c

```
/*
 ______________________________________________________________________
|
|
|  CANBUS MODULAR CONTROLLER - Initialization Module
|
|
|
|  Filename: init.c
|
|
|
|  Created:  05/15/93  RES
|
|
|
|  Procedures defined in this module:
|
|    Init()
|
|
|
|  Public variables defined by this module:
|
|    none.
|
|
|
|  Revision History:
|
|  V2.2 12-02-95  Added port2_image to support E2PROM
|
|
|
|
|
|______________________________________________________________________
|
*/

#include "common.h"                      /* common definitions       */
#include "board.h"                       /* hardware specific defines */
#include <io80196.h>                     /* 80C196 special function regist
ers */

#pragma EJECT

/*------------- Public Variable Definitions -----------------*/
/* none */

/*---------------------- External References -----------------------*/
```

Init.c

```
extern void   Init_canbus(void);
extern void   Init_app(void);
extern void   Init_debug_monitor(void);
extern void   Init_rtc(void);
extern void   Init_Rx_buffer(void);
extern void   Init_serial_IO(void);
extern void   Init_board(void);
extern void   Init_sign_on(void);
extern void   Init_Tx_buffer(void);
extern u_char Self_test(void);
extern void   Watchdog(void);
extern void   SYSFAIL_LED(u_char value);
extern void   CAN_A_LED(u_char value);
extern void   Init_board(void);
extern void   Init_error_log(void);
extern void   Delay(void);
extern void   Init_monitor(void);

/*----------------- External Variable References ---------------------*
/
extern u_char debug_enabled;
extern u_char monitor_mode;
extern u_int  next_AD_time;
extern u_int  next_RTC_time;
extern u_char port2_image;

#pragma EJECT
/*
 ----------------------------------------------------------------------
|
|
|  Init()
|
|
|
|  This procedure initializes the hardware at power-up.  All
|
|  LEDs are turned on during initialization.  The 82C200 interrupt
|
|  is configured as level triggered.  This way if the second message
|
|  asserts an interrupt after the first one has caused an interrupt,
|
|  the interrupt line will be held low after the interrupt routine has
|
|  finshed - thus causing a second interrupt.  If the input has been
|
|  configured as edge triggered, the second CANbus interrupt would not
|
|  have been noticed.  This procedure calls several other procedures
|
```

```
|  to initialize other portions of the software.
|
|
|
|  Inputs:
|
|    none
|
|
|
|  Returns:
|
|    none
|
|
|
|  Calls:
|
|    Init_serial_IO()
|
|    Init_board()
|
|    Init_rtc()
|
|    Init_sign_on()
|
|    Self_test()
|
|    Init_debug_monitor()
|
|    Init_canbus()
|
|    Init_Rx_buffer()
|
|    Init_Tx_buffer()
|
|
|
|____________________________________________________________________
|
*/

void Init(void) {

  unsigned short  temp;

  disable_interrupt();

  Watchdog();

  /* turn on the CAN LED, SYSFAIL LED */
```

```
  SYSFAIL_LED(1);
  CAN_A_LED(0);

  /* -------------------------- i/o ports ---------------------------
-- */

  IOC0 = 0x55;
  /*      0101$0101B
          |||| ||||
          |||| |||+------ HSI.0 input: *1=enable; 0=disable
          |||| ||+------- 1=Timer2 reset each write
          |||| |+-------- HSI.1 input: *1=enable; 0=disable
          |||| +--------- Timer2 external reset: 1=enable; 0=disable
          ||||
          |||+----------- HSI.2 input: *1=enable; 0=disable
          ||+------------ Timer2 reset source: 1=HSI.0; 0=T2RST#
          |+------------- HSI.3 input: *1=enable; 0=disable
          +-------------- Timer2 clock source: 1=HSI.1; 0=T2CLK#
  */

  IOC1 = 0x22;
  /*      0010$0010B
          |||| ||||
          |||| |||+------ P2.5: 1=PWM; *0=P2.5
          |||| ||+------- P0.7: *1=ACH7; 0=EXTINT#
          |||| |+-------- Timer1 overflow interrupt: 1=enable; *0=disabl
e
          |||| +--------- Timer2 overflow interrupt: 1=enable; *0=disabl
e
          ||||
          |||+----------- HSO.4 output: 1=enable; *0=disable
          ||+------------ P2.0: *1=TxD; 0=P2.0
          |+------------- HSO.5 output: 1=enable; *0=disable
          +-------------- HSI interrupt: 1=FIFO full: 0=holding reg load
ed
  */

  IOC2 = 0x00;
  /*      0000$0000B
          |||| ||||
          |||| |||+------ 1=enable fast increment of T2
          |||| ||+------- 1=enable T2 as up/down counter
          |||| |+-------- 1=enable divide-by-2 prescaler on PWM
          |||| +--------- not used
          ||||
          |||+----------- 1=A/D clock prescaler disable
          ||+------------ 1=T2 alternate interrupt at 0x8000
          |+------------- 1=enable locked CAM entries
          +-------------- 1=clear entire CAM
  */
```

Init.c

```
  /* set all i/o ports to hi impedance */
  IO_PORT1 = 0xff;
  IO_PORT2 = 0x2f;        /* E2PROM control bits low */
  port2_image = 0x2f;

  /* ------------------------- serial port ----------------------------
-- */

  SP_CON = 0x09;
  /*      0000$1001B
          |||| ||||
          |||| ||++------ MODE:
          |||| ||          00 = Mode 0, synchronous shift register mode
          |||| ||          01 = Mode 1, standard 8-bit async. mode
          |||| ||          10 = Mode 2, 9-bit async., interrupt on bit 8
 set
          |||| ||          11 = Mode 3, 9-bit async.
          |||| |+-------- PEN: 1=enable parity (even)
          |||| +--------- REN: 1=enable receiver, 0=disable
          ||||
          |||+----------- TB8: transmit bit 8
          +++------------ not used */

  /* divide by 77 for 9600 baud with 12 MHz xtal, mode 1 */
  BAUD_REG = 77;       /* lo byte */
  BAUD_REG = 0x80;     /* hi byte (select XTAL as source) */

  /* clear status bits */
  temp = SP_STAT;

  /* ----------------------software timers ----------------------------
-- */

  /* timer 1 - 16 bit free running timer with divide-by-8 prescaler
     software timer 0 - 5 msec RTC interrupt
     software timer 1 - 1 msec A/D conversion interrupt
  */

  TIMER1 = 0;

  /* these variables are incremented every interrupt to keep
     errors from accumulating in the interrupt intervals */

  next_RTC_time = 30000;         /* 40 msec from now */
  next_AD_time = 30375;          /* 40.5 msec from now */

  /* software timer 0 */
  HSO_COMMAND = 0x18;
  HSO_TIME = next_RTC_time;

  /* wait for holding register to clear */
```

Init.c

```
  while (IOS0 & 0x80);

  /* software timer 1 */
  HSO_COMMAND = 0x19;
  HSO_TIME = next_AD_time;

  /* -------------------- interrupt controller ------------------------
-- */

  /* clear pending interrupt bits */
  INT_PEND  = 0;
  INT_PEND1 = 0;

  /* enable selected interrupt sources */
  INT_MASK = 0x20;
  /*   0010$0000B
       |||| ||||
       |||| |||+------ TIMER OVF: 0 = disable
       |||| ||+------- A/D DONE:  0 = disable
       |||| |+-------- HSI DATA:  0 = disable
       |||| +--------- HSO PIN:   0 = disable
       ||||
       |||+----------- HSI.0 PIN: 0 = disable
       ||+------------ S/W TIMER: 1 = enable  (RTC)
       |+------------- SER PORT:  0 = disable (use RI and TI)
       +-------------- EXT INT:   0 = disable (use EXTINT1) */

  INT_MASK1 = 0x23;
  /*   0010$0011B
       |||| ||||
       |||| |||+------ TI:        1 = enable (TxRDY)
       |||| ||+------- RI:        1 = enable (RxRDY)
       |||| |+-------- HSI4:      0 = disable
       |||| +--------- T2 CAP:    0 = disable
       ||||
       |||+----------- T2 OVF:    0 = disable
       ||+------------ EXT INT1:  1 = enable (82C200)
       |+------------- FIFO FULL: 0 = disable
       +-------------- NMI:       0 = reserved */

  /* -------------------- initialize software -------------------------
-- */

  Init_serial_IO();
  Init_board();
  Init_rtc();
  Init_app();

  Watchdog();

  Init_canbus();
```

Init.c

```
  Init_Rx_buffer();
  Init_Tx_buffer();

  Watchdog();

  enable_interrupt();

  Init_sign_on();

  SYSFAIL_LED(0);

  monitor_mode = TRUE;

  if (monitor_mode) Init_monitor();
  else Init_debug_monitor();
}
```

Io.c

```
/*
 ------------------------------------------------------------------------
|
|
|  CANBUS MODULAR CONTROLLER - CAN I/O Module
|
|
|
|  Filename: io.c
|
|
|
|  Created:  05/15/93  RES
|
|
|
|  Procedures defined in this module:
|
|    CAN_A_abort()
|
|    CAN_interrupt()
|
|    Init_canbus()
|
|    Write_canbus()
|
|
|
|  Public variables defined by this module:
|
|    Tx_A_busy
|
|
|
|  Revision History:
|
|
|
|
|
|________________________________________________________________________
|
*/
/* this program MUST be compiled as less than full optimization to keep
   the compiler from optimizing out successive reads to the CANDAT regi
ster */

#include "common.h"                     /* common definitions         */
#include "board.h"                      /* hardware specific defines */
#include "crtio.h"                      /* define I/O function        */
#include "errors.h"                     /* error code assignments     */
```

Io.c

```
#include "82C200.h"                 /* define 82C200 structures  */
#include <io80196.h>                /* 80C196 special function regist
ers */

/*----------------- External Procedure References --------------------*/
extern void   Flash_LED(u_char chan);
extern void   Flash_RED_LED(void);
extern void   Log_error(u_char error_code);
extern u_char Get_node_ID(void);

/*----------------- External Variable References ----------------------*
/
extern u_char CAN_A_watchdog_timer;
extern u_char debug_enabled;
extern u_char Rx_buffer[RX_BUFFER_SIZE];
extern u_int  Rx_in_index;
extern u_int  Rx_out_index;
extern u_char Tx_A_buffer[TX_A_BUFFER_SIZE];
extern u_int  Tx_A_in_index;
extern u_int  Tx_A_out_index;

/*----------------- Public Variable Definitions ----------------------*
/
u_char Tx_A_busy;
struct CAN_struct *CAN;

/*
 ________________________________________________________________________
|
|
|  Init_canbus()
|
|
|
|  This procedure initializes the CANBUS for the selected channel and
|
|  resets the busy flag and the watchdog timer for that channel.  To
|
|  intialize both CANbus channels, this routine needs to be called
|
|  twice.  For detailed information on the 82C200 set-up consult the
|
|  component data sheet and "82C200.h".
|
|
|
|  Inputs:
|
|    a bit value to select the channel to be reset (0= Ch. A)
|
|
```

```
|
|  Returns:
|
|    none
|
|
|
|  Calls:
|
|    none
|
|
|
|_______________________________________________________________________
|
*/

void Init_canbus(void)
{
  u_char  i;

  CAN_A_watchdog_timer = 0;
  Tx_A_busy = FALSE;
  CAN = (struct CAN_struct *) 0xff00;

  /* issue a reset request */
  CAN->CTRL = RESET_REQUEST;

  /* wait till device goes into reset */
  while((CAN->CTRL & RESET_REQUEST) == 0);

  /* 82C200 initialization */
  CAN->ACR  = Get_node_ID() << 4;    /* my node */
  CAN->AMR  = 0x0f;                  /* accept messages:
                                        from - all nodes
                                        to   - only my node */
  CAN->BTR0 = (SJW << 6) | BRP;
  CAN->BTR1 = (SAM << 7) | (TSEG2 << 4) | TSEG1;
  CAN->OCR  = NORMAL_OUTPUT_MODE |
              TX0_PUSH_PULL      |
              TX0_POLARITY_NORM  |
              TX1_PUSH_PULL      |
              TX1_POLARITY_INVERT;
  CAN->CTRL = RESET_REQUEST              |
              RECEIVE_INTERRUPT_ENABLE   |
              TRANSMIT_INTERRUPT_ENABLE  |
              ERROR_INTERRUPT_ENABLE     |
              OVERRUN_INTERRUPT_ENABLE   |
              SYNCH_TWO_EDGES;

  CAN->CTRL = RECEIVE_INTERRUPT_ENABLE   |    /* clears RESET_REQUEST */
```

```
              TRANSMIT_INTERRUPT_ENABLE |
              ERROR_INTERRUPT_ENABLE    |
              OVERRUN_INTERRUPT_ENABLE  |
              SYNCH_TWO_EDGES;

  /* wait for reset request to clear */
  while((CAN->CTRL & RESET_REQUEST) != 0);

  /* configure the 82C200 for 1x CLK OUT */
  CAN->CLK = 0x03;

  /* zero out the receive buffer */
  for (i=0;i<8;i++) CAN->RxDATA[i] = 2*i;

  /* zero out the transmit buffer */
  for (i=0;i<8;i++) CAN->TxDATA[i] = i;

}

/*
 ____________________________________________________________________
|
|
|  Write_canbus()
|
|
|
|  This procedure transmits a message on the CANbus by sending it to
|
|  the 82C200.  The value of the node_index passed to the routine
|
|  selects the physical channel.  Node_index values from 0 to 15 go
|
|  to channel A, values from 16 to 31 go to channel B. Message lengths
|
|  greater than 8 bytes are truncated to eight.  This procedure
|
|  assumes that the 82C200 is ready to receive the message, if it is
|
|  not, an error flag is set.  The transmit ID is formed by conaten-
|
|  ating the destination node (limited to the range 0x0 to 0xf) and
|
|  the controller's own node address.  The DLC byte is formed by the
|
|  command and the length fields along with the RTR bit, which is
|
|  carried in the MSB of the command passed to the routine.  The data
|
|  field is loaded from the idata pointer supplied.  The actual trans-
|
```

```
| mission is started when the TRANSMISSION_REQUEST bit is set in the
|
| 82C200 command register.  The LED corresponding to the channel
|
| slected is flashed.
|
|
|
| See the 82C200.h include file for definitions of the register names
|
| and bit field masks used in this procedure.
|
|
|
| Inputs:
|
|   an unsigned character containing the node_index (0 to 31)
|
|   an unsigned character containing the command (3 bits)
|
|   an unsigned character containing the length of the data (1 to 8)
|
|   a pointer to an unsigned char string in idata holding the data
|
|
|
| Returns:
|
|   none
|
|
|
| Calls:
|
|   Flash_LED()
|
|
|
|__________________________________________________________________________
|
*/

#pragma EJECT
void Write_canbus_A(void) {

  u_char  node_index;
  u_char  command;
  u_char  length;
  u_char  i;
  u_int   x;
```

```
  /* see if another message is waiting in the Ch A Tx_buffer */
  if (Tx_A_in_index != Tx_A_out_index) {
    /* send the next message waiting in the buffer */

    x = Tx_A_out_index;
    node_index = Tx_A_buffer[x];
    Tx_A_out_index++;
    if (Tx_A_out_index >= TX_A_BUFFER_SIZE) Tx_A_out_index = 0;

    x = Tx_A_out_index;
    command = Tx_A_buffer[x];
    Tx_A_out_index++;
    if (Tx_A_out_index >= TX_A_BUFFER_SIZE) Tx_A_out_index = 0;

    x = Tx_A_out_index;
    length = Tx_A_buffer[x];
    Tx_A_out_index++;
    if (Tx_A_out_index >= TX_A_BUFFER_SIZE) Tx_A_out_index = 0;
    /* error check on length field */
    if (length > 8) {
      length = 8;
      Log_error(TX_MESSAGE_TOO_LONG_A);
    }

    /* if transmitter is not ready, signal an error */
    if ((CAN->STAT & TRANSMIT_BUFFER_RELEASED) == 0) {
      Flash_RED_LED();
      Log_error(TX_NOT_READY_A);
    }
    else {
      /* build the outgoing message */
      CAN->TID = (node_index << 4) | Get_node_ID();
      CAN->TDLC = (command << 5) | length;
      if ((command & 0x80) != 0) CAN->TDLC |= 0x10;
      for (i=0;i<length;i++) {
        CAN->TxDATA[i] = Tx_A_buffer[Tx_A_out_index++];
        if (Tx_A_out_index >= TX_A_BUFFER_SIZE) Tx_A_out_index = 0;
      }

      /* start the transmitter */
      CAN_A_watchdog_timer = 100;
      Tx_A_busy = TRUE;
      CAN->CMD = TRANSMISSION_REQUEST;
      Flash_LED(CHANNEL_A);
    }
  }
}

/*
```

CAN_interrupt()

This procedure defines the interrupt handler for the 82C200 when it is the only CANBUS peripheral in the system. It is activated by an external interrupt pin on the CPU. The Tx_A buffer is used Four different interrupt conditions are evaluated:

1. Transmit buffer empty
2. Receive buffer ready
3. Overrun error
4. Error condition Transmit buffer empty -

The busy flag is cleared (Tx_A_busy) and the watchdog timer (CAN_A_watchdog_timer) is set to zero. The watchdog timers are decremented by the real time clock interrupt procedure. An error condition is detected by the real time clock procedure if the timer expires before the busy bit is reset. If a message is waiting in the Tx_A_buffer[], it is retrieved and loaded into the 82C200. The code used to accomplish this is identical to that discussed in the procedure Write_canbus(), above. Before the transmitter is restarted, the watchdog timer and busy flag are set to signify a message in process. The channel B LED is flashed.

Receive buffer full -

Received messages are deposited into a common Rx_buffer for later processing by main(). The available space is checked to see if the message will fit. Space is computed in one of two ways. If the input pointer (Rx_in_index) is greater or equal to the output pointer (Rx_out_index), then the empty space is above the input pointer and below the output pointer and can be computed by subtracting the difference between the two pointers (the occupied space) from the buffer size, RX_BUFFER_SIZE (as defined in at.h). This also handles the case of buffer empty when both pointers are equal. Otherwise, the space available is just the difference between the two pointers. The room required is the length of the message, as reported by the 82C200, plus three bytes for the message header (node_index, command, and length). If insufficient space exists, the message is discarded, an error counter is incremented, and the red LED is flashed. When the message is placed in the Rx_buffer[], the RID and RDLC registers in the 82C200 are converted into three bytes of header: the node_index (where a value greater than 15 implies channel B), the command field, and the data field length. The data is then copied into the Rx_buffer. The total number of bytes loaded into the buffer is the length plus three (a maximum of 11 per message).

```
|
| Overrun Error -
|
|
|
| Overrun error are logged in an error counter and then cleared by
|
| writing the proper pattern to the 82C200 command register.  No
|
| action is performed.
|
|
|
| Error Interrupt -
|
|
|
| Error interrupts are logged and the red LED is flashed.  If the
|
| 82C200's status register indicates that it was "on bus" when the
|
| error occurred and the "error status" bit is not set, then the
|
| message in process is aborted.  If the device was "off bus" when
|
| the error occurred, then the 82C200 is reinitialized with a call to
|
| Init_canbus().  It is undecided if re-initializing the 82C200 from
|
| an interrupt service routine is the best way of doing this.  An
|
| alternate method would be to set a flag and have main() reset the
|
| 82C200.
|
|
|
| Inputs:
|
|   none
|
|
|
| Returns:
|
|   none
|
|
|
| Calls:
|
```

```
|    Flash_LED()
|
|    Flash_RED_LED()
|
|
|
|________________________________________________________________________
|
*/

void CAN_interrupt(void) {

  u_char  ch_A_INTR;
  u_char  ch_A_STAT;
  u_char  node_index;
  u_char  command;
  u_char  length;
  u_char  i;
  u_int   room;
  u_int   x;

  /* strobe the test port */

  /* read the Interrupt Registers of the 82C200 to determine reason
     for the interrupt */
  ch_A_INTR = CAN->INTR & 0x1f;        /* mask off reserved bits */

  while (ch_A_INTR != 0) {
    /* analyze the INTR codes */

    /* look for a transmit complete interrupt on ch. A */
    if ((ch_A_INTR & TRANSMIT_INTERRUPT) != 0) {

      Tx_A_busy = FALSE;
      CAN_A_watchdog_timer = 0;

      /* see if another message is waiting in the Ch A Tx_buffer */
      if (Tx_A_in_index != Tx_A_out_index) {
        /* send the next message waiting in the buffer */

        x = Tx_A_out_index;
        node_index = Tx_A_buffer[x];
        Tx_A_out_index++;
        if (Tx_A_out_index >= TX_A_BUFFER_SIZE) Tx_A_out_index = 0;

        x = Tx_A_out_index;
        command = Tx_A_buffer[x];
        Tx_A_out_index++;
        if (Tx_A_out_index >= TX_A_BUFFER_SIZE) Tx_A_out_index = 0;

        x = Tx_A_out_index;
```

Io.c

```
        length = Tx_A_buffer[x];
        Tx_A_out_index++;
        if (Tx_A_out_index >= TX_A_BUFFER_SIZE) Tx_A_out_index = 0;
        /* error check on length field */
        if (length > 8) {
          length = 8;
          Log_error(TX_MESSAGE_TOO_LONG_A);
        }

        /* if transmitter is not ready, signal an error */
        if ((CAN->STAT & TRANSMIT_BUFFER_RELEASED) == 0) {
          Flash_RED_LED();
          Log_error(TX_NOT_READY_A);
        }
        else {
          /* build the outgoing message */
          CAN->TID = (node_index << 4) | Get_node_ID();
          CAN->TDLC = (command << 5) | length;
          if ((command & 0x80) != 0) CAN->TDLC |= 0x10;
          for (i=0;i<length;i++) {
            CAN->TxDATA[i] = Tx_A_buffer[Tx_A_out_index++];
            if (Tx_A_out_index >= TX_A_BUFFER_SIZE) Tx_A_out_index = 0;
          }
          /* start the transmitter */
          CAN_A_watchdog_timer = 100;
          Tx_A_busy = TRUE;
          CAN->CMD = TRANSMISSION_REQUEST;
          Flash_LED(CHANNEL_A);
        }
      }

    }

    /* look for a received message on ch. A */
    if ((ch_A_INTR & RECEIVE_INTERRUPT) != 0) {

      /* flash the LED */
      Flash_LED(0);

      /* compute the room left in the buffer */
      if (Rx_in_index >= Rx_out_index)
        room = RX_BUFFER_SIZE - (Rx_in_index - Rx_out_index);
      else room = Rx_out_index - Rx_in_index;

      /* we need three extra bytes to save the node, cmd, and length */
      length = CAN->RDLC & 0x0f;
      if (length > 8) length = 8;
      if (room > (length + 4)) {
        /* message will fit in buffer */
        Rx_buffer[Rx_in_index++] = CAN->RID >> 4;           /* node_in
dex */
```

```
      if (Rx_in_index >= RX_BUFFER_SIZE) Rx_in_index = 0;
      Rx_buffer[Rx_in_index++] = CAN->RDLC >> 5;            /* command
*/

      if (Rx_in_index >= RX_BUFFER_SIZE) Rx_in_index = 0;
      Rx_buffer[Rx_in_index++] = length;                    /* length
*/

      if (Rx_in_index >= RX_BUFFER_SIZE) Rx_in_index = 0;
      for (i=0;i<length;i++) {
        Rx_buffer[Rx_in_index++] = CAN->RxDATA[i];          /* data */
        if (Rx_in_index >= RX_BUFFER_SIZE) Rx_in_index = 0;
      }
    }
    else {
      /* Rx_buffer is full, discard message */
      Log_error(RX_BUFFER_FULL);
      Flash_RED_LED();
    }

    /* release the receive buffer */
    CAN->CMD = RELEASE_RECEIVE_BUFFER;

  }

  /* test for an overrun on ch. A */
  if ((ch_A_INTR & OVERRUN_INTERRUPT) != 0) {

    /* clear the overrun error */
    CAN->CMD = CLEAR_OVERRUN;

    /* print out a diagnostic message */
    Log_error(CAN_OVERRUN_A);
    Flash_RED_LED();
  }

  /* test for an error overflow on ch. A */
  if ((ch_A_INTR & ERROR_INTERRUPT) != 0) {
    /* select channel A */
    Flash_RED_LED();

    /* read the status register */
    ch_A_STAT = CAN->STAT;

    /* check to see if 82C200 is "on bus" */
    if ((ch_A_STAT & BUS_STATUS) == 0) {
      /* 82C200 was "on bus",  check error status */
      Log_error(CAN_ERROR_ON_BUS_A);
      if ((ch_A_STAT & ERROR_STATUS) != 0) {
      }
      else {
```

Io.c

```
        }
        /* abort any transmission in progress */
        CAN->CMD = ABORT_TRANSMISSION;
      }
      else {
        /* 82C200 was "off bus",  check error status */

        /* I don't think that we should re-initialize the can bus chip
           in the interrupt service routine, but it is done for for sim
plicity */
        Log_error(CAN_ERROR_OFF_BUS_A);
        Init_canbus();
      }
    }

    /* re-read interrupt flags to see if a new message just came in */
    ch_A_INTR = CAN->INTR & 0x1f;        /* mask off reserved bits */
  }

  /* strobe the test port */

}

/*
 ---------------------------------------------------------------------
|
|
|  CAN_A_abort()
|
|
|
|  This procedure aborts any transmission in process in channel A by
|
|  writing to the command register.
|
|
|
|  Inputs:
|
|    none
|
|
|
|  Returns:
|
|    none
|
|
|
|  Calls:
|
```

```
|    none
|
|_____________________________________________________________________________
|
*/

void CAN_A_abort(void) {

  CAN->CMD = ABORT_TRANSMISSION;
}
```

Log.c

```
/*
 ______________________________________________________________________
|
|
|  CANbus MODULAR NODE - Node Error Log Module
|
|
|
|  File:     log.c
|
|
|
|  Revised:  11/22/94  SCA  V0.70
|
|
|
|  Revision History:
|
|
|
|______________________________________________________________________
|
*/

#include "common.h"                    /* common definitions       */
#include "board.h"                     /* hardware specific defines */

/*------------- External Function References -------------------------*
/

/*------------- External Variable References -------------------------*
/

/*------------- Public Variable Definitions --------------------------*
/
u_char  node_error_log[ERROR_LOG_SIZE];
u_char  node_error_count;
u_char  node_error_index;

/*------------- Function Prototypes ----------------------------------*
/
void Init_error_log(void);
void Log_error(u_char error_code);

/*
 ______________________________________________________________________
|
|
|  Init_error_log()
|
|
```

Log.c

```
|
|  This procedure zeros the error log and the error count.
|
|
|
|____________________________________________________________________
|
*/

void Init_error_log(void) {

  u_char i;

  /* clear the error log */
  for (i=0;i<ERROR_LOG_SIZE;i++) node_error_log[i] = 0;

  /* clear the error count */
  node_error_count = 0;
  node_error_index = 0;
}

/*
 ____________________________________________________________________
|
|
|  Log_error()
|
|
|
|  These procedures log the supplied error into the node error
|
|  log and then increment the node error count.
|
|
|
|  Inputs:
|
|    an unsigned char containing the error code
|
|
|
|  Returns:
|
|    none
|
|
|
|  Calls:
|
|    none
|
```

Log.c

```
|________________________________________________________________________
|
*/

void Log_error(u_char error_code) {

  /* wrap errors around if buffer fills */
  if (node_error_index  >= ERROR_LOG_SIZE) node_error_index = 0;

  /* place the error code in the error log at the current index */
  node_error_log[node_error_index++] = error_code;
  node_error_count++;
}
```

Main.c

```
/*
 ___________________________________________________________________________
|
|
|  CANBUS MODULAR CONTROLLER - Main Module
|
|
|
|  Filename: main.c
|
|
|
|  Created:  05/15/93  RES
|
|
|
|  Procedures defined in this module:
|
|    main()
|
|
|
|  Public variables defined by this module:
|
|    none.
|
|
|
|  Revision History:
|
| V2.96 08-15-97  Removed high freq fault code  RES
|
| V3.00 09-04-97  Added PB state machine for di/dt control  RES
|
|
|
|
|
|___________________________________________________________________________
|
*/

#include "common.h"                    /* common definitions        */
#include "board.h"                     /* hardware specific defines */
#include "crtio.h"                     /* define I/O function       */
#include "errors.h"                    /* error code assignments    */
#include "e2prom.h"                    /* define E2PROM addresses   */
#include <io8096.h>                    /* 8096 special function register
s */
```

Main.c

```
#pragma EJECT

/*---------------------- External References -------------------------*/
extern void   Watchdog(void);
extern void   Debug_monitor(void);
extern void   De_buffer(u_char *node_index_ptr,
                        u_char *command_ptr,
                        u_char *length_ptr,
                        u_char *data_ptr);
extern void   Tx_en_buffer(u_char node_index,
                           u_char command,
                           u_char length,
                           u_char *data_ptr);
extern void   Echo(void);
extern void   Init(void);
extern void   Load_input_buffer(u_char node_index,
                        u_char length,
                        u_char *data_ptr);
extern u_char Rx_buffer_ready(void);
extern u_char Get_node_ID(void);
extern u_char Get_set_switch(void);
extern void   Send_message(u_char node_index);
extern void   CAN_A_LED(u_char value);
extern void   SYSFAIL_LED(u_char value);
extern void   Write_LED(u_int kv, u_int i);
extern void   Decode_command(u_char *data_buffer);
extern void   Update_display(void);
extern void   Rtc06_xmit(void);
extern void   Monitor(void);
extern void   Measure_inputs(void);
extern void   Update_outputs(void);
extern void   Send_status(void);
extern void   Write_DAC(u_char channel, u_char value);
extern void   Write_E2(u_char addr, u_int value);
extern u_int  Read_E2(u_char addr);
extern void   Enable_E2_write(void);

/*------------- External Variable Definitions -----------------*/
extern u_char debug_enabled;
extern u_char message_received;
extern u_char msec_5;
extern u_char display_update;
extern u_char node_error_count;
extern u_char node_error_log[ERROR_LOG_SIZE];
extern u_char monitor_mode;
extern u_int  AD_buffer[10];
extern u_int  KV_set;
extern u_int  I_set;
extern u_char HV_RST_command;
extern u_char HV_ON_command;
extern u_char FLD_TRIG_command;
```

Main.c

```
extern u_char AIR_TRIG_command;
extern u_char DI_entry;

/*--------------- Public Variable Definitions -----------------*/
u_char PB_state;
u_char node_status_timer;


#define NODE_STATUS_TIME   100     /* 1/2 sec */

/* display button time constants (5 msec clock - 200 Hz) */
#define PB_DOWN_MIN          3    /* min down time for a tap */
#define PB_DOWN_MAX        100    /* max down time for a tap */
#define PB_UP_MIN            3    /* min up time for a tap */
#define PB_UP_MAX          100    /* max up time for a tap */
#define PB_LONG_MIN        200    /* min down time for setpoint display
 */
#define PB_DI_INCR         200    /* increment interval for di/dt */
#define PB_TIME_OUT       1000    /* max time allowed in di/dt mode */
#define NUMB_DI_ENTRIES     10    /* # of entries in DI table */

#pragma EJECT

/*
 ______________________________________________________________________
|
|
|  main()
|
|
|
|  Main program loop that calls all other procedures.  Entered upon
|
|  reset.
|
|
|
|  Function of this procedure:
|
|
|
|  1. Initializes all hardware and software functions.
|
|
|
|  2. Enters the main polling loop that does the following:
|
|
|
|    a. Echos any new characters in the KB_buffer[] that have
|
```

Main.c

```
|       appeared since the last scan.
|
|    b. Processes any host command that has been received.
|
|    c. Activates the debugger if a debug command has been received.
|
|    d. Takes received messages out of the Rx_buffer[] and places them
|       in either the dual port RAM or the node queue depending upon
|       the type of node.
|
|    e. Empties the node queues if messages are waiting and space is
|       available in the DP RAM input buffer.
|
|    f. Transmits messages waiting in the DP RAM output buffer.
|
|    g. Performs periodic I/O updates for nodes so programmed.
|
|    h. Performs periodic status updates for nodes so programmed
|
|______________________________________________________________________
|
*/

void main(void) {

  /* local variables used in this module */
  u_char i;
  u_char node_index;
  u_char command;
  u_char length;
  u_char data_buffer[8];
  u_char xmit_buffer[8];
```

Main.c

```
u_int  PB_timer;

/* strobe watchdog */
Watchdog();

/* this is where the program begins */
Init();
Rtc06_xmit();

node_status_timer = 0;

PB_state = 0;
PB_timer = 0;

while (1) {

  /* board-specific I/O activity */
  Watchdog();

  /* echo any characters waiting in the input buffer */
  Echo();

  /* process a debugger command, if any */
  if (message_received) {
    Debug_monitor();
  }


  /* service all received message from the CAN bus, if any */

  while (Rx_buffer_ready()) {

    /* retrieve the next available message from the Rx_buffer */
    De_buffer(&node_index,&command,&length,data_buffer);


    /* determine if the message is for this node */
    if (node_index == Get_node_ID()) {

      /* reset node status timer */
      node_status_timer = NODE_STATUS_TIME;

      /* analyze the command field to determine message type */
      if (command == 0) {

        if (data_buffer[0] == 0x00) {

          /*---------------------------------------------------------
-------------*/
          /* receive: type 0 message, length 01, op-code 00 (node sta
tus polling) */
```

Main.c

```
        /*------------------------------------------------------------
-------------*/

        if(node_error_count == 0) {
          xmit_buffer[0] = NO_ERROR;
        }
        else {
          xmit_buffer[0] = ERROR_PRESENT;
        }

        /*---------------------------*/
        /* transmit: type 0 message */
        /*---------------------------*/
        Tx_en_buffer(Get_node_ID(),          /* node              */
                     0,                      /* command (type 0) */
                     1,                      /* length            */
                     &xmit_buffer);          /* data              */

        if (debug_enabled) {
          CRT_print_code("-> Status Polling\n");
        }
      }

      else if (data_buffer[0] == 0x05) {

        /*------------------------------------------------------------
-----------------*/
        /* receive: type 0 message, length 01, op-code 05 (rtc05 no
de status read) */
        /*------------------------------------------------------------
-----------------*/

        /* copy the 8 byte error log into the transmit buffer */
        for (i=0;i<8;i++) {
          xmit_buffer[i] = node_error_log[i];
        }

        /*---------------------------*/
        /* transmit: type 5 message */
        /*---------------------------*/
        Tx_en_buffer(Get_node_ID(),          /* node              */
                     5,                      /* command (type 5) */
                     node_error_count,       /* length            */
                     &xmit_buffer);          /* data              */

        if (debug_enabled) {
          CRT_print_code("Status Request\n");
        }
      }

      else if (data_buffer[0] == 0x06) {
```

Main.c

```
            /*--------------------------------------------------------
----------*/
            /* receive: type 0 message, length 01, op-code 06 (rtc06 no
de reset) */
            /*--------------------------------------------------------
----------*/

            /* reset board */

            if (debug_enabled) CRT_print_code("Reset Board\n");

            disable_interrupt();
            while (1) {
              /* wait for watchdog timeout */
            }
          }
        }         /* end of type 0 message */

        else if (command == 0x01) {

          if (length == 0x00) {

            /*--------------------------------------------------------
-----*/
            /* receive: type 1 message, length 00 (rtc02 read single bl
ock) */
            /* remote transmission request        (rtr = 1)
     */
            /*--------------------------------------------------------
-----*/

            /*--------------------------------------------*/
            /* transmit: type 4 message (to report data) */
            /*--------------------------------------------*/

            if (debug_enabled) CRT_print_code("Read single block\n");

          }

          else {

            /*--------------------------------------------*/
            /* receive: type 1 message (update outputs) */
            /*--------------------------------------------*/

            /* call a board specific routine to process a command */
            Decode_command(data_buffer);
            Send_status();

          }
```

Main.c

```
      }          /* end of type 1 message */

      else if (command == 0x07) {

        /*------------------------------------------------------------
-------*/
        /* receive: type 7 message, length 00 to 08, any data valid
     */
        /* rtc 0xff (loopback test message)
     */
        /*------------------------------------------------------------
-------*/

        /* copy the received data field into the transmit buffer */

        for (i=0;i<length;i++) xmit_buffer[i] = data_buffer[i];

        /*---------------------------------------------*/
        /* transmit: type 7 message (to echo message) */
        /*---------------------------------------------*/

        Tx_en_buffer(Get_node_ID(), /* source node */
                     7,             /* command     */
                     length,        /* length      */
                     &xmit_buffer); /* data        */

        if (debug_enabled) {
          CRT_print_code("Loopback: ");
          for (i=0;i<length;i++) {
            CRT_print_HEX_byte(data_buffer[i]);
            CRT_print_code(" ");
          }
          CRT_print_code("\n");
        }

      }          /* end of type 7 message */
    }          /*  end of NODE */
  }          /*  if (Rx_buffer_ready())     */

  /* determine if the discrete inputs have changed */

  /* do the periodic IO update */

  if (msec_5) {
    msec_5 = FALSE;
    Measure_inputs();

    /* determine if a communication failure has occurred */
    if (node_status_timer > 0) node_status_timer--;

    if (node_status_timer == 0) {
```

```
  /* set all outputs to zero */
  HV_RST_command      = FALSE;
  HV_ON_command       = FALSE;
  FLD_TRIG_command    = FALSE;
  AIR_TRIG_command    = FALSE;
  KV_set        = 0;
  I_set         = 0;
}
Update_outputs();

/* push button state machine */
switch(PB_state) {

case 0:
  /* key up, waiting for a push */
  if (Get_set_switch()) {
    /* switch is pushed */
    PB_state = 1;
    PB_timer = 0;
  }
  break;

case 1:
  /* key down, start of push */
  if (Get_set_switch()) {
    /* switch is still pushed */
    if (PB_timer > PB_LONG_MIN) {
      /* go to state 2 to display setpoint */
      PB_timer = 0;
      PB_state = 2;
    }
    else {
      /* wait */
      PB_timer++;
    }
  }
  else {
    /* key has been released */
    if (PB_timer < PB_DOWN_MIN) {
      /* not held down long enough for a "tap", abort */
      PB_state = 0;
    }
    if (PB_timer > PB_DOWN_MAX) {
      /* held down too long for a "tap", abort */
      PB_state = 0;
    }
    else {
      /* key held down for right time for "tap #1" */
      PB_timer = 0;
      PB_state = 3;
    }
```

Main.c

```
  }
  break;

case 2:
  /* display setpoint until key released */
  if (Get_set_switch() == 0) {
    /* key released */
    PB_state = 0;
  }
  break;

case 3:
  /* measure the gap between tap #1 and tap #2 */
  if (Get_set_switch()) {
    /* switch is pushed */
    if (PB_timer > PB_UP_MIN) {
      /* go to state 4 to measure second tap */
      PB_timer = 0;
      PB_state = 4;
    }
    else {
      /* gap too short, abort */
      PB_state = 0;
    }
  }
  else {
    /* key has not been pushed */
    if (PB_timer > PB_UP_MAX) {
      /* gap between tap 1 and tap 2 too long, abort */
      PB_state = 0;
    }
    else {
      /* wait */
      PB_timer++;
    }
  }
  break;

case 4:
  /* measure second tap duration */
  if (Get_set_switch()) {
    /* switch is still pushed */
    if (PB_timer > PB_DOWN_MAX) {
      /* tap too long, abort */
      PB_state = 0;
    }
    else {
      /* wait */
      PB_timer++;
    }
  }
```

Main.c

```
  else {
    /* key has been released */
    if (PB_timer < PB_DOWN_MIN) {
      /* not held down long enough, abort */
      PB_state = 0;
    }
    else {
      /* key held down for right time for "tap #2" */
      PB_timer = 0;
      PB_state = 5;
    }
  }
  break;

case 5:
  /* di/dt display state */
  if (Get_set_switch()) {
    /* go to di/dt increment mode */
    PB_state = 6;
    PB_timer = 0;
  }
  else {
    /* increment timer to automatically kick out of this mode */
    PB_timer++;
    if (PB_timer > PB_TIME_OUT) {
      PB_state = 0;
    }
  }
  break;

case 6:
  /* di/dt increment state */
  if (Get_set_switch()) {
    /* switch still pushed */
    PB_timer++;
    if (PB_timer > PB_DI_INCR) {
      PB_timer = 0;
      /* increment di/dt setting */
      if (DI_entry < (NUMB_DI_ENTRIES - 1)) DI_entry++;
      else DI_entry = 0;
    }
  }
  else {
    /* switch released, store last value and return to idle */
    Enable_E2_write();
    Write_E2(E2_DI_ENTRY,DI_entry);
    PB_state = 0;
  }
  break;

default:
```

Main.c

```
        /* error */
        PB_state = 0;
        break;
      }
    }

    if (display_update) {
      display_update = FALSE;
      Update_display();
      if (monitor_mode) Monitor();
    }

  }
}
```

Monitor.c

```
/*
|-------------------------------------------------------------------------
|
| CANBUS MODULAR CONTROLLER - Monitor Module
|
|
|
| Filename: monitor.c
|
|
|
| Created:  05/15/93  RES
|
|
|
| Procedures defined in this module:
|
|   Monitor()
|
|
|
| Public variables defined by this module:
|
|
|
| Revision History:
|
| V2.1 11-14-95  Removed HV_OFF_status and CRT_HV_OFF_status vars.
|
| V2.4 01-31-96  Converted control values to u_int to support 0-999
|
|                uA operation of RANSPAK 1000
|
| V2.7 12-23-96  Changed version number only.
|
| V2.8 02-11-97  Changed to display status, not LED values
|
| V2.9 03-20-97  Changed version number only.
|
| V2.91 06-03-97  Changed version number only.
|
| V2.92 06-09-97  Changed version number only.
|
| V2.93 06-16-97  Changed version number only.
|
| V2.95 07-17-97  Changed version number only.
|
| V2.96 08-15-97  Changed version number only.
|
| V3.00 09-04-97  Changed version number only.
```

Monitor.c

```
|
| V3.01 09-24-97  Changed version number only.
|
|
|
|___________________________________________________________________________
|
*/

#include "common.h"                    /* common definitions        */
#include "board.h"                     /* hardware specific defines */
#include "crtio.h"                     /* define I/O function       */
#include <io8096.h>                    /* 8096 special function register
s */

#pragma EJECT

/*---------------------- External References ------------------------*/
extern u_char Get_DIP_switch(void);
extern u_char Get_uPAK_switch(void);
extern u_char Get_INT_switch(void);
extern u_char Get_K_switch(void);
extern u_char Get_SEQ_switch(void);
extern void   Send_status(void);

/*------------- External Variable Definitions ----------------*/
extern u_char debug_enabled;
extern char   KB_buffer[KB_BUFFER_SIZE];
extern u_char KB_in_index;
extern u_char KB_out_index;
extern u_char message_received;
extern u_char K_table[4];

extern u_int  KV_set;
extern u_int  I_set;
extern u_char HV_RST_command;
extern u_char HV_ON_command;
extern u_char FLD_TRIG_command;
extern u_char AIR_TRIG_command;
extern u_char HV_ON_sequencer;
extern u_char FLD_TRIG_sequencer;
extern u_char AIR_TRIG_sequencer;
extern u_char HV_ON_status;
extern u_char HV_RDY_status;
extern u_char FLD_TRIG_status;
extern u_char AIR_TRIG_status;
extern u_char SEQ_status;
extern u_char SEQ_state;
extern u_char LOCAL_status;
extern u_char PLEN_status;
extern u_char CSSNSA_status;
```

Monitor.c

```
extern u_char FB_fault;
extern u_char OL_fault;
extern u_int  KV_display;
extern u_int  I_display;
extern u_int  VCT;
extern u_int  IFB;
extern u_int  KVCOM;
extern u_int  PWMCOMT;
extern u_int  BUFFIFB;
extern u_int  CLCOM;
extern u_int  BUFFKVFB;
extern u_int  POT;
extern const u_char SEQ_table[10][2];

/*--------------- Public Variable Definitions -----------------*/
u_int  CRT_KV_set;
u_int  CRT_I_set;
u_char CRT_HV_RST_command;
u_char CRT_HV_ON_command;
u_char CRT_FLD_TRIG_command;
u_char CRT_AIR_TRIG_command;
u_char CRT_HV_ON_sequencer;
u_char CRT_FLD_TRIG_sequencer;
u_char CRT_AIR_TRIG_sequencer;
u_char CRT_HV_ON_status;
u_char CRT_HV_RDY_status;
u_char CRT_FLD_TRIG_status;
u_char CRT_AIR_TRIG_status;
u_char CRT_SEQ_status;
u_char CRT_SEQ_state;
u_char CRT_SEQ_number;
u_char CRT_INT_status;
u_char CRT_K_number;
u_char CRT_LOCAL_status;
u_char CRT_PLEN_status;
u_char CRT_CSSNSA_status;
u_char CRT_FB_fault;
u_char CRT_OL_fault;
u_int  CRT_KV_display;
u_int  CRT_I_display;
u_int  CRT_VCT;
u_int  CRT_IFB;
u_int  CRT_KVCOM;
u_int  CRT_PWMCOMT;
u_int  CRT_BUFFIFB;
u_int  CRT_CLCOM;
u_int  CRT_BUFFKVFB;
u_int  CRT_POT;

/*
```

Monitor.c

```
|
|
|  Init_monitor()
|
|
|
|  Inputs:
|
|    none
|
|
|
|  Returns:
|
|    none
|
|
|
|
|
|_______________________________________________________________________
|
*/

void Init_monitor(void) {

  u_char  i;

  /* paint up the fixed text */
  CRT_erase_screen();
  if (Get_uPAK_switch()) CRT_print_rc_code( 0,28,"ITW HP-404 Monitor, V
3.01");
  else CRT_print_rc_code( 0,26,"ITW Ranspak 1000 Monitor, V3.01");
  CRT_print_rc_code( 2,14,"kV     uA    AIR FLD OFF ON  RDY LOC OVL FBF
 PLN CSN INT" );
  CRT_print_rc_code( 3, 0,"Status:");
  CRT_print_rc_code( 4, 0,"Command:");
  CRT_print_rc_code( 6,15,"#      A     B     K");
  CRT_print_rc_code( 7, 0,"Sequence");
  CRT_print_rc_code( 9,12,"KVCOM  CLCOM  BKVFB   BIFB   IFB  PWMCONT  V
CT    POT");
  CRT_print_rc_code(10, 0,"Analog In:");

  CRT_set_cursor(3,13);
  CRT_print_BCD_word_x(BUFFKVFB,3);
  CRT_set_cursor(3,20);
  CRT_print_BCD_word_x(BUFFIFB,3);
  CRT_set_cursor(3,28);
  CRT_print_BCD_byte_x(AIR_TRIG_status,1);
  CRT_set_cursor(3,32);
  CRT_print_BCD_byte_x(FLD_TRIG_status,1);
```

Monitor.c

```
CRT_set_cursor(3,36);
CRT_print_BCD_byte_x(~HV_ON_status & 0x01,1);
CRT_set_cursor(3,40);
CRT_print_BCD_byte_x(HV_ON_status,1);
CRT_set_cursor(3,44);
CRT_print_BCD_byte_x(HV_RDY_status,1);
CRT_set_cursor(3,48);
CRT_print_BCD_byte_x(LOCAL_status,1);
CRT_set_cursor(3,52);
CRT_print_BCD_byte_x(OL_fault,1);
CRT_set_cursor(3,56);
CRT_print_BCD_byte_x(FB_fault,1);
CRT_set_cursor(3,60);
CRT_print_BCD_byte_x(PLEN_status,1);
CRT_set_cursor(3,64);
CRT_print_BCD_byte_x(CSSNSA_status,1);
CRT_set_cursor(3,68);
CRT_print_BCD_byte_x(Get_INT_switch(),1);

CRT_set_cursor(4,13);
CRT_print_BCD_word_x(KV_set,3);
CRT_set_cursor(4,20);
CRT_print_BCD_word_x(I_set,3);
CRT_set_cursor(4,28);
CRT_print_BCD_byte_x(AIR_TRIG_command,1);
CRT_set_cursor(4,32);
CRT_print_BCD_byte_x(FLD_TRIG_command,1);
CRT_set_cursor(4,36);
CRT_print_BCD_byte_x(HV_RST_command,1);
CRT_set_cursor(4,40);
CRT_print_BCD_byte_x(HV_ON_command,1);

i = Get_SEQ_switch();
CRT_set_cursor(7,15);
CRT_print_BCD_byte_x(i,1);
CRT_set_cursor(7,20);
CRT_print_BCD_word_x(SEQ_table[i][0] * 5,3);
CRT_set_cursor(7,26);
CRT_print_BCD_word_x(SEQ_table[i][1] * 5,3);

i = Get_K_switch();
CRT_set_cursor(7,32);
CRT_print_BCD_byte_x(K_table[i],3);

CRT_set_cursor(10,13);
CRT_print_BCD_word_x(KVCOM,3);
CRT_set_cursor(10,20);
CRT_print_BCD_word_x(CLCOM,3);
CRT_set_cursor(10,27);
CRT_print_BCD_word_x(BUFFKVFB,3);
CRT_set_cursor(10,34);
```

Monitor.c

```
  CRT_print_BCD_word_x(BUFFIFB,3);
  CRT_set_cursor(10,41);
  CRT_print_BCD_word_x(IFB,3);
  CRT_set_cursor(10,48);
  CRT_print_BCD_word_x(PWMCOMT,3);
  CRT_set_cursor(10,55);
  CRT_print_BCD_word_x(VCT,3);
  CRT_set_cursor(10,62);
  CRT_print_BCD_word_x(POT,3);

  CRT_KV_set               = KV_set;
  CRT_I_set                = I_set;
  CRT_HV_RST_command       = HV_RST_command;
  CRT_HV_ON_command        = HV_ON_command;
  CRT_FLD_TRIG_command     = FLD_TRIG_command;
  CRT_AIR_TRIG_command     = AIR_TRIG_command;
  CRT_HV_ON_sequencer      = HV_ON_sequencer;
  CRT_FLD_TRIG_sequencer   = FLD_TRIG_sequencer;
  CRT_AIR_TRIG_sequencer   = AIR_TRIG_sequencer;
  CRT_HV_ON_status         = HV_ON_status;
  CRT_HV_RDY_status        = HV_RDY_status;
  CRT_FLD_TRIG_status      = FLD_TRIG_status;
  CRT_AIR_TRIG_status      = AIR_TRIG_status;
  CRT_SEQ_state            = SEQ_state;
  CRT_SEQ_status           = SEQ_status;
  CRT_SEQ_number           = Get_SEQ_switch();
  CRT_K_number             = Get_K_switch();
  CRT_INT_status           = Get_INT_switch();
  CRT_LOCAL_status         = LOCAL_status;
  CRT_PLEN_status          = PLEN_status;
  CRT_CSSNSA_status        = CSSNSA_status;
  CRT_FB_fault             = FB_fault;
  CRT_OL_fault             = OL_fault;
  CRT_KV_display           = BUFFKVFB;
  CRT_I_display            = BUFFIFB;
  CRT_VCT                  = VCT;
  CRT_IFB                  = IFB;
  CRT_KVCOM                = KVCOM;
  CRT_PWMCOMT              = PWMCOMT;
  CRT_BUFFIFB              = BUFFIFB;
  CRT_CLCOM                = CLCOM;
  CRT_BUFFKVFB             = BUFFKVFB;
  CRT_POT                  = POT;

}

/*
 ---------------------------------------------------------------------
|
|
|  Monitor()
```

Monitor.c

```
|
|
|
|  Inputs:
|
|    none
|
|
|
|  Returns:
|
|    none
|
|
|
|
|
|____________________________________________________________________
|
*/

void Monitor(void) {

  u_char  i;

  /* CANBUS status */
  if (CRT_KV_display != BUFFKVFB) {
    CRT_set_cursor(3,13);
    CRT_print_BCD_word_x(BUFFKVFB,3);
    CRT_KV_display = BUFFKVFB;
  }
  if (CRT_I_display != BUFFIFB) {
    CRT_set_cursor(3,20);
    CRT_print_BCD_word_x(BUFFIFB,3);
    CRT_I_display = BUFFIFB;
  }
  if (CRT_AIR_TRIG_status != AIR_TRIG_status) {
    CRT_set_cursor(3,28);
    CRT_print_BCD_byte_x(AIR_TRIG_status,1);
    CRT_AIR_TRIG_status = AIR_TRIG_status;
  }
  if (CRT_FLD_TRIG_status != FLD_TRIG_status) {
    CRT_set_cursor(3,32);
    CRT_print_BCD_byte_x(FLD_TRIG_status,1);
    CRT_FLD_TRIG_status = FLD_TRIG_status;
  }
  if (CRT_HV_ON_status != HV_ON_status) {
    CRT_set_cursor(3,36);
    CRT_print_BCD_byte_x(~HV_ON_status & 0x01,1);
    CRT_set_cursor(3,40);
    CRT_print_BCD_byte_x(HV_ON_status,1);
```

Monitor.c

```
  CRT_HV_ON_status = HV_ON_status;
}
if (CRT_HV_RDY_status != HV_RDY_status) {
  CRT_set_cursor(3,44);
  CRT_print_BCD_byte_x(HV_RDY_status,1);
  CRT_HV_RDY_status = HV_RDY_status;
}
if (CRT_LOCAL_status != LOCAL_status) {
  CRT_set_cursor(3,48);
  CRT_print_BCD_byte_x(LOCAL_status,1);
  CRT_LOCAL_status = LOCAL_status;
}
if (CRT_OL_fault != OL_fault) {
  CRT_set_cursor(3,52);
  CRT_print_BCD_byte_x(OL_fault,1);
  CRT_OL_fault = OL_fault;
}
if (CRT_FB_fault != FB_fault) {
  CRT_set_cursor(3,56);
  CRT_print_BCD_byte_x(FB_fault,1);
  CRT_FB_fault = FB_fault;
}
if (CRT_PLEN_status != PLEN_status) {
  CRT_set_cursor(3,60);
  CRT_print_BCD_byte_x(PLEN_status,1);
  CRT_PLEN_status = PLEN_status;
}
if (CRT_CSSNSA_status != CSSNSA_status) {
  CRT_set_cursor(3,64);
  CRT_print_BCD_byte_x(CSSNSA_status,1);
  CRT_CSSNSA_status = CSSNSA_status;
}
i = Get_INT_switch();
if (CRT_INT_status != i) {
  CRT_set_cursor(3,68);
  CRT_print_BCD_byte_x(i,1);
  CRT_INT_status = i;
}

/* CANBUS commands */
if (CRT_KV_set != KV_set) {
  CRT_set_cursor(4,13);
  CRT_print_BCD_word_x(KV_set,3);
  CRT_KV_set = KV_set;
}
if (CRT_I_set != I_set) {
  CRT_set_cursor(4,20);
  CRT_print_BCD_word_x(I_set,3);
  CRT_I_set = I_set;
}
if (CRT_AIR_TRIG_command != AIR_TRIG_command) {
```

Monitor.c

```
  CRT_set_cursor(4,28);
  CRT_print_BCD_byte_x(AIR_TRIG_command,1);
  CRT_AIR_TRIG_command = AIR_TRIG_command;
}
if (CRT_FLD_TRIG_command != FLD_TRIG_command) {
  CRT_set_cursor(4,32);
  CRT_print_BCD_byte_x(FLD_TRIG_command,1);
  CRT_FLD_TRIG_command = FLD_TRIG_command;
}
if (CRT_HV_RST_command != HV_RST_command) {
  CRT_set_cursor(4,36);
  CRT_print_BCD_byte_x(HV_RST_command,1);
  CRT_HV_RST_command = HV_RST_command;
}
if (CRT_HV_ON_command != HV_ON_command) {
  CRT_set_cursor(4,40);
  CRT_print_BCD_byte_x(HV_ON_command,1);
  CRT_HV_ON_command = HV_ON_command;
}

/* sequence data */
if (CRT_SEQ_state != SEQ_state) {
  CRT_set_cursor(7,10);
  if (SEQ_state > 0) CRT_print_BCD_byte_x(SEQ_state,1);
  else CRT_print_code(" ");
  CRT_SEQ_state = SEQ_state;
}

i = Get_SEQ_switch();
if (CRT_SEQ_number != i) {
  CRT_set_cursor(7,15);
  CRT_print_BCD_byte_x(i,1);
  CRT_set_cursor(7,20);
  CRT_print_BCD_word_x(SEQ_table[i][0] * 5,3);
  CRT_set_cursor(7,26);
  CRT_print_BCD_word_x(SEQ_table[i][1] * 5,3);
  CRT_SEQ_number = i;
}

i = Get_K_switch();
if (CRT_K_number != i) {
  CRT_set_cursor(7,32);
  CRT_print_BCD_byte_x(K_table[i],3);
  CRT_K_number = i;
}

/* analog inputs */
if (CRT_KVCOM != KVCOM) {
  CRT_set_cursor(10,13);
  CRT_print_BCD_word_x(KVCOM,3);
  CRT_KVCOM = KVCOM;
```

Monitor.c

```
  }
  if (CRT_CLCOM != CLCOM) {
    CRT_set_cursor(10,20);
    CRT_print_BCD_word_x(CLCOM,3);
    CRT_CLCOM = CLCOM;
  }
  if (CRT_BUFFKVFB != BUFFKVFB) {
    CRT_set_cursor(10,27);
    CRT_print_BCD_word_x(BUFFKVFB,3);
    CRT_BUFFKVFB = BUFFKVFB;
  }
  if (CRT_BUFFIFB != BUFFIFB) {
    CRT_set_cursor(10,34);
    CRT_print_BCD_word_x(BUFFIFB,3);
    CRT_BUFFIFB = BUFFIFB;
  }
  if (CRT_IFB != IFB) {
    CRT_set_cursor(10,41);
    CRT_print_BCD_word_x(IFB,3);
    CRT_IFB = IFB;
  }
  if (CRT_PWMCOMT != PWMCOMT) {
    CRT_set_cursor(10,48);
    CRT_print_BCD_word_x(PWMCOMT,3);
    CRT_PWMCOMT = PWMCOMT;
  }
  if (CRT_VCT != VCT) {
    CRT_set_cursor(10,55);
    CRT_print_BCD_word_x(VCT,3);
    CRT_VCT = VCT;
  }
  if (CRT_POT != POT) {
    CRT_set_cursor(10,62);
    CRT_print_BCD_word_x(POT,3);
    CRT_POT = POT;
  }

  Send_status();

}
```

Msgs.c

```
/*
 ________________________________________________________________________
|
|
|  CANbus MODULAR NODE - CANBUS Message Definition Module
|
|
|
|  File:     msgs.c
|
|
|
|  void Send_status(void)
|
|  void Xmit_input_state(void)
|
|  void Rtc06_xmit(void)
|
|  void Rtc02_xmit_discretes(void)
|
|
|
|  Revision History:
|
|  V2.1  11-14-95  Remove HV_OFF_status variable.
|
|                  Changes Send_status() to send actual KVFB and IFB
|
|                  instead of display values.
|
|  V2.6  09-18-96  Added HV_RST_status bit
|
|                  Rearranged status bytes to match PLC format
|
|                  BUFFKVFB and BUFFIFB changed to words in status msg
|
|
|
|  V3.01 09-17-97  Added DI_fault to status byte RES
|
|
|
|________________________________________________________________________
|
*/

#include "common.h"                  /* common definitions        */
#include "board.h"                   /* hardware specific defines */
#include "version.h"                 /* version number            */
#include "crtio.h"                   /* define I/O function       */
```

Msgs.c

```
/*------------- External Function References -------------------------*
/
extern void   Tx_en_buffer(u_char node_index,
                           u_char command,
                           u_char length,
                           u_char *data_ptr);
extern u_char Get_node_ID(void);

/*------------- External Variable References -------------------------*
/
extern u_char debug_enabled;
extern u_char HV_ON_status;
extern u_char HV_RST_status;
extern u_char HV_RDY_status;
extern u_char FLD_TRIG_status;
extern u_char AIR_TRIG_status;
extern u_char SEQ_status;
extern u_char LOCAL_status;
extern u_char FB_fault;
extern u_char OL_fault;
extern u_char DI_fault;
extern u_int  BUFFIFB;
extern u_int  BUFFKVFB;

/*------------- Public Variable Definitions --------------------------*
/

/*------------- Function Prototypes ----------------------------------*
/
void   Init_board(void);
void   Rtc06_xmit(void);

/*
 ________________________________________________________________________
|
|
|  Send_status()
|
|
|
|  Sends current status back to CANBUS host.
|
|
|
|  Inputs:
|
|    none
|
|
|
|  Returns:
```

```
|
|    none
|
|
|
|  Calls:
|
|    none
|
|
|
|------------------------------------------------------------------------
|
*/

void Send_status(void){

  u_char  status_buffer[6];

  /* build up a response message */

  status_buffer[0] = BUFFKVFB & 0xff;
  status_buffer[1] = BUFFKVFB >> 8;
  status_buffer[2] = BUFFIFB & 0xff;
  status_buffer[3] = BUFFIFB >> 8;
  status_buffer[4] = (HV_RST_status)         |
                     (HV_RDY_status    << 1) |
                     (HV_ON_status     << 2) |
                     (DI_fault         << 3) |
                     (OL_fault         << 4) |
                     (FB_fault         << 5) |
                     (SEQ_status       << 6) |
                     (LOCAL_status     << 7);

  status_buffer[5] = (FLD_TRIG_status)       |
                     (AIR_TRIG_status << 1);


  Tx_en_buffer(Get_node_ID(),         /* node             */
               1,                     /* command (type 1) */
               6,                     /* length           */
               status_buffer);        /* data             */

}

/*
 ------------------------------------------------------------------------
|
|
|  Rtc06_xmit(void)
|
```

```
|
|
|  Transmit a reset complete (type 4) message on power up.
|
|
|
|  Inputs:
|
|    none
|
|
|
|  Returns:
|
|    none
|
|
|
|  Calls:
|
|    none
|
|
|
|____________________________________________________________________
|
*/

void Rtc06_xmit(void) {

  u_char xmit_buffer[8];

  /*-----------------------------------------------------*/
  /* transmit: type 4 message (Rtc06 node reset complete) */
  /*-----------------------------------------------------*/

  xmit_buffer[0] = 'R';
  xmit_buffer[1] = 'E';
  xmit_buffer[2] = 'S';
  xmit_buffer[3] = 'E';
  xmit_buffer[4] = 'T';
  xmit_buffer[5] = version[0];        /* from version.h   */
  xmit_buffer[6] = version[1];
  xmit_buffer[7] = BOARD_TYPE;        /* from board.h     */

  Tx_en_buffer(Get_node_ID(),         /* node             */
               4,                     /* command (type 4) */
               8,                     /* length           */
               &xmit_buffer);         /* data             */

}
```

Msgs.c

```
/*
 ____________________________________________________________________________
|
|
|  Xmit_input_state()
|
|
|
|  Transmit an input state to the canbus for the crt "w" command.
|
|
|
|  Inputs:
|
|    none
|
|
|
|  Returns:
|
|    none
|
|
|
|  Calls:
|
|    none
|
|
|
|____________________________________________________________________________
|
*/

void Xmit_input_state(void) {

  u_char xmit_buffer[8];

  /* load the buffer with the raw unprocessed discrete data */
  xmit_buffer[0] = 0;

  /* write to canbus */
  Tx_en_buffer(Get_node_ID(),  /* source node */
               1,              /* command     */
               1,              /* length      */
               &xmit_buffer);  /* data        */

}

/*
```

```
 ____________________________________________________________________
|
|
|  Rtc02_xmit_discretes()
|
|
|
|  Transmit to the canbus in response to an rtc02 request.
|
|
|
|  Inputs:
|
|    none
|
|
|
|  Returns:
|
|    none
|
|
|
|  Calls:
|
|    none
|
|
|
|____________________________________________________________________
|
*/

void Rtc02_xmit_discretes(void) {

  u_char xmit_buffer[8];

  /* discretes */

  xmit_buffer[0] = 0;

  /*------------------------------------------*/
  /* transmit: type 4 message (to report data) */
  /*------------------------------------------*/

  Tx_en_buffer(Get_node_ID(), /* source node */
               4,             /* command     */
               1,             /* length      */
               &xmit_buffer); /* data        */
}
```

```
/*
 ------------------------------------------------------------------------
|
|  CANBUS MODULAR CONTROLLER - Real Time Clock Module
|
|
|  Filename: rtc.c
|
|
|  Created:  05/15/93  RES
|
|
|  Procedures defined in this module:
|    Init_RTC()
|    RTC_interrupt()
|    Flash_LED()
|    Flash_RED_LED()
|
|
|  Public variables defined by this module:
|    CAN_A_LED_timer
|    RED_LED_timer
|    CAN_A_watchdog_timer
|    time_to_update_IO
|    time_to_update_status
|
|
|  Revision History:
|  V2.2 12-02-95  Added support for pulsing CSSNSA output when IFB
|                 above threshold.
|                 Added delay_timer service to 1 msec A/D interrupt
|  V2.2 12-05-95  Change CSSNSA pulse width timer to operate off 1 ms
```

```
|
|                 time base.  Pulse rep time stays on 5 msec.
|
|  V2.3 12-11-95  Moved assertion of CSSNSA pulse to rtc() to minimize
|
|                 pulse width variations
|
|  V2.6 09-18-96  Removed WATCHDOG update from rtc.c to fix lockup
|
| V2.91 06-06-97  Added FB_fault_mask_timer  RES
|
| V2.95 07-17-97  Moved variable init from E2PROM to app()  RES
|
| V2.95 07-17-97  Moved variable init from E2PROM to app()  RES
|
| v2.96 08-15-97  Removed high freq filtering, replaced with IFB
|
|                 filtering  RES
|
| V3.01 09-17-97  Moved FB_fault_mask_timer to app.c  RES
|
|
|
|
|
|
|
|
|
|____________________________________________________________________
|
*/

#include "common.h"                   /* common definitions        */
#include "board.h"                    /* hardware specific defines */
#include "crtio.h"                    /* define I/O function       */
#include "errors.h"                   /* error code assignments    */
#include <io80196.h>                  /* 80C196 special function regist
ers */

#pragma EJECT
/*----------------- External Procedure References -------------------*/
extern void   SYSFAIL_LED(u_char value);
extern void   CAN_A_LED(u_char value);
extern void   Watchdog(void);
extern u_int  Read_E2(u_char addr);

/*----------------- External Variable References ---------------------*
/
extern u_int  AD_buffer[10];
extern u_char CSSNSA_pulse_timer;
```

Rtc.c

```
extern u_char CSSNSA_rep_timer;
extern u_char CSSNSA_pulse_width;
extern u_char CSSNSA_reset_time;
extern u_char CSSNSA_status;

/*----------------- Public Variable Definitions ----------------------*
/
u_char CAN_A_watchdog_timer;
u_char CAN_A_LED_timer;
u_char RED_LED_timer;
u_char delay_timer;
u_char display_update_timer;
u_char display_update;
u_char msec_5;
u_char AD_sync;
u_char AD_channel;
u_int  next_AD_time;
u_int  next_RTC_time;

/* IFB filter */
u_int  filter_buffer[8];
u_char filter_index;
u_int  filter_average;
u_char number_of_filter_samples;

/* the following times assume a 12 MHz clock input */
#define DELAY_10_MSEC    7500
#define DELAY_5_MSEC     3760
#define DELAY_500_USEC    376

/* display button time constants */
#define PB_down_min        10    /* min down time for a tap */
#define PB_down_max        20    /* max down time for a tap */
#define PB_up_min          10    /* min up time for a tap */
#define PB_up_max          20    /* max up time for a tap */
#define PB_long_min        50    /* min down time for setpoint display
*/
#define PB_inc             40    /* increment interval for di/dt */

/*
 ----------------------------------------------------------------------
|
|
|  Init_RTC()
|
|
|
|  This procedure initializes the variables used by the real time
|
|  clock (RTC) interrupt.
|
```

```
|
|
|  Inputs:
|
|    none
|
|
|
|  Returns:
|
|    none
|
|
|
|  Calls:
|
|    none
|
|______________________________________________________________________
|
*/

void Init_rtc(void) {

  u_char  i;

  CAN_A_LED_timer      = 0;
  RED_LED_timer        = 0;
  delay_timer          = 0;
  display_update_timer = 0;
  display_update       = FALSE;
  msec_5               = FALSE;
  AD_sync              = 0;
  AD_channel           = 0;
  for (i=0;i<8;i++)  {
    AD_buffer[i] = 0;
  }

  /* filter initialization */
  for (i=0;i<8;i++)  {
    filter_buffer[i] = 0;
  }
  filter_index = 0;
  filter_average = 0;

  /* start the A/D conversion of the first channel */
  AD_COMMAND = AD_channel + 0x08;

}

/*
```

```
RTC_interrupt()

This procedure provides the real time clock (RTC) interrupt handler.
It is triggered by timer 0 and occurs every 10 msec.  The hardware
watchdog (DS1232) is refreshed and timer 0 is reloaded (since no
auto-reload feature is supported in 16-bit mode.  The IO_update_
timer and status_poll_timer are decremented. If they reach zero,
the corresponding flags are set and will cause either an IO update
or status poll request to be issued by the main().  Two watchdog
timers are implemented in software.  When these timers are greater
than zero they are decremented.  If they expire and the correspond-
ing busy flag is still set, the CAN channel in question is reset by
calling the CAN_A_abort() or CAN_B_abort() procedure.  Three LED
timers are also operated by the RTC.  When any of these timers
reaches zero, the corresponding LED is turned off.  Notice that the
SYSFAIL LED is active high, the others are active low.  The DS1232
watchdog is refreshed again at the end of the RTC routine to assist
in measuring RTC execution time.

Inputs:
  none

Returns:
  none
```

```
|
|
|  Calls:
|
|    CAN_A_abort()
|
|
|
|___________________________________________________________________
|
*/

void RTC_interrupt(void) {

  u_char timer_flags, i;
  u_int  temp, AD_sample;

  /* this services the software timer interrupt */

  /* read IO status */
  timer_flags = IOS1;

  if (timer_flags & 0x02) {
    /* software timer 1 - A/D conversion interrupt 500 usec.
       Every 1/2 msec we read the A/D converter.  Alternate reads
       are for the IFB input, which are placed in a buffer to compute
       the average over the last N samples.  Even "channels" are the
       standard 8 A/D channels.  This interleaves the IFB "micro" sampl
es
       with the normal A/D reads */

    /* reprogram sofware timer 1 */
    next_AD_time += DELAY_500_USEC;

    /* wait for holding register to clear */
    while (IOS0 & 0x80);

    HSO_COMMAND = 0x19;
    HSO_TIME = next_AD_time;

    /* read the results of the last conversion */
    AD_sample = AD_RESULT_HI;
    AD_sample <<= 2;
    AD_sample |= (AD_RESULT_LO >> 6);

    if ((AD_channel & 0x01) == 0) {
      /* even numbered samples go to the AD_buffer[]. These are the nor
mal
        A/D channel reads.  All eight channels are read over a period
of
        8 msec */
```

```
      AD_buffer[AD_channel >> 1] = AD_sample;
    }
    else {
      /* odd numbered samples go to filter_buffer[].  These are re-read
s
         of the IFB channel for the filter */
      filter_buffer[filter_index] = AD_sample;

      /* increment the sample_index */
      filter_index++;
      if (filter_index >= number_of_filter_samples) filter_index = 0;

      /* average the last N samples in the filter_buffer */
      temp = 0;
      for (i=0;i<number_of_filter_samples;i++) {
        temp += filter_buffer[i];
      }
      filter_average = temp / number_of_filter_samples;
    }

    /* select the next channel */
    AD_channel++;
    if (AD_channel > 15) {
      AD_channel = 0;
    }

    /* start the A/D conversion of the next channel */
    if (AD_channel & 0x01) {
      /* filter channel - IFB (A/D channel 6) */
      AD_COMMAND = 6 + 0x08;
    }
    else {
      /* regular channel */
      AD_COMMAND = (AD_channel >> 1) + 0x08;
    }

    if ((AD_channel & 0x01) == 0) {
      /* use the AD_channel as a divide by 2 to schedule the 1 msec tas
ks */

      /* service the 1 msec delay timer */
      if (delay_timer > 0) delay_timer--;
    }

    /* service CSSNSA pulse timer - this timer counts up */
    /* this used to be a 1 msec task, not it looks like it's being serv
iced
       every 1/2 msec (check this!)   */

    if (CSSNSA_pulse_timer > 0) {
      if (CSSNSA_pulse_timer == 1) {
```

Rtc.c

```
      /* turn on output */
      CSSNSA_status = TRUE;
      CSSNSA_OUTPUT = CSSNSA_status;
      CSSNSA_pulse_timer++;
    }
    else if (CSSNSA_pulse_timer > CSSNSA_pulse_width) {
      /* turn off output */
      CSSNSA_status = FALSE;
      CSSNSA_OUTPUT = CSSNSA_status;
      CSSNSA_pulse_timer = 0;
    }
    else {
      CSSNSA_pulse_timer++;
    }
  }
}

if (timer_flags & 0x01) {

  /* software timer 0 - 5 msec RTC */

  /* reprogram sofware timer 0 */
  /* actual time is 3750, but reduce this by 25 to account
     for interrupt latency and software overhead */

  next_RTC_time += DELAY_5_MSEC;

  /* wait for holding register to clear */
  while (IOS0 & 0x80);

  HSO_COMMAND = 0x18;
  HSO_TIME = next_RTC_time;

  /* service the 5 msec timers */
  msec_5 = TRUE;

  /* service the LED timers */
  if (CAN_A_LED_timer > 0) {
    CAN_A_LED_timer--;
    if (CAN_A_LED_timer == 0) CAN_A_LED(0);    /* turn off LED */
  }

  if (RED_LED_timer > 0) {
    RED_LED_timer--;
    if (RED_LED_timer == 0) SYSFAIL_LED(0);    /* turn off LED */
  }

  /* update the display update timer */
  display_update_timer--;
  if (display_update_timer == 0) {
    display_update = TRUE;
```

```
      display_update_timer = DISPLAY_RATE;
    }

    /* service CSSNSA rep timer - this timer counts up */
    if (CSSNSA_rep_timer > 0) {
      if (CSSNSA_rep_timer == CSSNSA_reset_time) {
        /* reset timer to allow retrigger */
        CSSNSA_rep_timer = 0;
      }
      else {
        CSSNSA_rep_timer++;
      }
    }

  }

}

#pragma EJECT
/*
  ______________________________________________________________________

_|
 |
 |  Flash_LED()
 |
 |
 |
 |  This procedure flashes the LED for the selected channel for a time
 |
 |  specified by the LED_TIMER_PRESET (in can.h).
 |
 |
 |
 |  Inputs:
 |
 |    a bit indicating the channel (0=channel A, 1=channel B)
 |
 |
 |
 |  Returns:
 |
 |    none
 |
 |
 |
 |  Calls:
 |
 |    none
 |
 |
```

Rtc.c

```
 |
 |____________________________________________________________________
_|
 */

 void Flash_LED(u_char channel) {

  /* turn on LED's */
  if (channel == 0) {
    CAN_A_LED(1);
    disable_interrupt();
    CAN_A_LED_timer = LED_TIMER_PRESET;
    enable_interrupt();
  }
  else {
#ifdef CAN_TWO_CHANNELS
    CAN_B_LED(1);
    disable_interrupt();
    CAN_B_LED_timer = LED_TIMER_PRESET;
    enable_interrupt();
#endif
  }

}

#pragma EJECT
/*
 ____________________________________________________________________
|
|
|  Flash_RED_LED()
|
|
|
|  This procedure flashes the SYSFAIL LED for a time specified by the
|
|  RED_LED_TIMER_PRESET (in board.h)
|
|
|
|  Inputs:
|
|    none
|
|
|
|  Returns:
|
|    none
|
|
```

Rtc.c

```
|
|  Calls:
|
|    none
|
|
|
|_____________________________________________________________________
|

*/
void Flash_RED_LED(void) {

  SYSFAIL_LED(1);
  disable_interrupt();
  RED_LED_timer = RED_LED_TIMER_PRESET;
  enable_interrupt();
}
```

Rxbuf.c

```
/*
 ------------------------------------------------------------------------
|
|
| CANBUS MODULAR CONTROLLER - CAN Rx Buffer Module
|
|
|
| Filename: rxbuf.c
|
|
|
| Created:  05/15/93  RES
|
|
|
| Procedures defined in this module:
|
|   De_buffer()
|
|   Init_Rx_buffer()
|
|   Rx_buffer_ready()
|
|
|
| Public variables defined by this module:
|
|   Rx_buffer[]
|
|   Rx_in_index
|
|   Rx_out_index
|
|
|
| Revision History:
|
| 0.1  05/15/93  Version 0.1 (Alpha Release) RES
|
| 0.2  05/20/93  Documentation corrections  RES
|
| 0.3  05/23/93  Added WATCHDOG update in Init_Rx_buffer RES
|
| 1.00 01/12/94  Version 1.00 (Production Release) SCA
|
| 1.00 01/21/94  Version 1.00 (Production Release) SCA
|
|
|
|
```

Rxbuf.c

```
|
|_______________________________________________________________________
|
*/

#include "common.h"                   /* common definitions        */
#include "board.h"                    /* hardware specific defines */
#include "crtio.h"                    /* define I/O function       */

/*---------------------- External References ------------------------*/
extern void   Watchdog(void);

/*----------------- External Variable References ---------------------*
/
extern u_char debug_enabled;

/*----------------- Public Variable Definitions ----------------------*
/
u_char Rx_buffer[RX_BUFFER_SIZE];
u_int  Rx_in_index;
u_int  Rx_out_index;

/*
 _______________________________________________________________________
|
|
|  Init_Rx_buffer()
|
|
|
|  This procedure zeros the receive buffers and sets the input and
|
|  output pointers to the start of the buffer.
|
|
|
|  Inputs:
|
|    none
|
|
|
|  Returns:
|
|    none
|
|
|
|  Calls:
|
|    none
```

Rxbuf.c

```
|
|________________________________________________________________________
|
*/

void Init_Rx_buffer(void) {

  u_int  i;

  /* initialize the Rx buffers */
  for (i=0;i<RX_BUFFER_SIZE;i++) {
    Rx_buffer[i] = 0;
  }
  Rx_in_index  = 0;
  Rx_out_index = 0;
}

#pragma EJECT
/*
 ________________________________________________________________________
|
|
|  Rx_buffer_ready()
|
|
|
|  This procedure checks the Rx_buffer to see if a CAN message is
|
|  pending. If a message is ready, it returns 1, if not, 0.  External
|
|  interrupts are disabled to avoid seeing a partially filled message.
|
|
|
|  Inputs:
|
|    none
|
|
|
|  Returns:
|
|    none
|
|
|
|  Calls:
|
|    none
|
|
```

Rxbuf.c

```
|
|________________________________________________________________
|
*/

u_char Rx_buffer_ready(void) {


  disable_interrupt();

  if (Rx_in_index != Rx_out_index) {
    /* there is at least one received packet waiting */
    enable_interrupt();
    return(1);
  }
  else {
    /* buffer is empty */
    enable_interrupt();
    return(0);
  }
}

#pragma EJECT
/*
 ________________________________________________________________
|
|
|  De_buffer()
|
|
|
|  This procedure returns a message waiting in the Rx_buffer.  The
|
|  procedure loads the node_index, command, length, and message data
|
|  into the pointers supplied.  This procedure assumes that a message
|
|  is in the Rx_buffer[], it does not check.  Use Rx_buffer_ready() to
|
|  determine if a message is waiting in the buffer before calling this
|
|  procedure.
|
|
|
|  Inputs:
|
|    none
|
|
|
```

```
|  Returns:
|
|    none
|
|
|
|  Calls:
|
|    CRT_print_code()
|
|    CRT_print_HEX_byte()
|
|
|
|________________________________________________________________________
|
*/

void De_buffer(u_char *node_index_ptr,
               u_char *command_ptr,
               u_char *length_ptr,
               u_char *data_ptr) {

  u_char  i;

  disable_interrupt();

  /* get the ID and data length from the buffered packet */
  *node_index_ptr = Rx_buffer[Rx_out_index++];
  if (Rx_out_index >= RX_BUFFER_SIZE) Rx_out_index = 0;

  *command_ptr = Rx_buffer[Rx_out_index++];
  if (Rx_out_index >= RX_BUFFER_SIZE) Rx_out_index = 0;

  *length_ptr = Rx_buffer[Rx_out_index++];
  if (Rx_out_index >= RX_BUFFER_SIZE) Rx_out_index = 0;

  /* copy the data packet into memory */
  for (i=0;i<*length_ptr;i++) {
    data_ptr[i] = Rx_buffer[Rx_out_index++];
    if (Rx_out_index >= RX_BUFFER_SIZE) Rx_out_index = 0;
  }

  if (debug_enabled) {
    CRT_print_code("Rx -> N=");
    CRT_print_HEX_byte(*node_index_ptr);
    CRT_print_code(" C=");
    CRT_print_HEX_byte(*command_ptr);
    CRT_print_code(" L=");
    CRT_print_HEX_byte(*length_ptr);
```

```
    CRT_print_code(" D=");
    for(i=0;i<*length_ptr;i++) {
      CRT_print_HEX_byte(data_ptr[i]);
      CRT_print_code(" ");
    }
  }

  enable_interrupt();
}
```

Rxtx.c

```
/*
 ________________________________________________________________________
|
|
|  CANBUS MODULAR CONTROLLER - Serial Interrupt Module
|
|
|
|  Filename: rxtx.c
|
|
|
|  Created:  05/15/93  RES
|
|
|
|  Procedures defined in this module:
|
|    Rx_interrupt()
|
|    Tx_interrupt()
|
|
|
|  Public variables defined by this module:
|
|    none.
|
|
|
|  Revision History:
|
|
|
|
|
|________________________________________________________________________
|
*/

#include "common.h"                    /* common definitions        */
#include "board.h"                     /* hardware specific defines */
#include <io80196.h>                   /* 80C196 special function regist
ers */

/*----------------- External Variable References ---------------------*
/
extern void   CAN_A_LED(u_char value);
extern char   CRT_buffer[CRT_BUFFER_SIZE];
extern u_char CRT_buffer_empty;
extern u_int  CRT_in_index;
```

Rxtx.c

```
extern u_int  CRT_out_index;
extern char   KB_buffer[KB_BUFFER_SIZE];
extern u_char KB_in_index;
extern u_char KB_out_index;
extern u_char message_received;

/*
 ------------------------------------------------------------------------
|
| Serial_interrupt()
|
|
| This procedure defines the interrupt handler for the 80C32 serial
|
| port.  Interrupts occur for receive buffer full and transmit buffer
|
| empty.  Received characters are placed in the keyboard buffer until
|
| a carriage return (0x0d) is encountered.  Then the message_received
|
| flag is set to inform the main() that a debugger command has been
|
| received.  All received characters are converted to upper case
|
| before they are placed in the KB_buffer[].
|
|
| If the CRT_buffer[] is not empty and a transmit buffer empty
|
| interrupt occurs, then the next available character in the CRT_
|
| buffer (at CRT_out_index) is sent to SBUF to transmit it.  If the
|
| CRT_buffer[] is empty, then the CRT_buffer_empty flag is set to
|
| inform CRT_out() that it will need to manually send the first byte
|
| of the next string to generate new TI interrupts.
|
|
| Inputs:
|   none
|
|
| Returns:
```

```
|
|    none
|
|
|
|  Calls:
|
|    none
|
|
|
|________________________________________________________________________
|
*/

void Rx_interrupt(void) {

  u_char value;
  u_int  rx_status;

  rx_status = SP_STAT;

  /* optional test rx_status for parity errors, etc */

  value = SBUF & 0x07f;              /* get the character */
  if (value > 0x5f) value -= 0x20;   /* convert to upper case */
  KB_buffer[KB_in_index] = value;
  if (KB_in_index < KB_BUFFER_SIZE - 1) KB_in_index++;
  if (value == CRET) message_received = TRUE;

}


void Tx_interrupt(void) {

  u_int  tx_status;

  tx_status = SP_STAT;

  /* check to see if there is anything left to be sent in the CRT_buffe
r */
  if (CRT_out_index != CRT_in_index) {
    /* send next byte */
    SBUF = CRT_buffer[CRT_out_index++];
    if (CRT_out_index >= CRT_BUFFER_SIZE) CRT_out_index = 0;
  }
  else CRT_buffer_empty = TRUE;

}
```

```
/*
 ---------------------------------------------------------------------------
|
| CANBUS MODULAR CONTROLLER - Serial I/O Module
|
|
| Filename: sio.c
|
|
| Created:  05/15/93  RES
|
|
| Procedures defined in this module:
|
|   CRT_out()
|
|   CRT_print_code()
|
|   CRT_print_HEX_byte()
|
|   CRT_print_HEX_word()
|
|   CRT_print_xdata()
|
|   CRT_print_rc_code()
|
|   CRT_set_cursor()
|
|   CRT_erase_screen()
|
|   Echo()
|
|   Init_serial_IO()
|
|
| Public variables defined by this module:
|
|   ASCII_buffer[]
|
|   CRT_buffer[]
|
|   CRT_buffer_empty
|
|   CRT_in_index
|
|   CRT_out_index
```

```
|
|    KB_buffer[]
|
|    KB_in_index
|
|    KB_out_index
|
|    message_received
|
|
|
|  Revision History:
|
| 0.1  05/15/93  Version 0.1 (Alpha Release) RES
|
| 0.2  05/20/93  Version 0.2 (Beta Release) RES
|
| 1.00 01/12/94  Version 1.00 (Production Release) SCA
|
| 1.00 01/21/94  Version 1.00 (Production Release) SCA
|
|
|
|
|
|_____________________________________________________________________
|
*/

#include "common.h"                    /* common definitions        */
#include "board.h"                     /* hardware specific defines */
#include <io80196.h>                   /* 8096 special function register
s */

/*------------- Public Variable Definitions -----------------*/
char   ASCII_buffer[6];
char   CRT_buffer[CRT_BUFFER_SIZE];
u_char CRT_buffer_empty;
u_int  CRT_in_index;
u_int  CRT_out_index;
char   KB_buffer[KB_BUFFER_SIZE];
u_char KB_in_index;
u_char KB_out_index;
u_char message_received;

/*----------------- External Procedure References --------------------*
/
extern void Byte_to_BCD(u_char input_word,char *data_buffer);
extern void Byte_to_HEX(u_char input_byte,char *data_buffer);
extern void Int_to_BCD(u_int input_word,char *data_buffer);
extern void Leading_zero_suppression(u_char digits,char *ASCII_ptr);
```

Sio.c

```
extern void Word_to_BCD(u_int input_word,char *data_buffer);
extern void Word_to_HEX(u_int input_word,char *data_buffer);

/*----------------- External Variable References ---------------------*
/
/* none */

/*
 ______________________________________________________________________
|
|
|  Init_serial_IO()
|
|
|
|  Initializes variables used by the interrupt driven serial I/O
|
|  routines
|
|
|
|  1. Zero's the ASCII buffer.
|
|
|
|  2. Zero's the CRT_buffer[] and sets the input and output pointers
|
|     to the start of the buffer.
|
|
|
|  3. Zero's the keyboard buffer and sets the input and output
|
|     pointers to the start of the buffer.
|
|
|
|  4. Sets the message received flag to false.
|
|
|
|  5. Sets the CRT buffer empty flag to true.
|
|
|
|  Inputs:
|
|    none
|
|
|
```

```
|  Returns:
|
|    none
|
|
|
|  Error flags set by this procedure:
|
|    none
|
|
|
|___________________________________________________________________
|
*/

void Init_serial_IO(void) {

  u_int  i;

  /* zero out character buffers */
  for (i=0;i<6;i++) ASCII_buffer[i] = 0;
  for (i=0;i<KB_BUFFER_SIZE;i++) KB_buffer[i] = 0;
  for (i=0;i<CRT_BUFFER_SIZE;i++) CRT_buffer[i] = 0;
  KB_in_index   = 0;
  KB_out_index  = 0;
  CRT_in_index  = 0;
  CRT_out_index = 0;

  message_received = FALSE;
  CRT_buffer_empty = TRUE;

}

/*
 ___________________________________________________________________
|
|
|  CRT_out()
|
|
|
|  This routine provides the means by which all other procedures
|
|  write characters to the debug To support full interrupt-driven
|
|  transmit, this routine places characters in the CRT_buffer[].  The
|
|  serial I/O interrupt procedure unloads the CRT_buffer[] when the
|
|  transmitter becomes available.
```

Sio.c

If the the CRT_buffer[] is full the character is discarded and an error is flagged. A full buffer is indicated when the CRT_in_index is one less than the CRT_out_index (assuming the CRT_out_index is greater than zero) or the special case when the CRT_out_index is zero and the CRT_in_index is at the top of the buffer. If room is available, the character is placed in the CRT_buffer at the curent location of CRT_in_index and the CRT_in_index is post_incremented. CRT_in_index is checked for exceeding the range of the buffer and is reset to zero if necessary.

If the CRT_buffer was empty, the procedure manually sends the character just loading to the 80C32's SBUF, thus sending the character to the debug terminal and eventually generating a serial interrupt. The CRT_out_index is set equal to the CRT_in_index to reflect the fact that the charcter has been set. The CRT_buffer_empty flag is cleared to FALSE, assuming that additional characters may be loaded into the CRT_buffer before the serial interrupt occurs. The CRT_buffer_empty flag is set to TRUE by the serial interrupt procedure when the CRT_buffer becomes empty.

Interrupts are disabled during this procedure to prevent a serial interrupt from using inconsistant values of CRT_in_index and CRT_out_index.

```
|  Inputs:
|
|    u_char  input_char     ASCII character to be sent to the screen
|
|
|
|  Returns:
|
|    none
|
|
|
|  Calls:
|
|    none
|
|
|
|_______________________________________________________________________
|
*/

void CRT_out(char input_char) {

  u_int  in_index;
  u_int  out_index;

  disable_interrupt();     /* disable interrupts */
  in_index = CRT_in_index;
  out_index = CRT_out_index;
  enable_interrupt();        /* turn on interrupts */

  /* check to see if buffer is full */
  if ((out_index == in_index + 1) ||
     ((in_index == CRT_BUFFER_SIZE - 1) && (out_index == 0))) {
    /* discard the character */

    /* set an error flag here if needed */
    /* the CRT_buffer is considered a non-critical resource - if an
       overflow occurs, who cares.  It will not affect the operation
       of the system */
  }
  else {
    /* stuff the char into the CRT_buffer at the current index */
    CRT_buffer[CRT_in_index++] = input_char;
    if (CRT_in_index >= CRT_BUFFER_SIZE) CRT_in_index = 0;

    /* prime the transmitter if buffer was empty */
    if (CRT_buffer_empty) {
      CRT_out_index = CRT_in_index;
      SBUF = input_char;
```

Sio.c

```
    CRT_buffer_empty = FALSE;
   }
  }
}
/*
```

|

Echo()

This procedure is called from main() to echo characters in the keyboard buffer, KB_buffer[]. The output pointer, KB_out_index points to the next character waiting to be echoed. The input pointer, KB_in_index, points to the next available location for incoming keyboard characters. If KB_in_index is unequal to KB_out_index, then one or more characters (starting at KB_out_index) are waiting to be echoed. For each character echoed, KB_out_index is incremented. This process continues until KB_out_index is equal to KB_in_index, at which time the procedure returns to main().

If the character being echoed is a BACKSPACE or RUBOUT (as defined by can.h), then instead of echoing that character the procedure issues a BACKSPACE followed by a SPACE followed by another BACKSPACE and the current value of KB_in_index is decremented and the value of KB_in_index is decremented twice (once for the BACKSPACE character and again for the character that is to be deleted). KB_out_index is decremented only once, since it was not incremented when the BACKSPACE was encountered. The above scenario only applies if the KB_out_index is greater than zero. If the first character Sio.c

```
|
| in the KB_buffer is a BACKSPACE (or DELETE), then it makes no sense
|
| to decrement KB_out_index.  Instead, all that is required is to
|
| decrement KB_in_index. (Note that the BACKSPACE or DELETE is not
|
| echoed to the screen in either case)
|
|
|
| Inputs:
|
|   none
|
|
|
| Returns:
|
|   none
|
|
|
| Calls:
|
|   CRT_out()
|
|
|
|____________________________________________________________________
|
*/
#pragma EJECT

void Echo(void) {

  /* echo any characters waiting in the input buffer */
  while (KB_out_index != KB_in_index) {

    if ((KB_buffer[KB_out_index] != BACKSPACE) &&
        (KB_buffer[KB_out_index] != DELETE))
      /* it's a printable character, echo it */
      CRT_out(KB_buffer[KB_out_index++]);

    else {

      /* process a backspace key */
      if (KB_out_index > 0) {

        /* erase the previously echoed character on the screen */
        CRT_out(BACKSPACE);
```

```
        CRT_out(' ');
        CRT_out(BACKSPACE);

        /* set the output index to the last good character */
        KB_out_index--;

        /* and decrement the input index twice, once here to point to t
he
           backspace character... and again below */
        KB_in_index--;
      }

      /* point the input index to overwite the bad character */
      if (KB_in_index > 0) KB_in_index--;
    }
  }
}

/*
 ------------------------------------------------------------------------
|
|
|  CRT_print_code()
|
|
|
|  This procedure provides a convenient means of printing ROM-based
|
|  constant strings to the debug terminal.  The strings may be
|
|  specified in the tradition C ASCII string format like:
|
|
|
|     CRT_print_code("Hi there\n");
|
|
|
|  The string must be terminated by a NULL character (which is auto-
|
|  matic when the syntax shown above is used), and must reside in
|
|  code address space.  A line feed character is automatically
|
|  appended to the string if a carriage return (\n) character is
|
|  encountered.  The caller should not follow a carriage return with
|
|  a line feed unless additional spacing is desired.
|
|
```

Sio.c

```
|
|  Inputs:
|
|    pointer to an unsigned character string in code space
|
|
|
|  Returns:
|
|    none
|
|
|
|  Calls:
|
|    CRT_out()
|
|
|
|-----------------------------------------------------------------------
|
*/

void CRT_print_code(char *code_ptr) {

  while (*code_ptr != '\0') {
    /* insert a carriage return if needed */
    if (*code_ptr == '\n') CRT_out(0x0d);
    CRT_out(*code_ptr++);
  }
}

#pragma EJECT
/*
 -----------------------------------------------------------------------
|
|
|  CRT_print_xdata()
|
|
|
|  This procedure provides a convenient means of printing xdata-based
|
|  ASCII strings to the debug terminal.  The strings must be built up
|
|  in xdata memory by the caller and must be terminated with a NULL.
|
|  This procedure is useful for printing a string which contains
|
|  variable data and, therefore, cannot use the CRT_print_code()
|
```

Sio.c

```
|  function described above.  This is one way of simulating the
|
|  printf() function in stdio, but additional effort is required by
|
|  the caller.
|
|
|
|  Inputs:
|
|    pointer to an unsigned character string in xdata space
|
|
|
|  Returns:
|
|    none
|
|
|
|  Calls:
|
|    CRT_out()
|
|
|
|______________________________________________________________________
|
*/

void CRT_print(char *xdata_ptr) {
  while (*xdata_ptr != '\0') {
    if (*xdata_ptr == '\n') CRT_out(0x0d);
    CRT_out(*xdata_ptr++);
  }
}

/*
 ______________________________________________________________________
|
|
|  CRT_print_HEX_word()
|
|
|
|  This procedure prints the ASCII-HEX value of the supplied variable
|
|  at the current cursor position of the debug terminal.  The value
|
|  printed will be between 0000 and FFFF.  Four consecutive calls are
|
```

```
| made to CRT_out() to print the characters.  No leading or trailing
|
| spaces are printed by this routine.  To simulate printf(), combine
|
| this routine with CRT_print_code() like shown below:
|
|
|
|    CRT_print_code("address=");
|
|    CRT_print_HEX_word(address);
|
|    CRT_print_code(" count=");
|
|    CRT_print_HEX_word(count);
|
|    CRT_print_code("\n");
|
|
|
| Inputs:
|
|   unsigned integer to be printed
|
|
|
| Returns:
|
|   none
|
|
|
| Calls:
|
|   Word_to_HEX()
|
|   CRT_out()
|
|
|
|____________________________________________________________________
|
*/

void CRT_print_HEX_word(u_int value) {
  u_char  i;

  Word_to_HEX(value,ASCII_buffer);
  for (i=0;i<4;i++) CRT_out(ASCII_buffer[i]);
}
```

Sio.c

```
/*
 ___________________________________________________________________________
|
|
|  CRT_print_HEX_byte()
|
|
|
|  This procedure prints the ASCII-HEX value of the supplied variable
|
|  at the current cursor position of the debug terminal.  The value
|
|  printed will be between 00 and FF.  Two consecutive calls are made
|
|  to CRT_out() to print the characters.  No leading or trailing
|
|  spaces are printed by this routine.  To simulate printf(), combine
|
|  this routine with CRT_print_code() like shown below:
|
|
|
|     CRT_print_code("data=");
|
|     CRT_print_HEX_byte(param);
|
|     CRT_print_code("\n");
|
|
|
|  Inputs:
|
|    unsigned character to be printed
|
|
|
|  Returns:
|
|    none
|
|
|
|  Calls:
|
|    Byte_to_HEX()
|
|    CRT_out()
|
|
|
|___________________________________________________________________________
```

```
|
*/

void CRT_print_HEX_byte(u_char value) {

  Byte_to_HEX(value,ASCII_buffer);
  CRT_out(ASCII_buffer[0]);
  CRT_out(ASCII_buffer[1]);
}


/*
 ------------------------------------------------------------------------
|
|
|  CRT_print_BCD_word()
|
|
|
|  This procedure prints the ASCII-BCD value of the supplied variable
|
|  at the current cursor position of the debug terminal.  The value
|
|  printed will be between 0 and 65535.  Five consecutive calls are
|
|  made to CRT_out() to print the characters.  Leading zero suppres-
|
|  sion is performed.
|
|
|
|  Inputs:
|
|    unsigned integer to be printed
|
|
|
|  Returns:
|
|    none
|
|
|
|  Calls:
|
|    Word_to_BCD()
|
|    CRT_out()
|
|
|
```

Sio.c

```
|_______________________________________________________________
|
*/

void CRT_print_BCD_word(u_int value) {
  u_char  i;

  Word_to_BCD(value,ASCII_buffer);
  Leading_zero_suppression(4,ASCII_buffer);
  for (i=0;i<5;i++) CRT_out(ASCII_buffer[i]);
}

void CRT_print_BCD_word_x(u_int value, u_char digits) {
  u_char  i;

  Word_to_BCD(value,ASCII_buffer);
  Leading_zero_suppression(4,ASCII_buffer);
  for (i=0;i<digits;i++) CRT_out(ASCII_buffer[5 - digits + i]);
}

void CRT_print_BCD_word_decimal(u_int value, u_char decimal_place) {
  u_char  i;

  Word_to_BCD(value,ASCII_buffer);
  Leading_zero_suppression(decimal_place,ASCII_buffer);
  for (i=0;i<5;i++) {
    if (decimal_place == i) CRT_out('.');
    CRT_out(ASCII_buffer[i]);
  }
}

/*
 _______________________________________________________________
|
|
|  CRT_print_BCD_byte()
|
|
|
|  This procedure prints the ASCII-BCD value of the supplied variable
|
|  at the current cursor position of the debug terminal.  The value
|
|  printed will be between 0 and 255.  Two consecutive calls are made
|
|  to CRT_out() to print the characters.
|
|
|
|  Inputs:
```

Sio.c

```
|
|    unsigned character to be printed
|
|
|
|  Returns:
|
|    none
|
|
|
|  Calls:
|
|    Byte_to_BCD()
|
|    CRT_out()
|
|
|
|____________________________________________________________________
|
*/

void CRT_print_BCD_byte(u_char value) {

  Byte_to_BCD(value,ASCII_buffer);
  Leading_zero_suppression(2,ASCII_buffer);
  CRT_out(ASCII_buffer[0]);
  CRT_out(ASCII_buffer[1]);
  CRT_out(ASCII_buffer[2]);
}

void CRT_print_BCD_byte_x(u_char value,u_char digits) {

  Byte_to_BCD(value,ASCII_buffer);
  Leading_zero_suppression(2,ASCII_buffer);
  if (digits > 2) CRT_out(ASCII_buffer[0]);
  if (digits > 1) CRT_out(ASCII_buffer[1]);
  CRT_out(ASCII_buffer[2]);
}


void CRT_print_BCD_byte_decimal(u_char value, u_char decimal_place) {

  u_char  i;

  Byte_to_BCD(value,ASCII_buffer);
  Leading_zero_suppression(decimal_place,ASCII_buffer);
  for (i=0;i<3;i++) {
    if (decimal_place == i) CRT_out('.');
    CRT_out(ASCII_buffer[i]);
```

Sio.c

```
  }
}
/*
 ___________________________________________________________________
|
|
|  CRT_set_cursor()
|
|
|
|  This procedure sets the CRT cursor to the indicated row,col position
|
|
|
|  Inputs:
|
|    u_char        row (0 to 23)
|
|    u_char        col (0 to 79)
|
|
|
|  Returns:
|
|    none
|
|
|
|  Calls:
|
|    CRT_out()
|
|
|
|___________________________________________________________________
|
*/

void CRT_set_cursor(u_char row,u_char col) {

  CRT_out(ESC);
  CRT_out('=');
  CRT_out(row + ' ');
  CRT_out(col + ' ');

}

/*
 ___________________________________________________________________
|
|
```

```
|  CRT_erase_screen()
|
|
|
|  This procedure erases the CRT screen and sets the cursor to 0,0.
|
|
|
|  Inputs:
|
|    none
|
|
|
|  Returns:
|
|    none
|
|
|
|  Calls:
|
|    CRT_out()
|
|
|
|____________________________________________________________________
|
*/
void CRT_erase_screen(void) {

  CRT_out(ESC);
  CRT_out(';');

}

/*
 ____________________________________________________________________
|
|
|  CRT_print_rc_code()
|
|
|
|  This procedure prints the supplied text string at the row,column
|
|  position indicated.
|
|
|
```

Sio.c

```
|  Inputs:
|
|    u_char       row (0 to 23)
|
|    u_char       col (0 to 79)
|
|    u_char ptr   text string in code space
|
|
|
|  Returns:
|
|    none
|
|
|
|  Calls:
|
|    CRT_set_cursor()
|
|    CRT_print_code()
|
|
|
|___________________________________________________________________________
|
*/

void CRT_print_rc_code(u_char row,u_char col,u_char *text_ptr) {

  CRT_set_cursor(row,col);
  CRT_print_code(text_ptr);

}
```

Txbuf.c

```
/*
 ___________________________________________________________________________
|
|
|  CANBUS MODULAR CONTROLLER - CAN Tx Buffer Module
|
|
|
|  Filename: txbuf.c
|
|
|
|  Created:  05/15/93  RES
|
|
|
|  Procedures defined in this module:
|
|    Init_Tx_buffer()
|
|    Tx_en_buffer()
|
|
|
|  Public variables defined by this module:
|
|    Tx_A_buffer()
|
|    Tx_A_in_index
|
|    Tx_A_out_index
|
|
|
|  Revision History:
|
| 0.1  05/15/93  Version 0.1 (Alpha Release) RES
|
| 0.3  05/23/93  Added WATCHDOG update in Init_Tx_buffer RES
|
| 0.4  06/02/93  Added 'RTR' do debug display  RES
|
| 1.00 01/12/94  Version 1.00 (Production Release) SCA
|
| 1.00 01/21/94  Version 1.00 (Production Release) SCA
|
|
|
|
|
|___________________________________________________________________________
```

Txbuf.c

```
|
*/

#include "common.h"                    /* common definitions        */
#include "board.h"                     /* hardware specific defines */
#include "crtio.h"                     /* define I/O function       */
#include "errors.h"                    /* error code assignments    */

/*---------------------- External References ------------------------*/
extern void   Flash_RED_LED(void);
extern void   Write_canbus_A(void);

/*----------------- External Variable References ---------------------*
/
extern u_char debug_enabled;
extern void   Log_error(u_char error_code);
extern u_char Tx_A_busy;

/*----------------- Public Variable Definitions ----------------------*
/
u_char Tx_A_buffer[TX_A_BUFFER_SIZE];
u_int  Tx_A_in_index;
u_int  Tx_A_out_index;

/*
 ----------------------------------------------------------------------
|
|
|  Init_Tx_buffer()
|
|
|
|  This procedure zeros the transmit buffer and sets the input and
|
|  output pointers to the start of the buffer.
|
|
|
|  Inputs:
|
|    none
|
|
|
|  Returns:
|
|    none
|
|
|
|  Calls:
```

Txbuf.c

```
|
|    none
|
|_____________________________________________________________________
|
*/

void Init_Tx_buffer(void) {

  u_int  i;

  /* initialize the Tx buffers */
  for (i=0;i<TX_A_BUFFER_SIZE;i++) {
    Tx_A_buffer[i] = 0;
  }
  Tx_A_in_index = 0;
  Tx_A_out_index = 0;

}
#pragma EJECT

/*
 _____________________________________________________________________
|
|
|  Tx_en_buffer()
|
|
|
|  This procedure places a outgoing message in the proper transmit
|
|  buffer.  If the 82C200 for that channel is not busy, then this
|
|  procedure manualy send the message by calling Write_canbus().  If
|
|  the channel is busy, then the message will be extracted from the
|
|  transmit buffer when the transmit ready interrupt occurs.  If the
|
|  message will not fit into the transmit buffer, then the message is
|
|  discarded and the proper error counters are incremented.  The room
|
|  calculation allows for pointer wrap-around.  External interrupts
|
|  are turned off to keep the CANbus interrupt from seeing a partially
|
|  filled transmit buffer.
|
|
|
```

Txbuf.c

```
|  Inputs:
|
|    none
|
|
|
|  Returns:
|
|    none
|
|
|
|  Calls:
|
|    CRT_print_code()
|
|    CRT_print_HEX_byte()
|
|    Write_canbus()
|
|
|
|______________________________________________________________________
|
*/

void Tx_en_buffer (u_char node_index,
                   u_char command,
                   u_char length,
                   u_char *data_ptr) {

  u_int   room;
  u_int   size;
  u_char  i;

  if (debug_enabled) {
    CRT_print_code("DPRAM-> N=");
    CRT_print_HEX_byte(node_index);
    if ((command & 0x80) != 0) CRT_print_code(" RTR ");
    CRT_print_code(" C=");
    CRT_print_HEX_byte(command & 0x7f);
    CRT_print_code(" L=");
    CRT_print_HEX_byte(length);
    CRT_print_code(" D=");
    for(i=0;i<length;i++) {
      CRT_print_HEX_byte(data_ptr[i]);
      CRT_print_code(" ");
    }
    if (node_index >= 16 ) CRT_print_code("-> Tx B\n");
    else CRT_print_code("-> Tx A\n");
  }
```

Txbuf.c

```
  /* turn off CAN interrupts to avoid a Tx ready seeing a partially
     filled Tx_buffer */

  disable_interrupt();

  /* channel A */

  /* determine if the message will fit in the buffer */
  if (Tx_A_in_index >= Tx_A_out_index)
    room = TX_A_BUFFER_SIZE - (Tx_A_in_index - Tx_A_out_index);
  else room = Tx_A_out_index - Tx_A_in_index;

  /* we need three extra bytes to save the node, cmd, and length */
  size = length + 4;
  if (room > (length + 4)) {
    /* message will fit in buffer */
    Tx_A_buffer[Tx_A_in_index++] = node_index;
    if (Tx_A_in_index >= TX_A_BUFFER_SIZE) Tx_A_in_index = 0;

    Tx_A_buffer[Tx_A_in_index++] = command;
    if (Tx_A_in_index >= TX_A_BUFFER_SIZE) Tx_A_in_index = 0;

    Tx_A_buffer[Tx_A_in_index++] = length;
    if (Tx_A_in_index >= TX_A_BUFFER_SIZE) Tx_A_in_index = 0;

    for (i=0;i<length;i++) {
      Tx_A_buffer[Tx_A_in_index++] = *data_ptr++;
      if (Tx_A_in_index >= TX_A_BUFFER_SIZE) Tx_A_in_index = 0;
    }
  }
  else {
    /* Tx_A_buffer is full, return error */
    Log_error(TX_BUFFER_FULL_A);
    Flash_RED_LED();
  }
  /* if the channel is not busy, write the message directly to the 82C2
00 */
  if (!Tx_A_busy) {
    Write_canbus_A();
  }

  enable_interrupt();
}
```

Util.c

```
/*
 |-----------------------------------------------------------------------
 |
 |  CANBUS MODULAR CONTROLLER - Utility Module
 |
 |
 |  Filename: util.c
 |
 |
 |  Created:  05/15/93  RES
 |
 |
 |  Procedures defined in this module:
 |
 |    ASCII_to_nibble()
 |
 |    BCD_to_byte()
 |
 |    BCD_to_word()
 |
 |    Byte_to_BCD()
 |
 |    Byte_to_HEX()
 |
 |    HEX_to_word()
 |
 |    Int_to_BCD()
 |
 |    Leading_zero_suppression()
 |
 |    Nibble_to_ASCII()
 |
 |    Word_to_HEX()
 |
 |    Word_to_BCD()
 |
 |
 |  Public variables defined by this module:
 |
 |    none.
 |
 |
 |  Revision History:
 |
 |  V2.2 12-02-95  Implemented delay() timer function.
```

Util.c

```
|
|
|
|
|
|________________________________________________________________________
|
*/

#include "common.h"                   /* common definitions        */
#include "board.h"                    /* hardware specific defines */

/*------------- External Variable References -------------------------*
/
extern u_char delay_timer;

#pragma EJECT
/*
 ________________________________________________________________________
|
|
|  Delay()
|
|
|
|  This procedure delays for a short time.
|
|
|
|  Inputs:
|
|    u_char     delay time value (in msec.)
|
|
|
|  Returns:
|
|    none
|
|
|
|  Calls:
|
|    none
|
|
|
|________________________________________________________________________
|
*/
```

Util.c

```
void Delay(u_char msec) {
  delay_timer = msec;
  while (delay_timer > 0);
}

/*
 |______________________________________________________________________
 |
 |  Disable_ext()
 |
 |
 |  This procedure disables the CANBUS UART interrupt by clearing the
 |
 |  the ES1 bit.
 |
 |
 |  Inputs:
 |
 |    none
 |
 |
 |  Returns:
 |
 |    none
 |
 |
 |  Calls:
 |
 |    none
 |
 |
 |______________________________________________________________________
 |
*/

void Disable_ext(void) {
  /* disable external interrupts */

}

#pragma EJECT
/*
 ______________________________________________________________________
```

Util.c

```
|
|
|  Enable_ext()
|
|
|
|  This procedure enables the CANBUS UART interrupt by setting the
|
|  the ES1 bit.
|
|
|
|  Inputs:
|
|    none
|
|
|
|  Returns:
|
|    none
|
|
|
|  Calls:
|
|    none
|
|
|
|___________________________________________________________________________
|
*/

void Enable_ext(void) {
  /* enable external interrupts */
}

#pragma EJECT
/*
 ___________________________________________________________________________
|
|
|  ASCII_to_nibble()
|
|
|
|  This procedure converts a single unsigned ASCII-HEX character (in
|
|  the range from 0 to F into its corresponding 4 bit binary value.
|
```

```
|  This procedure is used by HEX_to_word() and HEX_to_byte(), see
|
|  below.  The input character must be upper case.  If the input is
|
|  not in the valid range, the procedure returns zero.
|
|
|
|  Inputs:
|
|    unsigned ASCII-HEX character in the range from 0 to F.
|
|
|
|  Returns:
|
|    a four bit binary value in the range of 0x0 to 0xf as an unsigned
|
|    character.
|
|
|
|  Calls:
|
|    none
|
|
|
|_____________________________________________________________________
|
*/

char ASCII_to_nibble(char ASCII_byte) {

  if ((ASCII_byte >= '0') && (ASCII_byte <= '9')) return (ASCII_byte -
'0');
  else if ((ASCII_byte >= 'A') && (ASCII_byte <= 'F')) return (ASCII_by
te - '7');
  else return (0);
}

#pragma EJECT
/*
 _____________________________________________________________________
|
|
|  Nibble_to_ASCII()
|
|
|
|  This procedure converts an unsigned character in the range 0x0 to
```

Util.c

```
|
| 0xf into its corresponding ASCII-HEX character (in the range from 0
|
| to F). This procedure is used by Word_to_HEX() and Byte_to_HEX(),
|
| see below.  Values returned are in upper case.  If the input is not
|
| in the valid range, the procedure returns the symbol '?'.
|
|
|
| Inputs:
|
|   unsigned character in the range from 0x0 to 0xf.
|
|
|
| Returns:
|
|   unsigned character in the range '0' to 'F', or '?' for errors.
|
|
|
| Calls:
|
|   none
|
|
|
|______________________________________________________________________
|
*/

char Nibble_to_ASCII(char nibble) {

  if (nibble < 10) return(nibble + '0');
  else if (nibble < 16) return(nibble + '7');
  else return ('?');
}

#pragma EJECT
/*
 ______________________________________________________________________
|
|
|  Word_to_HEX()
|
|
|
|  This procedure converts an unsigned integer to its equivalent ASCII
|
```

Util.c

```
| HEX representation 0000 to FFFF.  The HEX characters are returned
|
| in a four-byte idata array specified by the caller.  The most sig-
|
| nificant digit is returned in to 0th location in the array.  This
|
| procedure call Nibble_to_ASCII() for data conversion.
|
|
|
| Inputs:
|
|   unsigned integer to be converted into ASCII-HEX.
|
|   a pointer to a 4-byte unsigned character array in idata space to
|
|     receive the ASCII-HEX values.
|
|
|
| Returns:
|
|   none
|
|
|
| Calls:
|
|   Nibble_to_ASCII()
|
|
|
|_____________________________________________________________________
|
*/

void Word_to_HEX(u_int input_word,char *ASCII_ptr) {

  u_char  i;

  for (i=0;i<4;i++)
  {
    ASCII_ptr[3 - i] = Nibble_to_ASCII(input_word & 0x0f);
    input_word >>= 4;
  }
}

/*
 _____________________________________________________________________
|
|
```

Util.c

```
| Byte_to_HEX()
|
|
|
| This procedure converts an unsigned character into its equivalent
|
| ASCII-HEX representation 00 to FF.  The HEX characters are returned
|
| in a two-byte idata array specified by the caller.  The more sig-
|
| nificant digit is returned in to 0th location in the array.  This
|
| procedure call Nibble_to_ASCII() for data conversion.
|
|
|
| Inputs:
|
|   unsigned character to be converted into ASCII-HEX.
|
|   a pointer to a 2-byte unsigned character array in idata space to
|
|     receive the ASCII-HEX values.
|
|
|
| Returns:
|
|   none
|
|
|
| Calls:
|
|   Nibble_to_ASCII()
|
|
|
|______________________________________________________________________
|
*/

void Byte_to_HEX(u_char input_byte,char *ASCII_ptr) {

  ASCII_ptr[1] = Nibble_to_ASCII(input_byte & 0xf);
  input_byte >>= 4;
  ASCII_ptr[0] = Nibble_to_ASCII(input_byte & 0xf);
}

#pragma EJECT
/*
```

Util.c

```
/*
|-----------------------------------------------------------------------
|
| HEX_to_word()
|
|
| This procedure converts a 4-byte array of ASCII-HEX characters in
| idata space into the equivalent unsigned integer representation
| (0x0 to 0xffff). The ASCII-HEX characters must be in upper case and
| the most significant digit must be in the 0th location in the array.
| This procedure call ASCII_to_nibble() for data conversion.
|
|
| NOTE:  Due to an unconfirmed bug in the Franklin C51 compiler, the
|        unsigned int "temp" used below MUST be in data space.  If
|        moved to idata space, the routine will crash. RES
|
|
| Inputs:
|   a pointer to a 4-byte unsigned character array in idata space to
|     provide the ASCII-HEX values.
|
|
| Returns:
|   an unsigned integer representing the ASCII-HEX data.
|
|
| Calls:
|   ASCII_to_nibble()
|
|
|-----------------------------------------------------------------------
|
*/
```

Util.c

```
u_int HEX_to_word(char *ASCII_ptr) {

  u_int  temp;     /* this will crash if made idata! */
  u_char i;

  temp = 0;
  for (i=0;i<4;i++) {
    temp <<= 4;
    temp |= ASCII_to_nibble(ASCII_ptr[i]);
  }
  return(temp);
}

/*
 ---------------------------------------------------------------------
|
|  Word_to_BCD()
|
|
|  This procedure converts an unsigned integer to its equivalent ASCII
|
|  BCD representation 00000 to 65535.  The BCD characters are returned
|
|  in a five-byte idata array specified by the caller.  The most sig-
|
|  nificant digit is returned in to 0th location in the array.  This
|
|  procedure uses consecutive subtraction to perform the conversion.
|
|  No leading-zero suppression is performed (see Leading_zero_suppres-
|
|  sion(), below).
|
|
|  Inputs:
|
|    unsigned integer to be converted into ASCII-BCD.
|
|    a pointer to a 5-byte unsigned character array in idata space to
|
|      receive the ASCII-BCD values.
|
|
|  Returns:
|
|    none
|
```

Util.c

```
|
|
|  Calls:
|
|    none
|
|
|
|________________________________________________________________________
|
*/

void Word_to_BCD(u_int input_word,char *ASCII_ptr) {

  u_char i;

  i = 0;
  while (input_word >= 10000) {
    input_word -= 10000;
    i++;
  };
  ASCII_ptr[0] = Nibble_to_ASCII(i);

  i = 0;
  while (input_word >= 1000) {
    input_word -= 1000;
    i++;
  };
  ASCII_ptr[1] = Nibble_to_ASCII(i);

  i = 0;
  while (input_word >= 100) {
    input_word -= 100;
    i++;
  };
  ASCII_ptr[2] = Nibble_to_ASCII(i);

  i = 0;
  while (input_word >= 10) {
    input_word -= 10;
    i++;
  };
  ASCII_ptr[3] = Nibble_to_ASCII(i);

  ASCII_ptr[4] = Nibble_to_ASCII(input_word);
}

#pragma EJECT
/*
 ________________________________________________________________________
|
```

Util.c

```
|
|  Int_to_BCD()
|
|
|
|  This procedure converts an unsigned integer to its equivalent ASCII
|
|  BCD representation -32768 to +32767.  The BCD characters are
|
|  returned in a five-byte idata array specified by the caller.  The
|
|  sign is returned in the 0th location and the most significant digit
|
|  is returned in the 1st location in the array.  This procedure con-
|
|  verts the input into a "positive" value and then call Word_to_BCD()
|
|  to perform the conversion.
|
|
|
|  Inputs:
|
|    unsigned integer to be converted into ASCII-BCD.
|
|    a pointer to a 5-byte unsigned character array in idata space to
|
|      receive the ASCII-BCD values.
|
|
|
|  Returns:
|
|    none
|
|
|
|  Calls:
|
|    Word_to_BCD()
|
|
|
|___________________________________________________________________
|
*/

void Int_to_BCD(u_int input_word,char *ASCII_ptr) {

  u_char i;
  u_char sign_bit;
```

Util.c

```
  if (input_word > 0x7fff) {
    /* value is negative, convert to a positive number */
    input_word = ~(input_word);
    input_word++;
    sign_bit = 1;
  }
  else sign_bit = 0;

  /* use the conventional Word_to_BCD to convert to ASCII */
  Word_to_BCD(input_word,ASCII_ptr);

  /* shift everything over and add the sign bit */
  for (i=0;i<5;i++) ASCII_ptr[5 - i] = ASCII_ptr[4 - i];
  if (sign_bit == 0) ASCII_ptr[0] = '+';
  else ASCII_ptr[0] = '-';
}

#pragma EJECT
/*
 ____________________________________________________________________________
|
|
|  Byte_to_BCD()
|
|
|
|  This procedure converts an unsigned character to its equivalent
|
|  ASCII-BCD representation 000 to +255.  The BCD characters returned
|
|  in a three-byte idata array specified by the caller.  The most sig-
|
|  nificant digit is returned in to 0th location in the array.  This
|
|  procedure uses consecutive subtraction to perform the conversion.
|
|
|
|  Inputs:
|
|    unsigned character to be converted into ASCII-BCD.
|
|    a pointer to a 3-byte unsigned character array in idata space to
|
|      receive the ASCII-BCD value.
|
|
|
|  Returns:
|
```

Util.c

```
|    none
|
|
|
| Calls:
|
|    none
|
|
|
|________________________________________________________________________
|
*/

void Byte_to_BCD(u_char input_byte,char *ASCII_ptr) {

  u_char i;

  i = 0;
  while (input_byte >= 100) {
    input_byte -= 100;
    i++;
  };
  ASCII_ptr[0] = Nibble_to_ASCII(i);

  i = 0;
  while (input_byte >= 10) {
    input_byte -= 10;
    i++;
  };
  ASCII_ptr[1] = Nibble_to_ASCII(i);

  ASCII_ptr[2] = Nibble_to_ASCII(input_byte);
}

#pragma EJECT
/*
 ________________________________________________________________________
|
|
| BCD_to_word()
|
|
|
| This procedure converts a 5-byte array of ASCII-BCD characters in
|
| idata space into the equivalent unsigned integer representation
|
| (0 to 65535). The most significant digit must be in the 0th
|
| location in the array.  The input array is checked for valid char-
```

Util.c

```
|
| acters in the range '0' to '9'.  Values outside this range are con-
|
| verted to '0' prior to conversion.  This procedure uses consecutive
|
| multiplication to perform data conversion.
|
|
|
| Inputs:
|
|   a pointer to a 5-byte unsigned character array in idata space to
|
|     provide the ASCII-BCD values.
|
|
|
| Returns:
|
|   an unsigned integer representing the ASCII-BCD data.
|
|
|
| Calls:
|
|   none
|
|
|
|___________________________________________________________________
|
*/

u_int BCD_to_word(char *char_ptr) {

  u_char i;

  /* convert the ASCII characters to 0 - 9 */
  for (i=0;i<5;i++) {
    if ((char_ptr[i] >= '0') && (char_ptr[i] <= '9')) char_ptr[i] -= '0
';
    else char_ptr[i] = 0;
  }
  return (10000 * char_ptr[0]) +
         ( 1000 * char_ptr[1]) +
         (  100 * char_ptr[2]) +
         (   10 * char_ptr[3]) +
         (        char_ptr[4]);
}

#pragma EJECT
```

Util.c

```
/*
 _______________________________________________________________________
|
|
|  BCD_to_byte()
|
|
|
|  This procedure converts a 2-digit packed BCD byte into an unsigned
|
|  integer in the range of (0 to 99). The most significant digit must
|
|  be in the upper nibble of the input.  For example, an input value
|
|  of 0x99 is converted into 99 (decimal).
|
|
|
|  Inputs:
|
|    an unsigned character containing two packed BCD digits.
|
|
|
|  Returns:
|
|    an unsigned character representing the ASCII-BCD data.
|
|
|
|  Calls:
|
|    none
|
|
|
|_______________________________________________________________________
|
*/

u_char BCD_to_byte(u_char BCD_byte) {

  u_char result;

  /* convert the 2 digit BCD value into a binary byte 0 - 99 */
  result = BCD_byte & 0x0f;
  BCD_byte >>= 4;

  return (result + (10 * BCD_byte));
}
```

Util.c

```
#pragma EJECT
/*
 |---------------------------------------------------------------------
 |
 |  Leading_zero_suppression()
 |
 |
 |  This procedure suppresses leading zeros in ASCII-BCD strings.  To
 |
 |  allow for implied decimal points in string, the procedure accepts
 |
 |  an input representing the number of digits that are available to
 |
 |  be suppressed.  Suppressed zeros are replaced with ASCII spaces.
 |
 |
 |  Examples:
 |
 |    Leading_zero_suppression(1,"00001")  ->   " 0001"
 |
 |    Leading_zero_suppression(5,"00001")  ->   "    1"
 |
 |
 |  Inputs:
 |
 |    an unsigned character representing the number of digits available
 |
 |      for suppression.
 |
 |    a pointer to an unsigned character string of ASCII digits in the
 |
 |      range 0 to 9.
 |
 |
 |  Returns:
 |
 |    none
 |
 |
 |  Calls:
 |
 |    none
 |
 |
 |
```

Util.c

```
|______________________________________________________________________
|
*/

void Leading_zero_suppression(u_char digits,char *ASCII_ptr) {

  u_char i;

  i = 0;
  while ((i < digits) && (ASCII_ptr[i] == '0')) ASCII_ptr[i++] = ' ';
}
```

What is claimed is:

1. A high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, the first circuit comprising a first potentiometer for selecting a desired output high magnitude potential, and a conductor for coupling the first potentiometer to the fourth circuit.

2. A high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, the first circuit comprising a programmable logic controller (PLC), the apparatus further comprising a high speed bus for coupling the PLC to the fourth circuit.

3. The apparatus of claim 2 wherein the first circuit comprises a first potentiometer for selecting a desired output high magnitude potential, and a conductor for coupling the first potentiometer to the fourth circuit.

4. The apparatus of claim 3 further comprising a switch for selectively coupling one of the PLC and the first potentiometer to the fourth circuit.

5. The apparatus of claim 4 wherein the third circuit comprises a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

6. The apparatus of claim 5 wherein the fourth circuit comprises a switching regulator having an input terminal forming a summing junction for the first signal and the second signal and an output terminal coupled to the center tap, the fifth circuit including a microprocessor ($\mu$P) and a third switch coupled to the $\mu$P to receive a third switching signal from the $\mu$P, the third switch coupled to the summing junction to couple the third switching signal to the switching regulator to disable the supply of operating potential to the center tap.

7. The apparatus of claim 4 wherein the second circuit comprises a second potentiometer for selecting a desired output current, and a conductor for coupling the second potentiometer to the fourth circuit.

8. The apparatus of claim 7 further comprising a second switch for selectively coupling one of the PLC and the second potentiometer to the fourth circuit.

9. The apparatus of claim 8 wherein the third circuit comprises a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

10. The apparatus of claim 9 wherein the fourth circuit comprises a switching regulator having an input terminal forming a summing junction for the first signal and the second signal and an output terminal coupled to the center tap, the fifth circuit including a microprocessor ($\mu$P) and a third switch coupled to the $\mu$P to receive a third switching signal from the $\mu$P, the third switch coupled to the summing junction to couple the third switching signal to the switching regulator to disable the supply of operating potential to the center tap.

11. A high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, the third circuit comprising a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively, a fourth circuit coupled to the first and second circuits and to the control terminal, the fourth circuit comprising a switching regulator having an input terminal forming a summing junction for the first signal and the second signal and an output terminal coupled to the center tap, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coutipd to the control terminal, the fifth circuit including a microprocessor ($\mu$P) and a third switch coupled to the $\mu$P to receive a third switching signal from the $\mu$P, the third switch coupled to the summing junction to couple the third switching signal to the switching regulator to disable the supply of operating potential to the center tap.

12. The apparatus of claim 11 and further comprising a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is being supplied to the high magnitude potential supply and the high magnitude potential supply is indicating that it is not generating high magnitude potential.

13. The apparatus of claim 11 wherein the third switch is coupled to the summing junction through a filter which smooths the switching signals generated by the third switch in response to the μP's control.

14. The apparatus of claim 11 and further comprising a sixth circuit cooperating with the μP to determine if operating potential is being supplied to the high magnitude potential supply, and a seventh circuit cooperating with the μP to determine if the high magnitude potential supply is indicating that it is generating high magnitude potential, the μP indicating a fault if the operating potential is not being supplied to the high magnitude potential supply and the high magnitude potential supply is indicating that it is generating high magnitude potential.

15. The apparatus of claim 14 wherein the μP indicates a fault if the operating potential is being supplied to the high magnitude potential supply and the high magnitude potential supply is indicating that it is not generating high magnitude potential.

16. A high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control termninal, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, the second circuit comprising a programmable logic controller (PLC), the apparatus further comprising a high speed bus for coupling the PLC to the fourth circuit.

17. The apparatus of claim 16 wherein the second circuit comprises a first potentiometer for selecting a desired output current, and a conductor for coupling the first potentiometer to the fourth circuit.

18. The apparatus of claim 17 further comprising a first switch for selectively coupling one of the PLC and the first potentiometer to the fourth circuit.

19. The apparatus of claim 18 wherein the third circuit comprises a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

20. The apparatus of claim 19 wherein the fourth circuit comprises a switching regulator having an input terminal forming a summing junction for the first signal and the second signal and an output terminal coupled to the center tap, the fifth circuit including a microprocessor (μP) and a third switch coupled to the μP to receive a third switching signal from the μP, the third switch coupled to the summing junction to couple the third switching signal to the switching regulator to disable the supply of operating potential to the center tap.

21. The apparatus of claim 2, 3, 4, 1, 16, 17, 18, 7, 8, 11, 13, 5, 6, 19, 20, 9, 10, 14, 15 or 12 further comprising a supply of coating material and a device for dispensing the coating material, the coating material dispensing device being coupled to the supply of coating material and to the high magnitude potential supply to charge the coating material dispensed by the coating material dispensing device.

* * * * *